US012659070B2

(12) United States Patent
Myung et al.

(10) Patent No.: US 12,659,070 B2
(45) Date of Patent: Jun. 16, 2026

(54) DEVICE AND METHOD FOR TRANSMITTING/RECEIVING CONTROL INFORMATION AND DATA IN COMMUNICATION SYSTEM

(71) Applicant: SAMSUNG ELECTRONICS CO., LTD., Suwon-si (KR)

(72) Inventors: Seho Myung, Suwon-si (KR); Sungjin Park, Suwon-si (KR); Younsun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 391 days.

(21) Appl. No.: 18/106,109

(22) Filed: Feb. 6, 2023

(65) Prior Publication Data

US 2023/0188247 A1 Jun. 15, 2023

Related U.S. Application Data

(63) Continuation of application No. PCT/KR2021/010475, filed on Aug. 9, 2021.

(30) Foreign Application Priority Data

Aug. 7, 2020 (KR) ........................ 10-2020-0099451
Oct. 22, 2020 (KR) ........................ 10-2020-0137646

(51) Int. Cl.
*H04L 1/00* (2006.01)
*H04L 1/1812* (2023.01)
*H04L 5/00* (2006.01)

(52) U.S. Cl.
CPC .......... *H04L 1/0003* (2013.01); *H04L 1/0026* (2013.01); *H04L 1/1812* (2013.01); *H04L 5/0051* (2013.01)

(58) Field of Classification Search
CPC ................. H04L 1/0003; H04L 1/0026; H04L 1/1812; H04L 5/0051; H04L 1/1671;
(Continued)

(56) References Cited

U.S. PATENT DOCUMENTS 8,576,783 B2    11/2013   Huh et al.
10,009,907 B2   6/2018    Jeon et al.
(Continued)

FOREIGN PATENT DOCUMENTS

JP      2016-163357     9/2016
KR      10-1799475      11/2017
(Continued)

OTHER PUBLICATIONS

International Search Report mailed Dec. 1, 2021 in PCT application PCT/KR2021/010475, 4 pages.
(Continued)

*Primary Examiner* — Eric Myers
(74) *Attorney, Agent, or Firm* — Nixon & Vanderhye, P.C.

(57) ABSTRACT

An example method for transmitting control information in a wireless communication system may include designing a CQI table in order to transmit channel state information (CSI); or a method for using the designed CQI table. In addition, the method may comprise: a method for designing a CQI table designed in a situation in which supported services or target BLERs mutually differ; or a method for using the designed CQI table. In addition, the method may comprise a method for determining or configuring a suitable MCS using an adequate MCS table corresponding to the CQI table, or a designed MCS table. In addition, the method may comprise a SINR mapping method and MCS configuration method, based on CQI information reported from a terminal.

9 Claims, 19 Drawing Sheets

(58) Field of Classification Search
CPC ..... H04L 1/1822; H04L 1/1896; H04L 5/005;
H04L 5/0057; H04L 5/0055; H04L 1/00;
H04L 1/0009; H04L 1/0016; H04L
1/0025; H04L 1/0057
See application file for complete search history.

(56) References Cited

U.S. PATENT DOCUMENTS

| | | | |
|---|---|---|---|
| 10,447,455 | B2 | 10/2019 | Bontu et al. |
| 10,461,904 | B2 | 10/2019 | Shi et al. |
| 2016/0262167 | A1 | 9/2016 | Lan et al. |
| 2017/0180099 | A1 | 6/2017 | Kim et al. |
| 2019/0208510 | A1* | 7/2019 | Park ..................... H04W 52/34 |
| 2019/0229841 | A1 | 7/2019 | Sandberg |
| 2019/0313426 | A1 | 10/2019 | Lin et al. |
| 2020/0007275 | A1 | 1/2020 | Sarkis |
| 2020/0052847 | A1* | 2/2020 | Manolakos .......... H04L 5/0094 |
| 2020/0228237 | A1 | 7/2020 | Myung et al. |
| 2021/0351861 | A1 | 11/2021 | Nimbalker et al. |

FOREIGN PATENT DOCUMENTS

| | | |
|---|---|---|
| KR | 10-1842204 | 3/2018 |
| KR | 10-2019-0017594 | 2/2019 |
| KR | 10-2019-0083489 | 7/2019 |
| KR | 10-2006746 | 8/2019 |
| KR | 10-2019-0140997 | 12/2019 |
| KR | 10-2020-0028482 | 3/2020 |
| WO | 2020/076226 | 4/2020 |

OTHER PUBLICATIONS

Written Opinion mailed Dec. 1, 2021 in PCT application PCT/KR2021/010475, 5 pages.
Qualcomm Incorporated, "On CQI reporting definition test requirement for 8Rx-capable UE", R4-1813494, 3GPP TSG-RAN WG4 Meeting #88bis, Chengdu, China, Sep. 28, 2018.
Ericsson, "Downlink Control Signaling for Code Block Group Operations", R1-1714437, 3GPP TSG RAN WG1 Meeting#90, Prague, Czech Republic, Aug. 12, 2017.
Phan et al., "Adaptive Point-to-Multipoint Transmission for Multimedia Broadcast Multicast Services in LTE", © Ericsson GmbH 2009, pp. 1-6.
3GPP TS 38.321 V15.9.0, Technical Specification; 3rd Generation Partnership Project; Technical Specification Group Radio Access Network; RN; Medium Access Control (MAC) protocol specification (Release 15) (Jul. 2020).
Office Action dated Apr. 21, 2025 in KR Application No. 10-2020-0137646 and English-language translation.
Office Action dated Nov. 11, 2025 in Korean Patent Application No. 10-2020-0137646 and English-language translation.

* cited by examiner

FIG. 2

DEVICE AND METHOD FOR TRANSMITTING/RECEIVING CONTROL INFORMATION AND DATA IN COMMUNICATION SYSTEM

CROSS-REFERENCE TO RELATED APPLICATIONS

This application is a continuation of International Application No. PCT/KR2021/010475 designating the United States, filed on Aug. 9, 2021, in the Korean Intellectual Property Receiving Office and claiming priority to Korean Patent Application No. 10-2020-0099451, filed on Aug. 7, 2020, in the Korean Intellectual Property Office, and to Korean Patent Application No. 10-2020-0137646, filed on Oct. 22, 2020, in the Korean Intellectual Property Office, the disclosures of all of which are incorporated by reference herein in their entireties.

BACKGROUND

Field

The disclosure relates to a communication or broadcasting system, and for example, to a device and method for transmitting and receiving control information in a communication or broadcasting system.

Description of Related Art

In order to satisfy wireless data traffic demands that have increased after 4G communication system commercialization, efforts to develop an enhanced 5G communication system are being made. For this reason, the 5G communication system is, for example, called a beyond 4G network communication system or a post LTE system. In order to achieve a high data transfer rate, an implementation of the 5G communication system in a mmWave band (e.g., a 60 Giga (60 GHz) band) is taken into consideration. In order to reduce a path loss of a radio wave and increase the transfer distance of a radio wave in the mmWave band, beamforming, massive MIMO, full dimensional MIMO (FD-MIMO), an array antenna, analog beamforming and large-scale antenna technologies have been discussed in the 5G communication system.

Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP), and reception interference cancellation, are being developed in the 5G communication system. In addition, hybrid FSK and QAM modulation (FQAM) and sliding window superposition coding (SWSC) that are advanced coding modulation (ACM) schemes, and filter bank multi-carrier (FBMC), non-orthogonal multiple access (NOMA) and sparse code multiple access (SCMA), that is, advanced access technologies, are being developed in the 5G system.

Meanwhile, in new radio (NR), that is new 5G communication, various services are designed in time and frequency resources so that the various services can be freely multiplexed. Accordingly, a waveform/numerology, a reference signal, etc. can be dynamically or freely allocated depending on the needs of a corresponding service. In order to provide a terminal with an optimal service in communication, optimized data transmission through the measurement of the quality of a channel and the amount of interference is important. Accordingly, it is essential to measure an accurate channel state. However, unlike in 4G communication in which channel and interference characteristics are not greatly changed depending on frequency resources, channel and interference characteristics of a 5G channel are greatly changed depending on a service. Accordingly, it is necessary to support a subset of a frequency resource group (FRG) in which the 5G channel is divided and measured. Meanwhile, in the NR system, the type of supported service may be divided into categories, such as enhanced mobile broadband (eMBB), massive machine type communications (mMTC), and ultra-reliable and low-latency communications (URLLC). eMBB may, for example, be considered as a service aimed at the high-speed transmission of a large amount of data, mMTC may, for example, be considered as a service aimed at the minimization of terminal power and the access of multiple terminals, and URLLC may, for example, be considered as a service aimed at high reliability and low latency. Different requirements may be applied depending on the type of service that is applied to a terminal.

As described above, in a communication system, a plurality of services may be provided to a user. In order to provide a plurality of such services to a user, there is a need for a method capable of providing each service suitably for characteristics and an apparatus using the method.

SUMMARY

Embodiments of the disclosure may provide a device and method for generating, configuring, or indicating a channel quality indicator (CQI) and a modulation and coding scheme (MCS) table in a communication system requiring various target block error rates (BLERs).

According to various example embodiments of the disclosure, a method of transmitting control information in a wireless communication system may include a method of designing a CQI table or a method of using the designed CQI table in order to transmit channel state information (CSI). Further, the method may include a method of designing a designed CQI table in a case that support services or target BLERs are different or a method of using the designed CQI table. Further, the method may include a method of determining or configuring an appropriate MCS using an appropriate MCS table corresponding to the CQI table or a designed MCS table. Further, the method may include a SINR mapping method and an MCS configuring method based on CQI information reported from the terminal. Further, the method may include an efficient skipping method of an LDPC code based on a determined MCS level and a transport block size.

Further, according to various example embodiments of the disclosure, a method of performing decoding by a terminal or a base station of a wireless communication system includes receiving a signal corresponding to a transport block; identifying an MCS level applied to the transport block based on the received signal; determining a transport block size (TBS) based on the MCS level; and determining whether to skip LDPC decoding based on the received signal and the TBS, wherein the LDPC decoding is skipped in a case that the MCS level is configured to a highest MCS level and the TBS is smaller than or equal to a reference value.

Further, according to various example embodiments of the disclosure, a terminal or a base station performing decoding in a wireless communication system includes a transceiver; and a controller configured to receive, via the transceiver, a signal corresponding to a transport block, to identify an MCS level applied to the transport block based on the received signal, to determine a transport block size (TBS) based on the MCS level, and to determine whether to skip LDPC decoding based on the received signal and the TBS, wherein the LDPC decoding is skipped in a case that the MCS level is configured to a highest MCS level and the TBS is smaller than or equal to a reference value.

Further, according to various example embodiments of the disclosure, a method of performing decoding by a receiver of a wireless communication system includes receiving a signal corresponding to a transport block; identifying an MCS level applied to the transport block based on the received signal; determining a transport block size (TBS) based on the MCS level; determining an effective code rate based on a number of physical channel bits transmitted through a PDSCH and the TBS; and determining whether to skip LDPC decoding based on the received signal and the TBS, wherein the LDPC decoding process is skipped in a case that the TBS is smaller than or equal to a first reference value and the effective code rate is greater than or equal to a second reference value.

Further, according to various example embodiments of the disclosure, a receiver for decoding a wireless communication system includes a transceiver; and a controller configured to receive, via the transceiver, a signal corresponding to a transport block, to identify an MCS level applied to the transport block based on the received signal, to determine a transport block size (TBS) based on the MCS level, to determine an effective code rate based on a number of physical channel bits transmitted through a PDSCH and the TBS, and to determine whether to skip LDPC decoding based on the received signal and the TBS, wherein the LDPC decoding process is skipped in a case that the TBS is smaller than or equal to a first reference value and the effective code rate is greater than or equal to a second reference value.

Further, according to various example embodiments of the disclosure, a method for a base station to determine a modulation and coding scheme (MCS) level for downlink transmission in a wireless communication system includes receiving a channel quality indicator (CQI) from a terminal; identifying at least one of the number of CSI-RS ports or a rank index; determining a signal to interference plus noise ratio (SINR) value based on the received CQI information; performing SINR normalization based on at least one of the determined SINR value, the number of CSI-RS ports, or a rank index; and determining an MCS based on the normalized SINR value.

Further, according to various example embodiments of the disclosure, a method for a base station to determine a modulation and coding scheme (MCS) level for downlink transmission in a wireless communication system includes receiving a channel quality indicator (CQI) from a UE; identifying at least one of the CSI-RS port number or a rank index; determining a signal to interference plus noise ratio (SINR) value based on the received CQI; performing SINR normalization based on at least one of the CSI-RS port number or the rank index and the determined SINR value; and determining an MCS based on the normalized SINR value.

Further, according to various example embodiments of the disclosure, a base station of a wireless communication system includes a transceiver; and a controller configured to receive, via the transceiver, a CQI from a UE, to identify at least one of the CSI-RS port number or a rank index, to determine a signal to interference plus noise ratio (SINR) value based on the received CQI, to perform SINR normalization based on at least one of the CSI-RS port number or the rank index and the determined SINR value, and to determine an MCS based on the normalized SINR value.

According to various example embodiments of the disclosure, when performing communication between a base station and a terminal, more efficient communication can be possible using an appropriate CQI table or MCS table according to a required target BLER.

Effects obtainable in the disclosure are not limited to the above-mentioned effects, and other effects not mentioned will be clearly understood from the description below.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 2 is a block diagram illustrating an example base station in a wireless communication system according to various embodiments;

5

Figure 8:
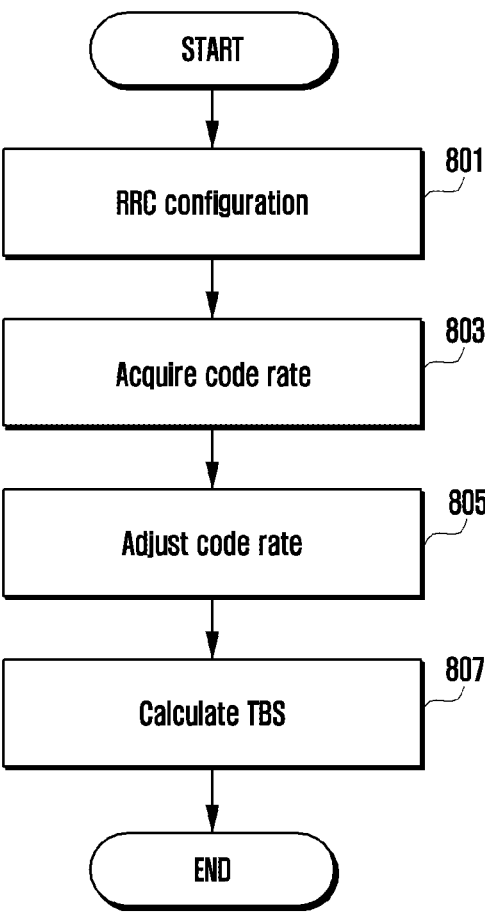
Figure 9:
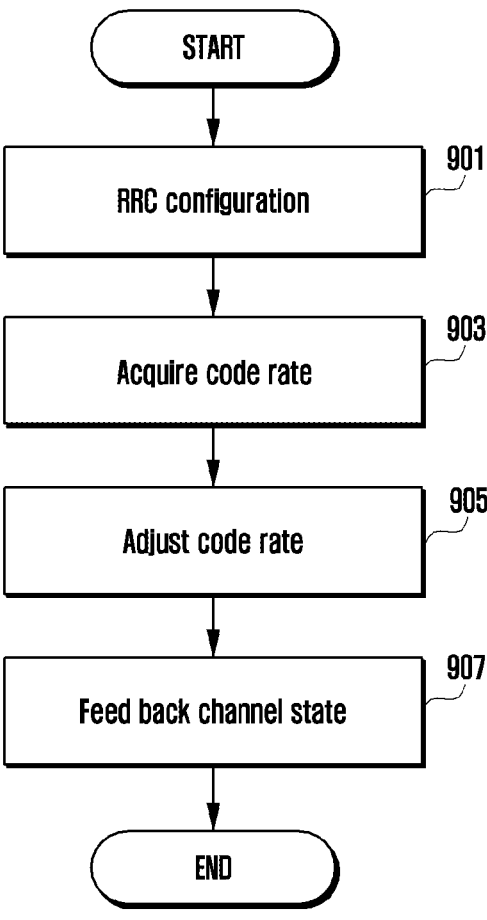
Figure 10:
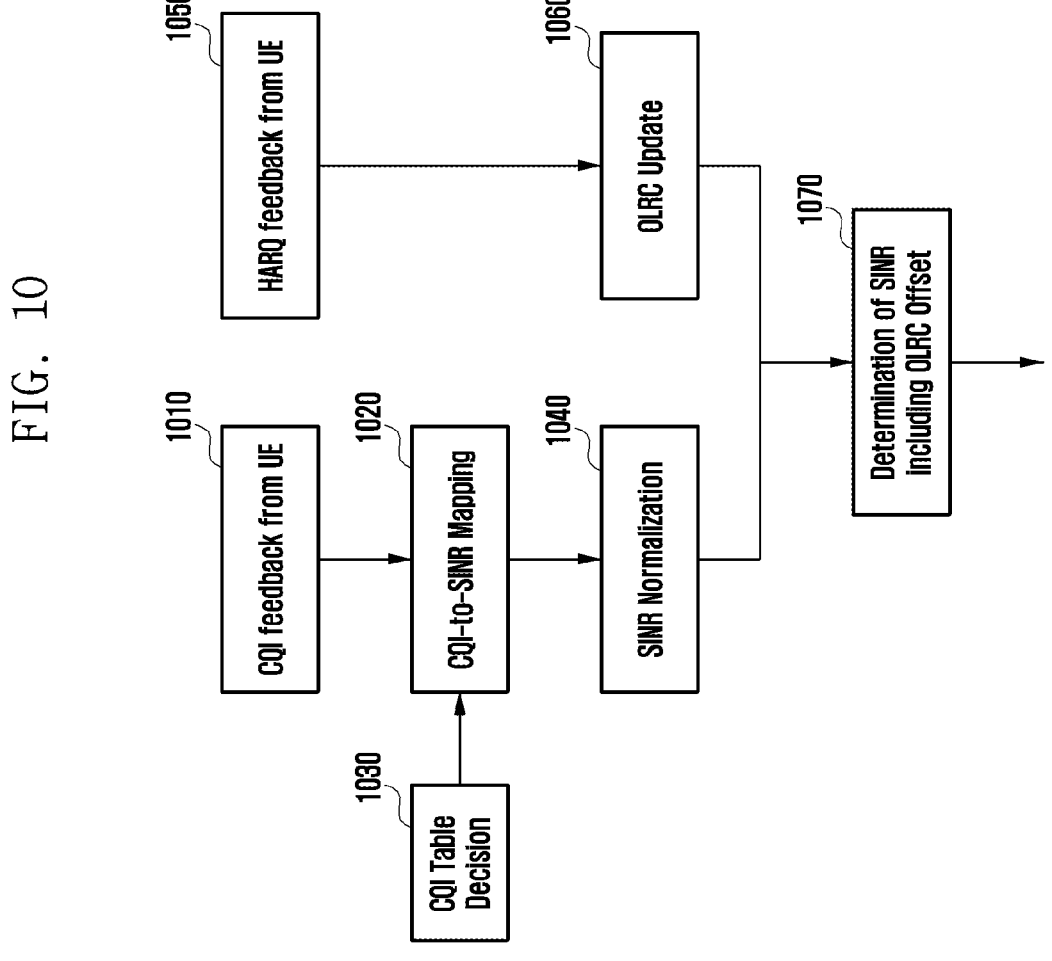
Figure 11:
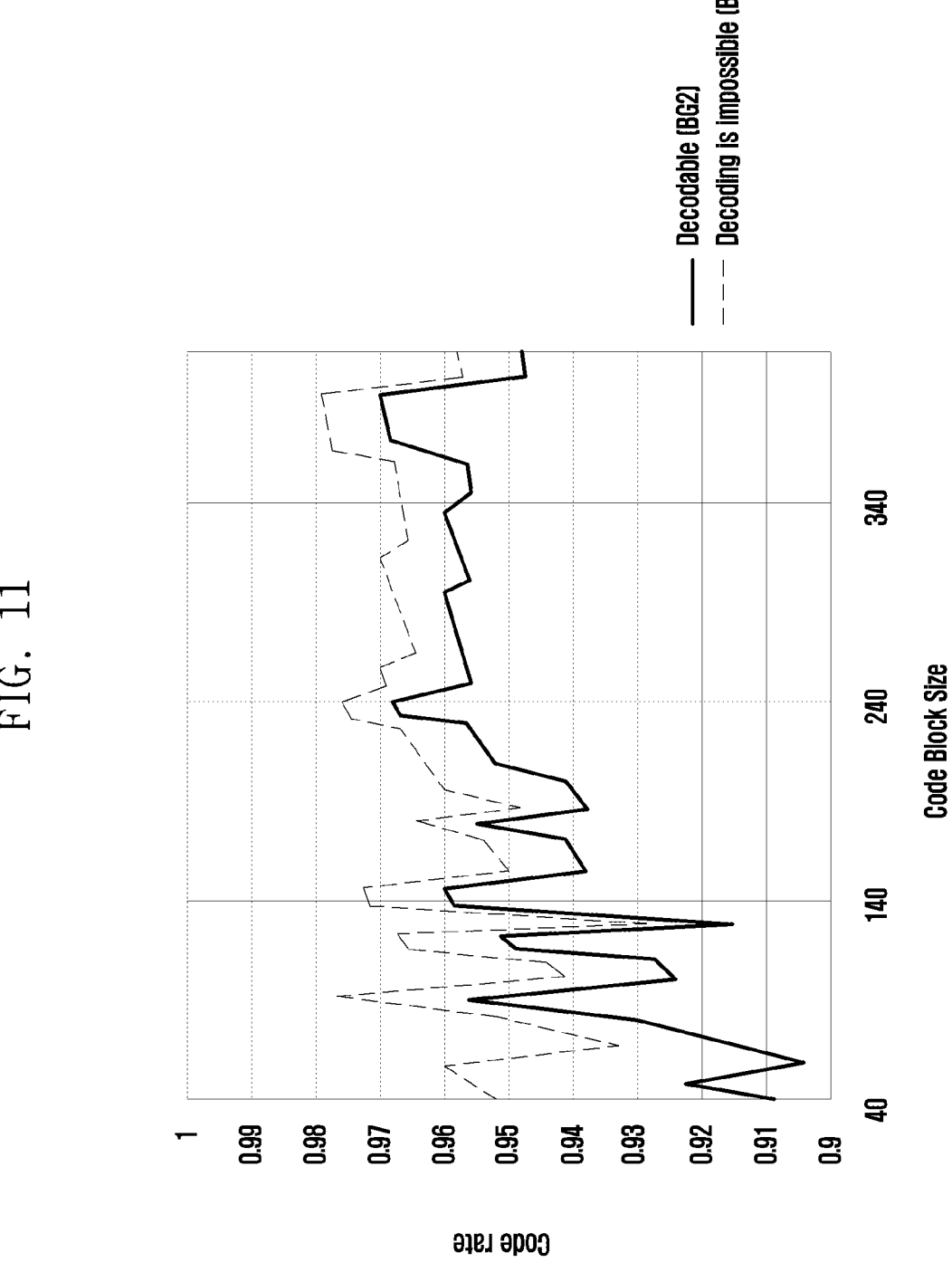
Figure 12:
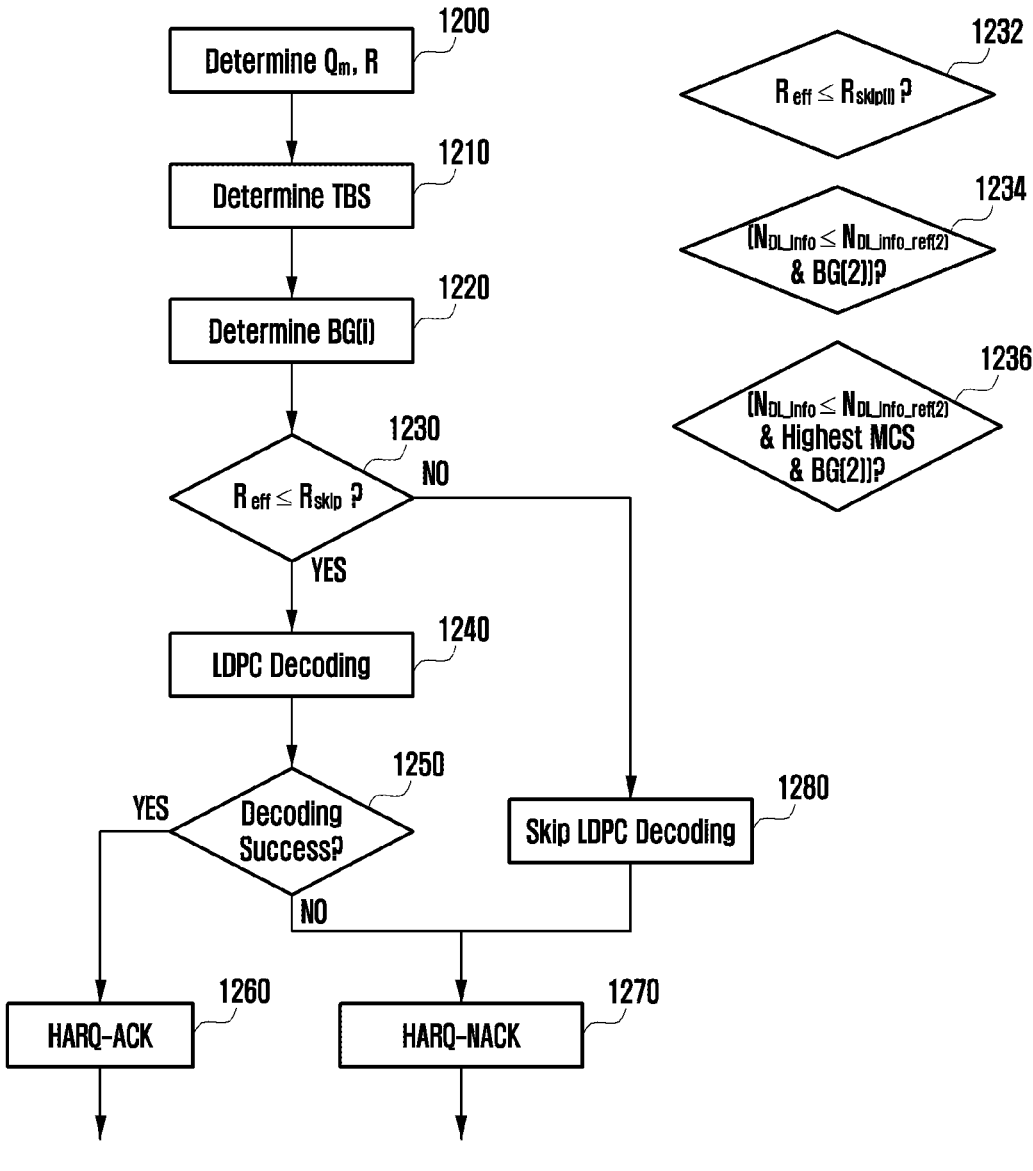

FIG. 8 is a flowchart illustrating an example method for a terminal to calculate a TBS using a CQI and an MCS table according to various embodiments;

FIG. 9 is a flowchart illustrating an example method for a terminal to calculate a TBS using a CQI and an MCS table according to various embodiments;

FIG. 10 is a flowchart illustrating example SINR mapping based on CQI information received from a terminal according to various embodiments;

FIG. 11 illustrates an example range of code rates that can successfully decode 5G NR LDPC codes according to code block sizes; and FIG. 12 is a flowchart applying example decoding skip in a terminal or a base station according to various embodiments.

DETAILED DESCRIPTION

Hereinafter, example embodiments of the disclosure will be described in detail with reference to the accompanying drawings. Further, in the disclosure, in a case in which a detailed description of a related known function or constitution may unnecessarily obscure the subject matter of the disclosure, a detailed description thereof will be omitted. Terms described below are terms defined in consideration of functions in the disclosure, which may vary according to intentions or customs of users and operators. Therefore, the definition should be made based on the content throughout this specification.

The disclosure is applicable to other communication systems having a similar technical background with slight modifications within the scope of the disclosure. A communication system may, for example, refer to a broadcasting system, and, in the disclosure, in a case that a broadcasting service among the communication system is a major service, the communication system may be more clearly referred to as a broadcasting system.

Advantages and features of the disclosure, and a method of achieving them will become apparent with reference to the embodiments described below in detail in conjunction with the accompanying drawings. However, the disclosure is not limited to the embodiments disclosed below, but may be implemented in various different forms, and embodiments of the disclosure are provided to fully inform the scope of the disclosure to those of ordinary skill in the art to which the disclosure belongs, and the disclosure is only defined by the scope of the claims. Like reference numerals refer to like components throughout the specification.

In various embodiments of the disclosure described below, a hardware approach method will be described as an example. However, because various embodiments of the disclosure include technology using both hardware and software, various embodiments of the disclosure do not exclude a software-based approach or an approach based on a combination of hardware and software.

Hereinafter, the disclosure relates to a device and method for transmitting and receiving control information in a communication system. For example, the disclosure describes technology for transmitting and receiving control information based on a channel quality indicator (CQI) and modulation coding scheme (MCS) table in a wireless communication system.

A term indicating a signal, a term indicating a channel, a term indicating control information, a term indicating network entities, and a term indicating a component of the device, which are used in the following description, are used for convenience of description. Accordingly, the disclosure is not limited to the terms described below, and other terms having equivalent technical meanings may be used.

Further, the disclosure describes various embodiments using terms used in some communication standards (e.g., $3^{rd}$ generation partnership project (3GPP)), but this is only an example for description. Various embodiments of the disclosure may be easily modified and applied in other communication systems.

Figure 1:
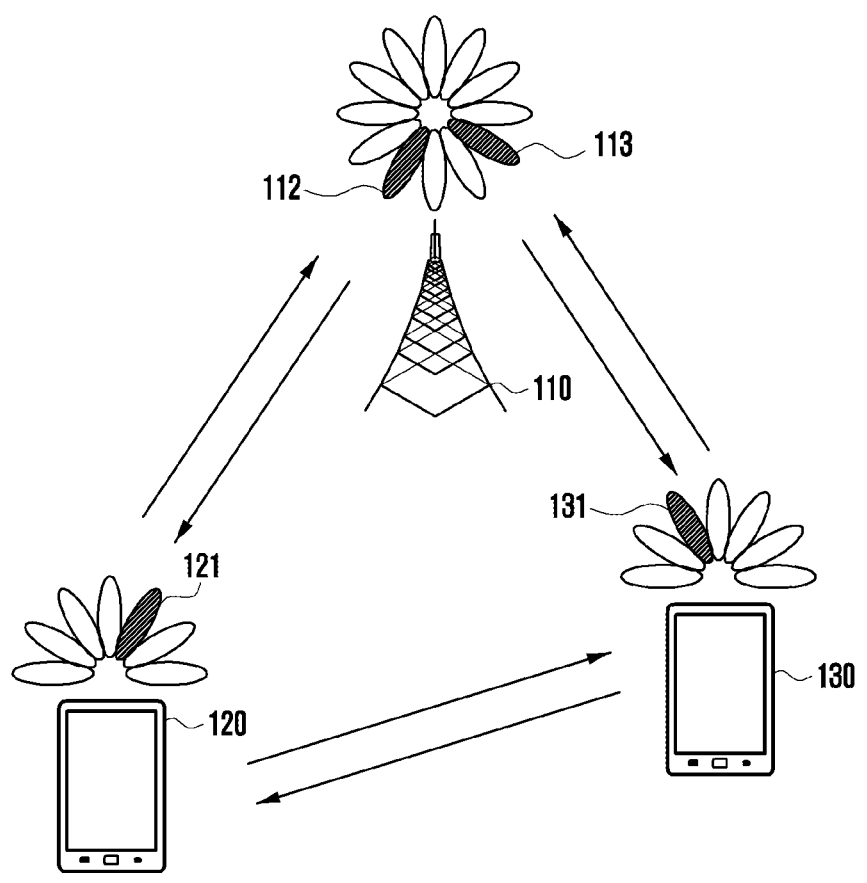
FIG. 1 illustrates an example wireless communication system according to various embodiments.

FIG. 1 illustrates an example wireless communication system according to various embodiments. FIG. 1 illustrates a base station 110, a terminal 120, and a terminal 130 as various nodes using a radio channel in a wireless communication system. FIG. 1 illustrates only one base station, but other base stations identical to or similar to the base station 110 may be further included.

The base station 110 is a network infrastructure that provides wireless access to the terminals 120 and 130. The base station 110 has coverage defined as a certain geographical area based on a distance for transmitting signals. The base station 110 may, for example, be referred to as an 'access point (AP)', 'eNodeB (eNB)', '5th generation node (5G node)', 'wireless point', 'transmission/reception point (TRP)', or as another term having an equivalent technical meaning.

Each of the terminal 120 and the terminal 130 may, for example, be a device used by a user and communicates with the base station 110 through a radio channel. In various cases, at least one of the terminal 120 or the terminal 130 may be operated without user involvement. For example, in a case that at least one of the terminal 120 or the terminal 130 is a device that performs machine type communication (MTC), the terminal 120 or the terminal 130 may not be carried by the user. Each of the terminal 120 and terminal 130 may, for example, be referred to as a 'user equipment (UE)', 'mobile station', 'subscriber station', 'remote terminal', 'wireless terminal', 'user device', or as other terms having an equivalent technical meaning.

The base station 110, the UE 120, and the UE 130 may transmit and receive wireless signals in a mmWave band (e.g., 28 GHz, 30 GHz, 38 GHz, and 60 GHz). In this case, in order to improve a channel gain, the base station 110, the UE 120, and the UE 130 may perform beamforming. Here, beamforming may include transmission beamforming and reception beamforming. That is, the base station 110, the UE 120, and the UE 130 may assign directivity to a transmitted signal or a received signal. To this end, the base station 110 and the UEs 120 and 130 may select serving beams 112, 113, 121, and 131 through a beam search or beam management procedure. After the serving beams 112, 113, 121, and 131 are selected, subsequent communication may be performed through a resource in a quasi co-located (QCL) relationship with a resource transmitting the serving beams 112, 113, 121, and 131.

When large-scale characteristics of a channel carrying a symbol on a first antenna port may be inferred from the channel carrying a symbol on a second antenna port, it may be evaluated that the first antenna port and the second antenna port are in a QCL relationship. For example, large-scale characteristics may include at least one of delay spread, Doppler spread, Doppler shift, average gain, average delay, or spatial receiver parameter.

Figure 2:
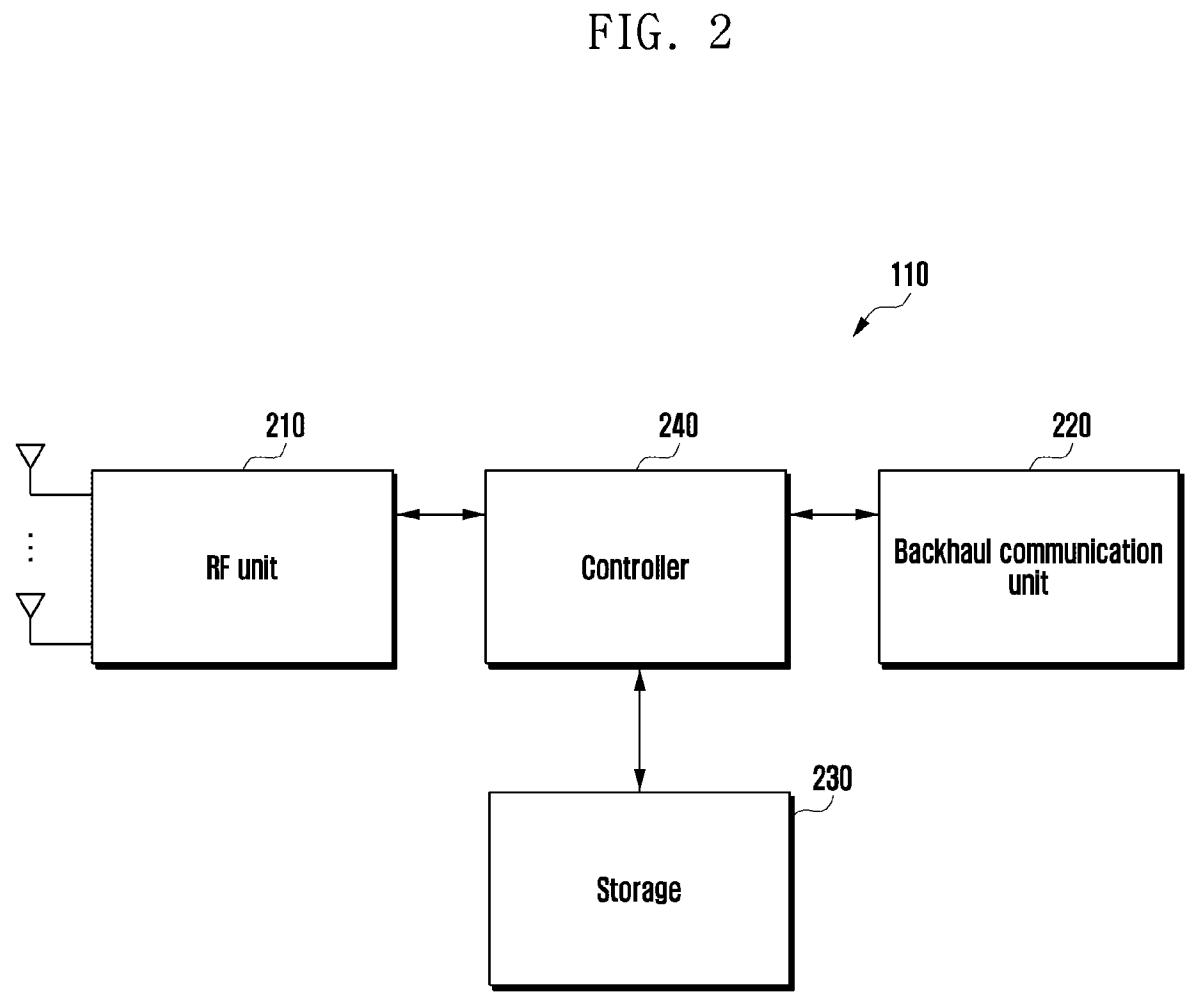

FIG. 2 is a block diagram illustrating an example base station in a wireless communication system according to various embodiments. The constitution illustrated in FIG. 2 may, for example, be a constitution of the base station 110. Terms such as ' . . . unit' and ' . . . device' used below may, for example, refer to a unit that processes at least one function or operation, which may be implemented into hardware or software, or a combination of hardware and software.

With reference to FIG. 2, the base station includes a RF unit 210, a backhaul communication unit 220, a storage 230, and a controller 240.

The RF unit 210 (e.g., including RF circuitry) performs functions for transmitting and receiving signals through a wireless channel. For example, the RF unit 210 may perform a transform function between a baseband signal and a bit string according to the physical layer standard of a system. For example, when transmitting data, the RE unit 210 may generate complex symbols by encoding and modulating a transmission bit string. Further, when receiving data, the RF unit 210 may restore a received bit string by demodulating and decoding a baseband signal.

Further, the RE unit 210 up-converts a baseband signal into a radio frequency (RF) band signal, transmits the signal through an antenna, and down-converts the RF band signal received through the antenna into a baseband signal. To this end, the RF unit 210 may, for example, include a transmission filter, reception filter, amplifier, mixer, oscillator, digital to analog converter (DAC), analog to digital converter (ADC), and the like. Further, the RF unit 210 may include a plurality of transmission and reception paths. Furthermore, the RF unit 210 may include at least one antenna array including a plurality of antenna elements.

In terms of hardware, the RF unit 210 may include a digital unit and an analog unit, and the analog unit may include a plurality of sub-units according to operating power, operating frequency, and the like. The digital unit may be implemented as at least one processor (e.g., digital signal processor (DSP)).

The RF unit 210 transmits and receives signals, as described above. Accordingly, all or part of the RF unit 210 may be referred to as a 'transmitter', 'receiver', or 'transceiver'. Further, in the following description, transmission and reception performed through a wireless channel may refer, by way of example without limitation, to the above-described processing performed by the RF unit 210. In various embodiments, the RF unit 210 may perform functions for transmitting and receiving signals using wired communication.

The backhaul communication unit 220 (e.g., including backhaul communication circuitry) provides an interface for communicating with other nodes in the network. That is, the backhaul communication unit 220 converts a bit string transmitted from a base station to another node, for example, another access node, another base station, an upper node, and/or a core network, into a physical signal and converts a physical signal received from another node into a bit string.

The storage 230 stores data such as a basic program, application program, and configuration information for operation of the base station. The storage 230 may include a volatile memory, non-volatile memory, or a combination of a volatile memory and a non-volatile memory. The storage 230 provides stored data according to the request of the controller 240.

The controller 240 (e.g., including controller circuitry) controls overall operations of the base station. For example, the controller 240 may transmit and receive signals through the RF unit 210 or the backhaul communication unit 220. Further, the controller 240 writes data to the storage 230 and reads data from the storage 230. The controller 240 may perform functions of a protocol stack required by communication standards. According to an example embodiment, the protocol stack may be included in the RF unit 210. To this end, the controller 240 may include at least one processor.

According to an embodiment, the controller 240 may transmit and receive control information to and from the UE 120. For example, the controller 240 may control the base station to perform operations according to an embodiment described below.

Figure 3:
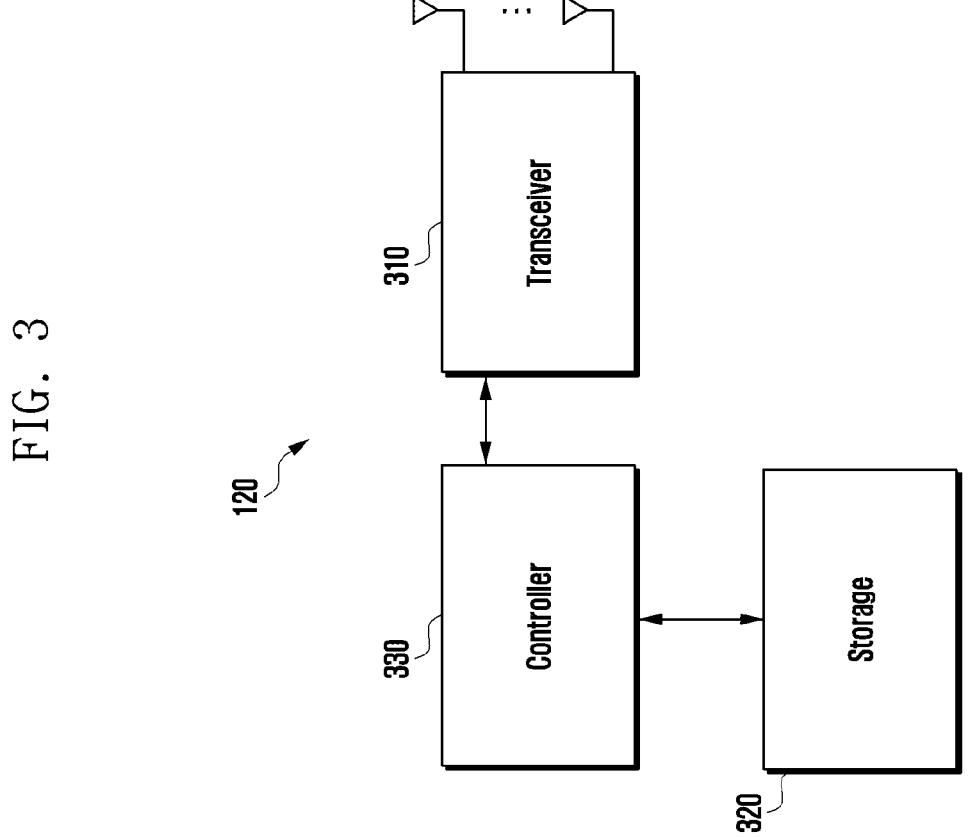
FIG. 3 is a block diagram illustrating an example terminal in a wireless communication system according to various embodiments.

FIG. 3 is a block diagram illustrating an example UE in a wireless communication system according to various embodiments. The constitution illustrated in FIG. 3 may, for example, be a constitution of the UE 120. Terms such as ' . . . unit' and ' . . . device' used below may, for example, refer to a unit that processes at least one function or operation, which may be implemented into hardware or software, or a combination of hardware and software.

With reference to FIG. 3, the UE includes a transceiver 310, a storage 320, and a controller 330.

The transceiver 310 performs functions for transmitting and receiving signals through a wireless channel. For example, the transceiver 310 may perform a transform function between a baseband signal and a bit string according to the physical layer standard of the system. For example, when transmitting data, the transceiver 310 may generate complex symbols by encoding and modulating a transmission bit string. Further, when receiving data, the transceiver 310 may restore a received bit string by demodulating and decoding a baseband signal. Further, the transceiver 310 up-converts the baseband signal into an RF band signal, transmits the signal through an antenna, and down-converts the RF band signal received through the antenna into a baseband signal. For example, the transceiver 310 may include a transmission filter, reception filter, amplifier, mixer, oscillator, DAC, and ADC.

Further, the transceiver 310 may include a plurality of transmission and reception paths. Furthermore, the transceiver 310 may include at least one antenna array including a plurality of antenna elements. In terms of hardware, the transceiver 310 may include a digital circuit and an analog circuit (e.g., radio frequency integrated circuit (RFIC)). Here, the digital circuit and the analog circuit may be implemented into one package. Further, the transceiver 310 may include a plurality of RF chains. Furthermore, the transceiver 310 may perform beamforming.

Further, in order to process signals of different frequency bands, the transceiver 310 may include different communication modules. Furthermore, in order to support a plurality of different wireless access technologies, the transceiver 310 may include a plurality of communication modules. For example, different radio access technologies may include Bluetooth low energy (BLE), wireless fidelity (Wi-Fi), WiFi Gigabyte (WiGig), cellular network (e.g., long term evolution (LTE)), and the like. Further, different frequency bands may include a super high frequency (SHF) (e.g., 2.5 GHz, 5 Ghz) band and a millimeter wave (e.g., 60 GHz) band.

The transceiver 310 transmits and receives signals, as described above. Accordingly, all or part of the transceiver 310 may be referred to as a 'transmitter', a 'receiver', or a 'transceiver'. Further, in the following description, transmission and reception performed through a radio channel may refer, by way of example without limitation, to the above-described processing performed by the transceiver 310. In various embodiments, the transceiver 310 may perform functions for transmitting and receiving signals using wired communication.

The storage 320 stores data such as a basic program, an application program, and configuration information for operation of the UE. The storage 320 may include a volatile memory, a non-volatile memory, or a combination of a volatile memory and a non-volatile memory. The storage 320 provides stored data according to the request of the controller 330.

The controller 330 (e.g., including controller circuitry) controls overall operations of the LUE. For example, the controller 330 may transmit and receive signals through the transceiver 310. Further, the controller 330 writes data to and reads data from the storage 320. The controller 330 may perform functions of a protocol stack required by the communication standards. To this end, the controller 330 may include at least one processor or microprocessor or may be a part of the processor. Further, a part of the transceiver 310 and the controller 330 may, for example, be referred to as a communication processor (CP).

According to an embodiment, the controller 330 may transmit and receive control information to and from the base station 110. For example, the controller 330 may control the UE to perform operations according to an embodiment described below.

Figure 4A:
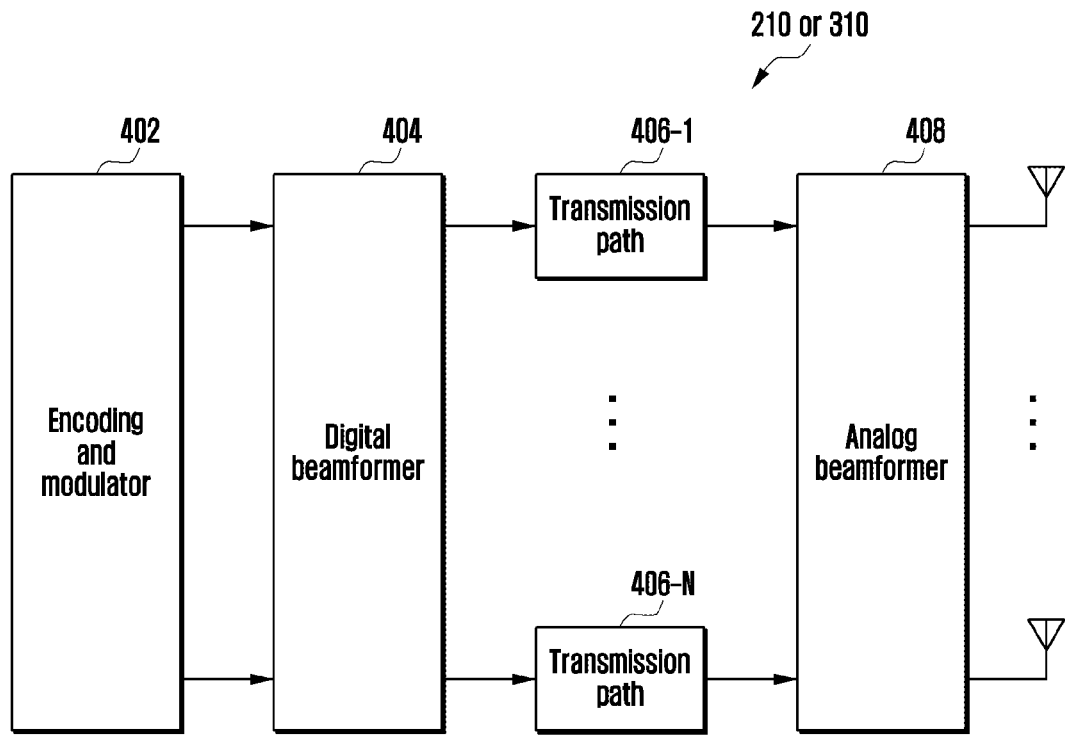
FIG. 4A is a block diagram illustrating an example transceiver in a wireless communication system according to various embodiments.
Figure 4B:
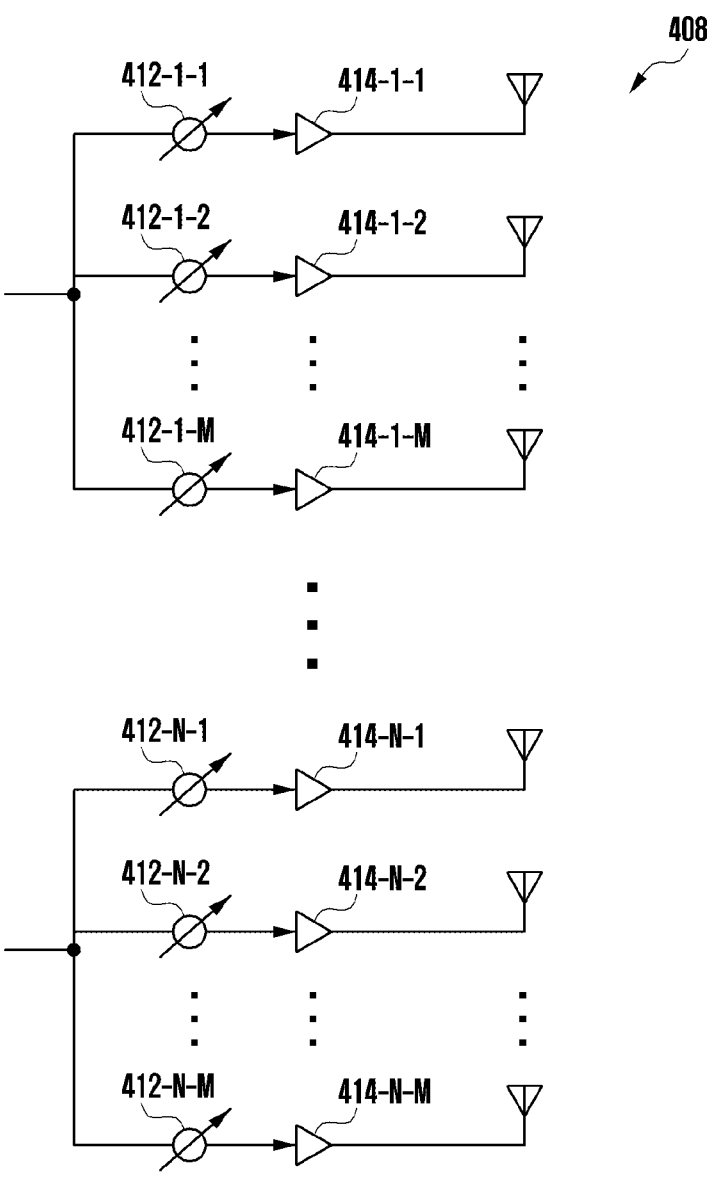
FIG. 4B is a diagram illustrating an example analog beamformer of a transceiver in a wireless communication system according to various embodiments.
Figure 4C:
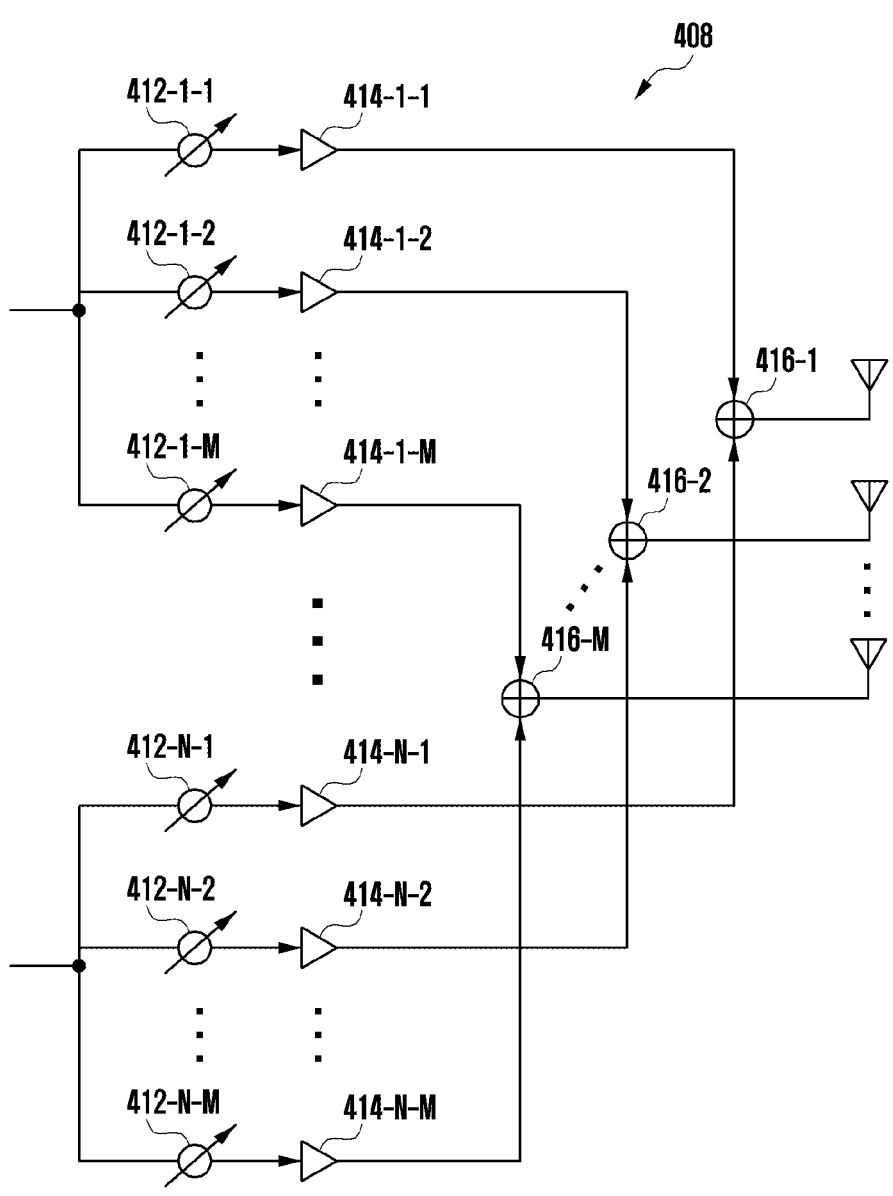
FIG. 4C is a diagram illustrating an example analog beamformer of a transceiver in a wireless communication system according to various embodiments.

FIGS. 4A, 4B, and 4C are diagrams illustrating an example transceiver in a wireless communication system according to various embodiments. FIGS. 4A, 4B, and 4C illustrate examples of a detailed constitution of the RF unit 210 of FIG. 2 or the transceiver 310 of FIG. 3. Specifically, FIGS. 4A, 4B, and 4C illustrate components for performing beamforming as part of the RF unit 210 of FIG. 2 or the transceiver 310 of FIG. 3.

With reference to FIG. 4A, the RF unit 210 or transceiver 310 includes an encoder and modulator 402, a digital beamformer 404, a plurality of transmission paths 406-1 to 406-N, and an analog beamformer 408.

The encoder and modulator 402 performs channel encoding. For channel encoding, at least one of a low density parity check (LDPC) code, a convolution code, or a polar code may be used. The encoder and modulator 402 performs constellation mapping to generate modulation symbols.

The digital beamformer 404 performs beamforming on digital signals (e.g., modulation symbols). To this end, the digital beamformer 404 multiplies modulation symbols by beamforming weights. Here, beamforming weights are used for changing a magnitude and phase of a signal, and may be referred to as a 'precoding matrix' or a 'precoder'. The digital beamformer 404 outputs digital beamformed modulation symbols to the plurality of transmission paths 406-1 to 406-N. In this case, according to a multiple input multiple output (MIMO) transmission technique, modulation symbols may be multiplexed or the same modulation symbols may be provided to the plurality of transmission paths 406-1 to 406-N.

The plurality of transmission paths 406-1 to 406-N convert digital beamformed digital signals to analog signals. To this end, each of the plurality of transmission paths 406-1 to 406-N may, for example, include an inverse fast Fourier transform (IFFT) operator, a cyclic prefix (CP) inserter, a DAC, and an up-converter. The CP inserter is for an orthogonal frequency division multiplexing (OFDM) method, and may be excluded in the case that another physical layer method (e.g., filter bank multi-carrier (FBMC)) is applied. That is, the plurality of transmission paths 406-1 to 406-N provide independent signal processing processes for a plurality of streams generated through digital beamforming. However, according to an example embodiment, some of the components of the plurality of transmission paths 406-1 to 406-N may be used in common.

The analog beamformer 408 performs beamforming on an analog signal. To this end, the analog beamformer 408 multiplies analog signals by beamforming weights. Here, beamforming weights are used for changing a magnitude and phase of a signal. Specifically, the analog beamformer 408 may, for example, be configured, as illustrated in FIG. 4B or 4C according to a connection structure between the plurality of transmission paths 406-1 to 406-N and antennas.

With reference to FIG. 4B, signals input to the analog beamformer 408 are transmitted through antennas after undergoing phase/magnitude transform and amplification operations. In this case, a signal of each path is transmitted through different antenna sets, that is, antenna arrays. In describing processing of signals input through a first path, the signals are converted into signal sequences having different or identical phases/magnitudes by phase/magnitude converters 412-1-1 to 412-1-M, and are amplified by amplifiers 414-1-1 to 414-1-M and then transmitted through the antennas. In describing processing of signals input through an N-th path, the signals are converted into signal sequences having different or identical phases/magnitudes by phase/magnitude converters 412-N-1 to 412-N-M, and are amplified by amplifiers 414-N-1 to 414-N-M and then transmitted through the antennas.

With reference to FIG. 4C, signals input to the analog beamformer 408 are transmitted through antennas after undergoing phase/magnitude transform and amplification operations. In this case, a signal of each path is transmitted through the same antenna set, that is, an antenna array. In describing processing of signals input through a first path, the signals are converted into signal sequences having different or identical phases/magnitudes by the phase/magnitude converters 412-1-1 to 412-1-M and are amplified by the amplifiers 414-1-1 to 414-1-M. In describing processing of signals input through an N-th path, the signals are converted into signal sequences having different or identical phases/magnitudes by the phase/magnitude converters 412-N-1 to 412-N-M and are amplified by the amplifiers 414-N-1 to 414-N-M. Signals amplified to be transmitted through one antenna array are added by summing units 416-1-1 to 416-1-M based on the antenna element and then transmitted through the antennas.

FIG. 4B illustrates an example in which an independent antenna array is used for each transmission path, and FIG. 4C illustrates an example in which transmission paths share one antenna array. However, according to various embodiments, some transmission paths may use independent antenna arrays, and other transmission paths may share one antenna array. Furthermore, according to various embodiments, by applying a switchable structure between transmission paths and antenna arrays, a structure that may be adaptively changed according to circumstances may be used.

In a long term evolution (LTE) system, which is an example of a broadband wireless communication system, a downlink uses an orthogonal frequency division multiplexing (OFDM) method, and an uplink uses a single carrier frequency division multiple access (SC-FDMA) method. The above-described multiple access method allocates and operates time-frequency resources for transmitting data or control information for each user so that they do not overlap each other, that is, so that orthogonality is established, thereby distinguishing data or control information for each user.

Figure 5:
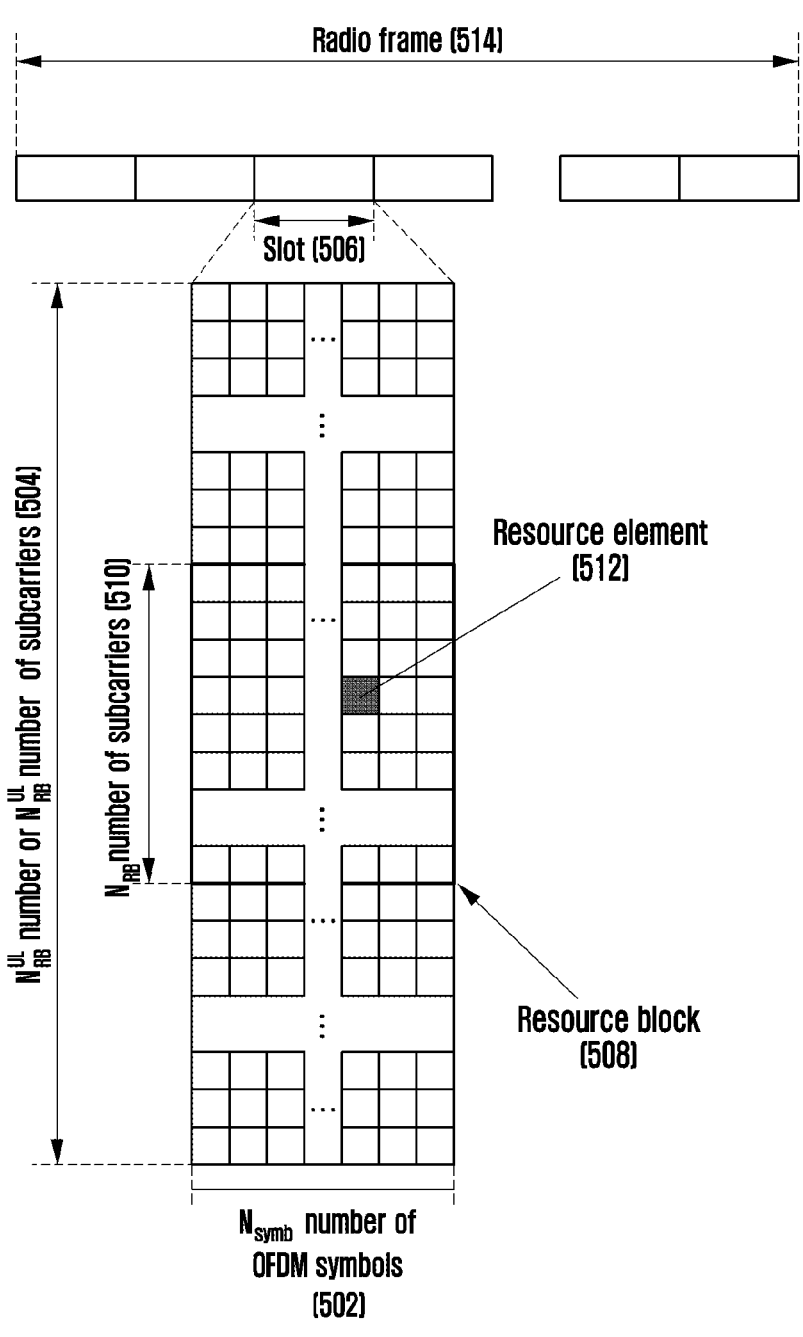
FIG. 5 is a diagram illustrating an example resource structure of a time-frequency domain in a wireless communication system according to various embodiments.

FIG. 5 is a diagram illustrating an example resource structure of a time-frequency domain in a wireless communication system according to various embodiments. FIG. 5 illustrates a basic structure of a time-frequency domain, which is a radio resource domain in which data or a control channel is transmitted in a downlink or an uplink.

In FIG. 5, a horizontal axis represents a time domain, and a vertical axis represents a frequency domain. A minimum transmission unit in the time domain is an OFDM symbol, and the $N_{symb}$ number of OFDM symbols 502 are gathered to form one slot 506. A length of a subframe is defined as 1 ms, and a length of a radio frame 514 is defined as 10 ms. A minimum transmission unit in the frequency domain is a subcarrier, and a bandwidth of an entire system transmission band is composed of the total $N_{BW}$ number of subcarriers 504. Specific values such as $N_{symb}$ and $N_{BW}$ may be applied variably according to the system.

A basic unit of resources in the time-frequency domain is a resource element (hereinafter, referred to as a 'RE') 512, which may be represented by an OFDM symbol index and a subcarrier index. A resource block (RB or physical resource block, hereinafter 'PRB') 508 is defined as the $N_{symb}$ number of consecutive OFDM symbols 502 in the time domain and the $N_{RB}$ number of consecutive subcarriers 510 in the frequency domain. Accordingly, one RB 508 includes the $N_{symb} \times N_{RB}$ number of REs 512. In general, the minimum transmission unit of data is an RB. In an NR system, in general, $N_{symb}=14$ and $N_{RB}=12$, and $N_{BW}$ and $N_{RB}$ are proportional to a bandwidth of a system transmission band. A data rate may increase in proportion to the number of RBs scheduled to the UE. In the NR system, in a case of a frequency division duplex (FDD) system in which a downlink and an uplink are divided by frequencies and operated, a downlink transmission bandwidth and an uplink transmission bandwidth may be different from each other. The channel bandwidth represents a radio frequency (RF) bandwidth corresponding to a system transmission bandwidth. [Table 1] and [Table 2] represent part of a correspondence relationship between a system transmission bandwidth defined in an NR system in a frequency band lower than 6 GHz and a frequency band higher than 6 GHz, subcarrier spacing (SCS), and channel bandwidth. For example, in an NR system having a channel bandwidth of 100 MHz with subcarrier spacing of 30 kHz, a transmission bandwidth includes 273 RBs. In [Table 1] and [Table 2], N/A may be a bandwidth-subcarrier combination not supported by the NR system.

TABLE 1

| Channel bandwidth [MHz] | SCS | 5 | 10 | 20 | 50 | 80 | 100 |
|---|---|---|---|---|---|---|---|
| Transmission bandwidth constitution ($N_{RB}$) | 15 kHz | 25 | 52 | 106 | 207 | N/A | N/A |
| | 30 kHz | 11 | 24 | 51 | 133 | 217 | 273 |
| | 60 kHz | N/A | 11 | 24 | 65 | 107 | 135 |

TABLE 2

| Channel bandwidth [MHz] | SCS | 50 | 100 | 200 | 400 |
|---|---|---|---|---|---|
| Transmission bandwidth constitution ($N_{RB}$) | 60 kHz | 66 | 132 | 264 | N/A |
| | 120 kHz | 32 | 66 | 132 | 264 |

In the NR system, scheduling information on downlink data or uplink data is transmitted from the base station to the UE through downlink control information (hereinafter, DCI). The DCI is defined in various formats, and whether it is an uplink grant, which is scheduling information on uplink data, or a downlink grant, which is scheduling information on downlink data, and whether it is compact DCI having the small size of control information, whether spatial multiplexing using multiple antennas is applied, whether it is DCI for power control, and the like may be determined according to each format. For example, a DCI format 1-1, which is scheduling control information on downlink data, may include at least one of items illustrated in [Table 3].

TABLE 3

| Item | Contents |
|---|---|
| Carrier indicator | Indicate on which frequency carrier it is transmitted. |
| DCI format indicator | Indicator for distinguishing whether the corresponding DCI is for downlink or uplink. |
| BWP (bandwidth part) indicator | Indicate which BWP it is transmitted from |
| Frequency domain resource allocation | Indicate RB of frequency domain allocated for data transmission. The resource to be expressed is determined according to a system bandwidth and resource allocation method. |
| Time domain resource allocation | Indicate in which OFDM symbol of which slot a data related channel will be transmitted |
| VRB-to-PRB mapping | Indicate a method of mapping a virtual RB (VRB) index and a physical RB (PRB) index |
| MCS (modulation and coding scheme) | Indicate a modulation method and coding rate used for data transmission. That is, a coding rate value capable of indicating TBS and channel coding information may be indicated together with information on whether it is QPSK, 16 QAM, 64 QAM, or 256 QAM. |
| CBG (codeblock group) transmission information | Indicate information on which CBG is transmitted in the case that CBG retransmission is configured |
| HARQ process number | Indicate HARQ process number |
| NDI (new data indicator) | Indicate whether HARQ initial transmission or retransmission |
| RV (redundancy version) | Indicate redundancy version of HARQ |
| TPC (transmit power control command) for PUCCH (physical uplink control channel) | Indicate a transmit power control command for a PUCCH, which is an uplink control channel |

In [Table 3], in a case of physical downlink shared channel (PDSCH) transmission, time domain resource assignment may be expressed by information on a slot to which the PDSCH is transmitted, a start symbol position S in the corresponding slot, and a symbol number L to which the PDSCH is mapped. Here, S may be a relative position from the start of the slot, L may be the number of consecutive symbols, and S and L may be determined from a start and length indicator value (SLIV) defined as follows.

if (L-1)≤7 then
        SLIV=14·(L−1)+S
    else
        SLIV=14·(14−L+11)+(14−1−S)
    where 0<L≤14−S In an NR system, in general, through a radio resource control (RRC) configuration, information on a correspondence relationship between information on an SLIV value in one row, a PDSCH or physical uplink shared channel (PUSCH) mapping type, and a slot to which a PDSCH or a PUSCH is transmitted may be constituted or configured. Thereafter, by indicating an index value defined in the correspondence relationship constituted using time domain resource allocation of DCI, the base station may transmit information on an SLIV value, a PDSCH or PUSCH mapping type, and a slot to which the PDSCH or PUSCH is transmitted to the UE.

In a case of an NR system, a PDSCH or PUSCH mapping type is defined as a type A and a type B. In a case of a PDSCH or PUSCH mapping type A, a demodulation reference signal (DMRS) symbol starts at a second or third OFDM symbol in a slot. In a case of a PDSCH or PUSCH mapping type B, a DMRS symbol starts from a first OFDM symbol of time domain resources assigned by PUSCH transmission.

DCI may be transmitted through a physical downlink control channel (PDCCH), which is a downlink control channel through channel coding and modulation. In the disclosure, the PDCCH may, for example, be used for indicating control information itself rather than a channel. In general, DCI is scrambled independently using a specific radio network temporary identifier (RNTI) or UE identifier for each UE, and after a cyclic redundancy check (CRC) is added and a channel is coded, each DCI is formed as an independent PDCCH and transmitted. The PDCCH is mapped to a control resource set (CORESET) configured to the UE.

Downlink data may be transmitted through a PDSCH, which is a physical channel for downlink data transmission. The PDSCH may be transmitted after a control channel transmission section, and scheduling information such as a specific mapping position in the frequency domain and a modulation scheme is indicated by DCI transmitted through a PDCCH. Through the MCS among constitution control information included in the DCI, the base station may notify the UE of a target code rate and a modulation method applied to the PDSCH to be transmitted to the UE, or a size of data (e.g., transport block size (TBS)) to be transmitted. In an embodiment, the MCS may include 5 bits or more or less bits. The TBS corresponds to the size before channel coding for error correction is applied to a transport block (TB), which is data to be transmitted by a base station.

In the disclosure, a transport block (TB) may, for example, include a medium access control (MAC) header, a MAC control element (MAC CE), one or more MAC service data units (SDUs), and padding bits. Alternatively, the TB may indicate a unit of data transmitted (or submitted) from the MAC layer to a physical layer or a MAC protocol data unit (PDU).

Modulation schemes supported by the NR system are quadrature phase shift keying (QPSK), 16 quadrature amplitude modulation (QAM), 64 QAM, and 256 QAM, and each modulation order (Qm) may be 2, 4, 6 or 8. That is, in a case of QPSK, 2 bits per symbol may be transmitted, in a case of 16 QAM, 4 bits per symbol may be transmitted, in a case of 64 QAM, 6 bits per symbol may be transmitted, in a case of 256 QAM, 8 bits per symbol may be transmitted, and in a case that 1024 QAM is to be supported, 10 bits per symbol of 1024 QAM may be mapped and transmitted.

Figure 6A:
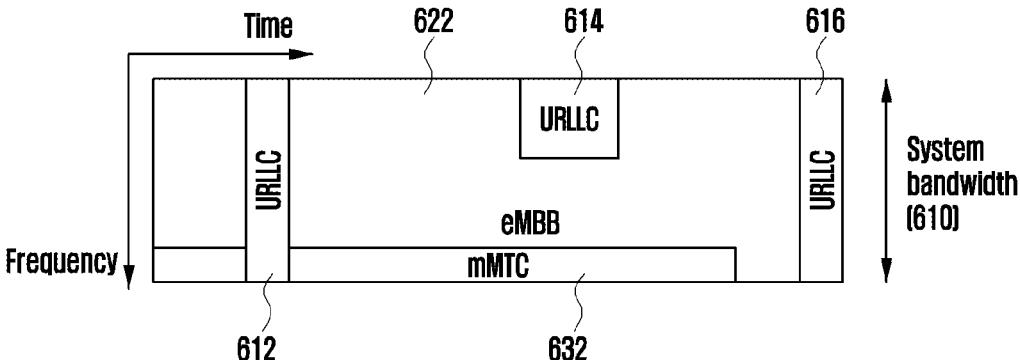
FIG. 6A is a diagram illustrating an example of allocating data for each service to frequency-time resources in a wireless communication system according to various embodiments.
Figure 6B:
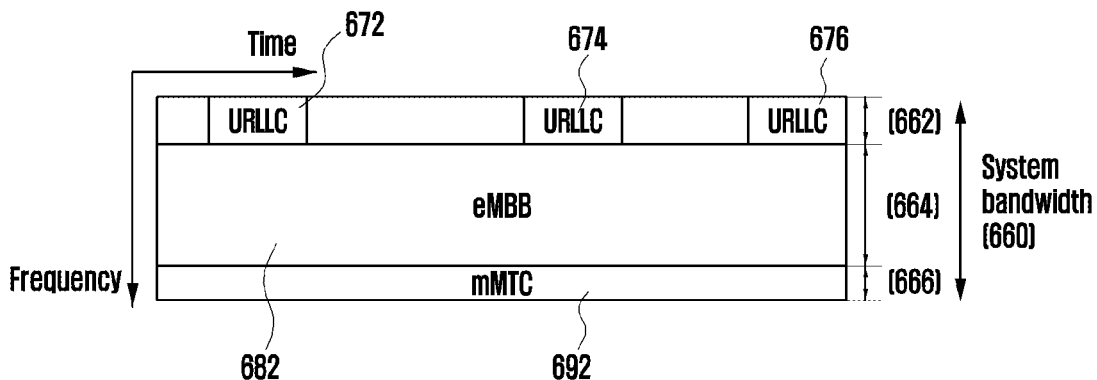
FIG. 6B is a diagram illustrating an example of allocating data for each service to frequency-time resources in a wireless communication system according to various embodiments.

In terms of services, the NR system is designed to enable various services to be freely multiplexed in time and frequency resources, and accordingly, waveform/numerology, reference signals, and the like may be dynamically or freely adjusted, as needed. In order to provide optimal services to UEs in wireless communication, optimized data transmission through measurement of an interference amount and a channel quality is important, and accordingly, accurate channel state measurement is important. However, unlike 4G communication in which channel and interference characteristics do not vary greatly according to frequency resources, in the case of 5G channels, because channel and interference characteristics vary greatly according to a service, it is necessary to support a frequency resource group (FRG)-level subset that can divide and measure channel and interference characteristics. The NR system may classify a type of support services into an enhanced mobile broadband (eMBB), massive machine type communications (mMTC), and ultra-reliable and low-latency communications (URLLC). The eMBB is, for example, a service that aims for high-speed transmission of high-capacity data, the mMTC is, for example, a service that aims for UE power minimization and access to multiple UEs, and the URLLC is, for example, a service that aims for high reliability and low latency. Different requirements may be applied according to a type of a service applied to the UE. Examples of resource distribution of each service are illustrated in FIGS. 6A and 6B. With reference to FIGS. 6A and 6B, a method of allocating frequency and time resources for information transmission in each system is illustrated.

FIG. 6A illustrates an example of allocating data for each service to frequency-time resources in a wireless communication system according to various embodiments.

With reference to FIG. 6A, resources are assigned for an eMBB 622, URLLC 612, 614, and 616, and mMTC 632 in an entire system frequency band 610. In a case that URLLC 612, 614, and 616 data are generated while eMBB 622 data and mMTC 632 data are assigned and transmitted in a specific frequency band, URLLC 612, 614, and 616 data may be transmitted by emptying an already assigned portion for the eMBB 622 and the mMTC 632 or not transmitting the eMBB 622 data and the mMTC 632 data. Because URLLC requires reduction of a delay time, a resource for transmitting the URLLC 612, 614, and 616 data may be assigned to a portion of resources assigned to the eMBB 622. In a case that the URLLCs 612, 614, and 616 are additionally assigned and transmitted to resources to which the eMBB 622 is assigned, the eMBB 622 data may not be transmitted in overlapping frequency-time resources, and a transmission performance of the eMBB 622 data may be lowered. That is, in this case, a transmission failure of the eMBB 622 data may occur due to allocation of resources for the URLLCs 612, 614, and 616. A scheme illustrated in FIG. 6A may be referred to as a preemption scheme.

FIG. 6B illustrates another example of allocating data for each service to frequency-time resources in a wireless communication system according to various embodiments.

FIG. 6B illustrates an example in which each service is provided in each of subbands 662, 664, and 666 in which an entire system frequency band 660 is divided.

Specifically, the subband 662 may be used for URLLC 672, 674, and 676 data transmission, the subband 664 may be used for eMBB 682 data transmission, and the subband 666 may be used for mMTC 692 data transmission. Information related to a configuration of the subbands 662, 664, and 666 may be determined in advance or may be transmitted from the base station to the UE through upper signaling. Alternatively, the base station or the network node may arbitrarily divide the subbands 662, 664, and 666 and The above-described control resource set in 5G may be configured by the base station to the U E through higher layer signaling (e.g., system information, master information block (MIB), radio resource control (RRC) signaling). Configuring a control resource set to the UE refers, for example, to providing information such as a control resource set identity, a frequency position of the control resource set, and a symbol length of the control resource set. For example, information provided to configure a control resource set is as follows.

```
ControlResourceSet ::=                     SEQUENCE {
    -- Corresponds to L1 parameter 'CORESET-ID'
    controlResourceSetId                   ControlResourceSetId,
    frequency DomainResources              BIT STRING (SIZE (45)),
    duration                               INTEGER (1..maxCoReSetDuration),
    cce-REG-MappingType                       CHOICE {
        interleaved                           SEQUENCE {
            reg-BundleSize                       ENUMERATED {n2, n3, n6},
            precoderGranulanty                   ENUMERATED {sameAsREG-bundle,
        allContiguousRBs},
            interleaverSize                      ENUMERATED {n2, n3, n6}
            shiftIndex
            INTEGER(0..maxNrofPhysicalResourceBlocks-1)
            OPTIONAL
            },
        nonInterleaved                        NULL
    },
    tci-StatesPDCCH                           SEQUENCE(SIZE (1..maxNrofTCI-StatesPDCCH))
        OF TCI-StateId                     OPTIONAL,
    tci-PresentInDCI                          ENUMERATED {enabled}
}
``` provide services without transmitting separate subband configuration information to the UE.

According to an embodiment, a length of a transmission time interval (TTI) used for URLLC transmission may be shorter than that of a TTI used for eMBB or mMTC transmission. Further, a response of information related to URLLC may be transmitted faster than eMBB or mMTC; thus, a UE using a URLLC service may transmit and receive information with a low delay. Structures of physical layer channels used for each type in order to transmit the above three services or data may be different from each other. For example, at least one of a TTI length, a frequency resource allocation unit, a control channel structure, or a data mapping method may be different from each other. Although the above three services and three data types have been described, more types of services and corresponding data types may exist. Even in this case, various embodiments described below may be implemented.

Figure 6C:
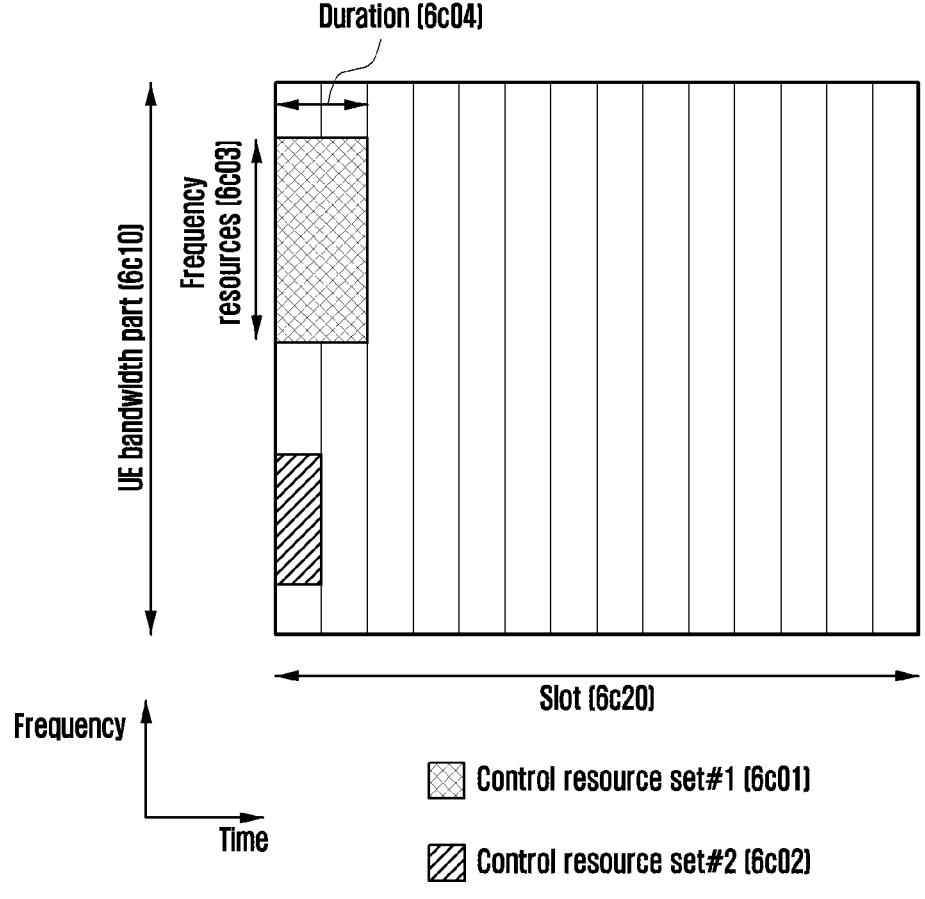
FIG. 6C is a diagram illustrating an example of a control resource set (CORESET) through which a downlink control channel is transmitted in a wireless communication system according to various embodiments.

FIG. 6C illustrates an example of a control resource set (CORESET) to which a downlink control channel is transmitted in a wireless communication system according to various embodiments. FIG. 6C is a diagram illustrating an example in which a UE bandwidth part 6c10 is configured on the frequency axis and in which two control resource sets (control resource set #1, 6c01, and control resource set #2, 6c02) are configured within one slot 6c0 on the time axis. The control resource sets 6c01 and 6c02 may be configured to a specific frequency resource 6c03 within the entire UE bandwidth part 6c10 on the frequency axis. The time axis may be configured to one or a plurality of OFDM symbols, and this may be defined as control resource set duration 6c04. With reference to the illustrated example of FIG. 6C, the control resource set #1, 6c01 may be configured to control resource set duration of 2 symbols, and the control resource set #2, 6c02 may be configured to control resource set duration of 1 symbol.

In 5G, the control resource set may include $N_{RB}^{CORESET}$ RBs in the frequency domain and includes $N_{symb}^{CORESET} \in \{1,2,3\}$ symbols in the time axis. One CCE may include 6 REGs, and the REG may be defined as 1 RB for 1 OFDM symbol. Within one control resource set, REGs may be indexed in the time-first order, starting with a REG index 0 from a first OFDM symbol and a lowest RB of the control resource set.

5G supports an interleaved method and a non-interleaved method as a transmission method for a PDCCH. The base station may configure whether interleaving or non-interleaving transmission is performed for each control resource set to the UE through higher layer signaling. Interleaving may be performed in units of REG bundles. An REG bundle may, for example, refer to a set of one or multiple REGs. The UE may determine a CCE-to-REG mapping method in the corresponding control resource set in the following manner based on whether interleaving or non-interleaving transmission configured by the base station is performed.

Figure 6D:
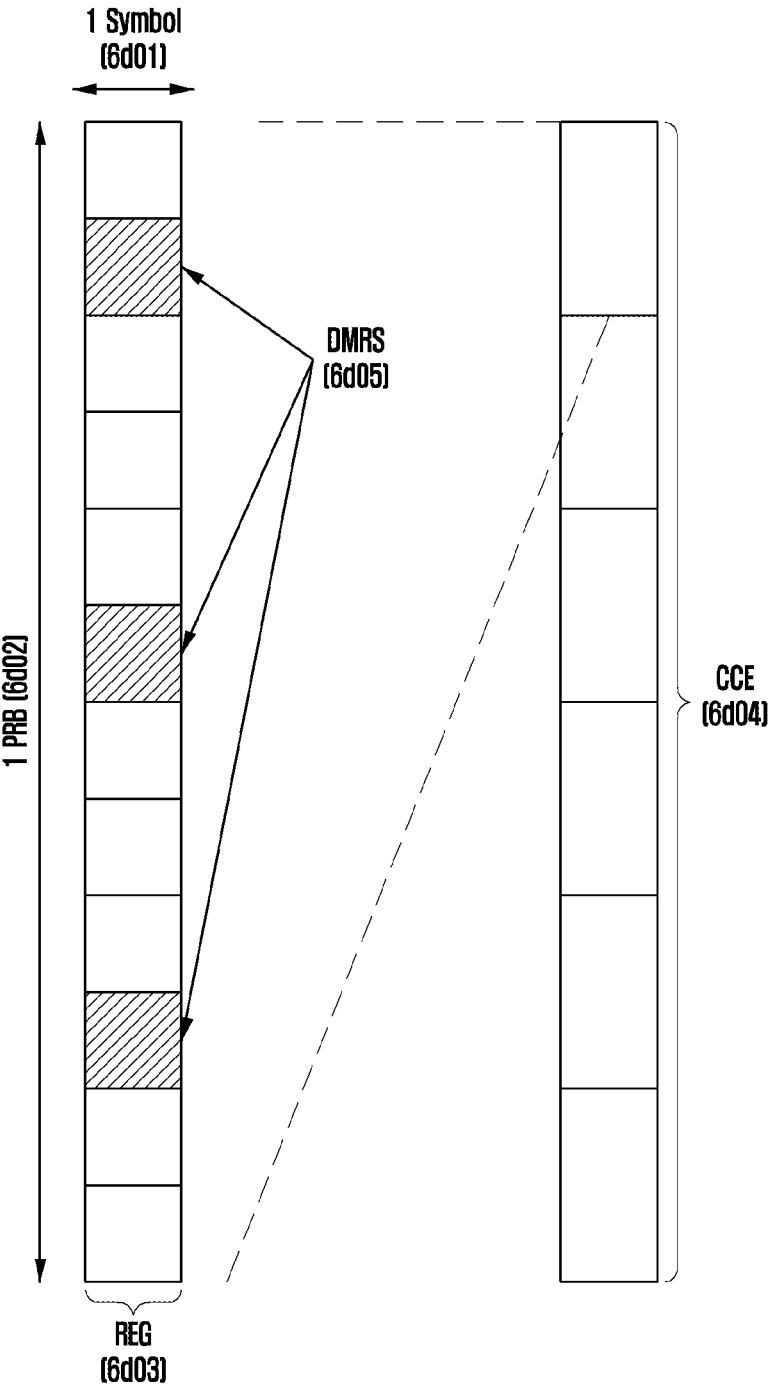
FIG. 6D is a diagram illustrating an example including both REs to which downlink control information (DCI) is mapped to a basic unit REG 6d03 of a downlink control channel and an area to which a DMRS 6d05, which is a reference signal for decoding the REs, is mapped according to various embodiments.

A basic unit, that is, a REG 6d03 of a downlink control channel illustrated in FIG. 6I), may include both REs to which DCI is mapped and an area to which a DMRS 6d05, which is a reference signal for decoding the REs, is mapped. As illustrated in FIG. 6D, three DMRSs 6d05 may be transmitted within one REG 6d03. The number of CCEs required to transmit a PDCCH may be 1, 2, 4, 8, or 16 according to an aggregation level (AL), and the numbers of different CCEs may be used for implementing link adaptation of the downlink control channel. For example, in the case that AL=L, one downlink control channel may be transmitted through the L number of CCEs. The UE should detect a signal without knowing information on a downlink control channel, and a search space representing a set of CCEs is defined for blind decoding. The search space may, for example, refer to a set of downlink control channel candidates including CCEs in which the UE should attempt to decode on a given aggregation level, and because there are various aggregations levels that make one group with 1, 2, 4, 8, and 16 CCEs, the UE may have a plurality of search spaces. A search space set may, for example, refer to a set of search spaces in all configured aggregation levels.

The search space may be classified into a common search space and a UE-specific search space. A certain group of

18 symbol unit within a slot for the search space, a search space type (common search space or UE-specific search space), a combination of a DCI format and an RNTI to be monitored in the corresponding search space, a control resource set index to monitor the search space, and the like to the UE. For example, a parameter for a search space for a PDCCH may include the following information.

```
SearchSpace ::=                              SEQUENCE {
    -- Identity of the search space. SearchSpaceId = 0 identifies the SearchSpace configured
       via PBCH (MIB) or ServingCellConfigCommon.
    searchSpaceId                            SearchSpaceId,
    controlResourceSetId                     ControlResourceSetId,
    monitoringSlotPeriodicityAndOffset       CHOICE {
        sl1                                  NULL,
        sl2                                  INTEGER (0..1),
        sl4                                  INTEGER (0..3),
        sl5                                  INTEGER (0..4),
        sl8                                  INTEGER (0..7),
        sl10                                 INTEGER (0..9),
        sl16                                 INTEGER (0..15),
        sl20                                 INTEGER (0..19).
        sl40                                 INTEGER (0..39),
        sl80                                 INTEGER (0..79),
        sl160                                INTEGER (0..159),
        sl320                                INTEGER (0..319),
        sl640                                INTEGER (0..639),
        sl1280                               INTEGER (0..1279),
        sl2560                               INTEGER (0..2559)
    }
    duration                   INTEGER (2..2559)
    monitoringSymbolsWithinSlot           BIT STRING (SIZE (14))
    nrofCandidates                        SEQUENCE {
        aggregationLevel1                 ENUMERATED {n0, n1, n2, n3, n4, n5, n6, n8},
        aggregationLevel2                 ENUMERATED {n0, n1, n2, n3, n4, n5, n6, n8},
        aggregationLevel4                 ENUMERATED {n0, n1, n2, n3, n4, n5, n6, n8},
        aggregationLevel8                 ENUMERATED {n0, n1, n2, n3, n4, n5, n6, n8},
        aggregationLevel16                ENUMERATED {n0, n1, n2, n3, n4, n5, n6, n8}
    },
    searchSpaceType                          CHOICE {
        -- Configures this search space as common search space (CSS) and DCI formats to monitor.
        common                               SEQUENCE {
}
        ue-Specific                          SEQUENCE {
            -- Indicates whether the UE monitors in this USS for DCI formats 0-0 and 1-0 or for
            formats 0-1 and 1-1.
            formats                          ENUMERATED { formats0-0-And-1-0,
            formats0-1-And-1-1},
            ...
        }
```

UEs or all UEs may search for a common search space of a PDCCH in order to receive cell-common control information such as dynamic scheduling for system information or a paging message. For example, PDSCH scheduling allocation information for transmission of a SIB including cell operator information may be received by searching for a common search space of a PDCCH. Because a certain group of UEs or all UEs should receive a PDCCH, a common search space may, for example, refer to a set of pre-promised CCEs. Scheduling assignment information for the UE-specific PDSCH or PUSCH may be received by searching for a UE-specific search space of the PDCCH. The UE-specific search space may, for example, be defined UE-specifically as a function of the identity of the UE and various system parameters.

In 5G, a parameter for a search space for a PDCCH may be configured from the base station to the UE through higher layer signaling (e.g., SIB, MIB, RRC signaling). For example, the base station may configure the number of PDCCH candidates at each aggregation level L, a monitoring period for the search space, a monitoring occasion of a According to configuration information, the base station may configure one or a plurality of search space sets to the UE. According to an embodiment, the base station may configure a search space set 1 and a search space set 2 to the UE. In the search space set 1, the UE may be configured to monitor a DCI format A scrambled with X-RNTI in a common search space, and in the search space set 2, the UE may be configured to monitor a DCI format B scrambled with Y-RNTI in a UE-specific search space.

According to configuration information, one or a plurality of search space sets may exist in a common search space or a UE-specific search space. For example, a search space set #1 and a search space set #2 may be configured as common search spaces, and a search space set #3 and a search space set #4 may be configured as UE-specific search spaces.

In the common search space, a combination of the following DCI format and RNTI may be monitored. The disclosure is not limited to the following examples. That is, the DCI format and the RNTI used for CRC scrambling may be combined in various ways.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI DCI format 2_4 with CRC scrambled by CI-RNTI DCI format 2_5 with CRC scrambled by AI-RNTI DCI format 2_6 with CRC scrambled by PS-RNTI In the UE-specific search space, a combination of the following DCI format and RNTI may be monitored. The disclosure is not limited to the following examples. That is, the DCI format and the RNTI used for CRC scrambling may be combined in various ways.

DCI format 0_0/1_0 with CRC scrambled by C-RNTI, CS-RNTI, TC-RNTI

DCI format 1_0/11 with CRC scrambled by C-RNTI, CS-RNTI, TC-RNTI

The specified RNTIs may follow the following definitions and uses.

C-RNTI (cell RNTI): Used for scheduling a UE-specific PDSCH

TC-RNTI (temporary cell RNTI): Used for scheduling a UE-specific PDSCH

CS-RNTI (configured scheduling RNTI): Used for scheduling a semi-statically configured UE-specific PDSCH RA-RNTI (random access RNTI): Used for scheduling a PDSCH in a random access step P-RNTI (paging RNTI): Used for scheduling a PDSCH to which paging is transmitted SI-RNTI (system information RNTI): Used for scheduling a PDSCH to which system information is transmitted INT-RNTI (interruption RNTI): Used for notifying whether puncturing for a PDSCH is performed TPC-PUSCH-RNTI (transmit power control for PUSCH RNTI): Used for indicating a power control command for a PUSCH TPC-PUCCH-RNTI (transmit power control for PUCCH RNTI): Used for indicating a power control command for a PUCCH TPC-SRS-RNTI (transmit power control for SRS RNTI): Used for indicating a power control command for an SRS CI-RNTI (cancellation indicator RNTI): Used for indicating PUSCH transmission cancellation AI-RNTI (availability indicator RNTI): Used for indicating whether soft resources are available PS-RNTI (power saving RNTI): Used for indicating a power consumption reduction command in a DRX inactive section The aforementioned specified DCI formats may follow the definition of [Table 4].

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

TABLE 4-continued

| DCI format | Usage |
|---|---|
| 2_4 | Notifying the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |

In 5G, the search space of the aggregation level L in the control resource set p and the search space set s may be expressed as the following equation.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p} / L \rfloor \right\} + i$$

L: aggregation level $n_{CI}$: Carrier index $N_{CCE,p}$: the number of total CCEs existing in the control resource set p $n_{s,f}^{\mu}$: slot index $M_{p,s,max}^{(L)}$: The number of PDCCH candidates of an aggregation level L $m_{snCI} = 0, \ldots, M_{p,s,max}^{(L)} - 1$: PDCCH candidate index of the aggregation level L $i = 0, \ldots, L-1$ $Y_{p,n_{s,f}^{\mu}} = (A_p \cdot Y_{p,n_{s,f}^{\mu}-1}) \bmod D$, $Y_{p,-1} = n_{RNTI} \neq 0$, $A_0 = 39827$, $A_1 = 39829$, $A_2 = 39839$, $D = 65537$ $n_{RNTI}$: UE identifier The $Y_{\_}(p, n_{s,f}^{\mu})$ value may correspond to 0 in the case of a common search space.

In a case of a UE-specific search space, the value $Y_{\_}(p, n_{s,f}^{\mu})$ may correspond to a value that changes according to the identity of the UE (C-RNTI or an ID configured to the UE by the base station) and a time index.

Hereinafter, an example method of allocating time domain resources for a data channel in a 5G communication system will be described.

The base station may configure a table for time domain resource allocation information on a downlink data channel (PDSCH) and an uplink data channel (PUSH) to the UE through higher layer signaling (e.g., RRC signaling). The base station may configure a table including the maximum number of maxNrofDL-Allocations=16 entries for the PDSCH, and configure a table including the maximum number of maxNrofUL-Allocations=16 entries for the PUSCH. The time domain resource allocation information may include, for example, PDCCH-to-PDSCH slot timing (corresponding to a time interval of a slot unit between a time point at which the PDCCH is received and a time point at which a PDSCH scheduled by the received PDCCH is transmitted, denoted as K0), or PDCCH-to-PUSCH slot timing (corresponding to a time interval of a slot unit between a time point at which the PDCCH is received and a time point at which a PUSCH scheduled by the received PDCCH is transmitted, denoted as K2), information on a position and length of a start symbol in which the PDSCH or the PUSCH is scheduled in the slot, and a mapping type of the PDSCH or the PUSCH. For example, the following information may be notified from the base station to the UE,

| PDSCH-TimeDomainResourceAllocationList information element |
| --- |
| PDSCH-TimeDomainResourceAllocationList ::= SEQUENCE (SIZE(1..maxNrofDL-Allocations)) OF PDSCH-TimeDomainResourceAllocation<br>PDSCH-TimeDomainResourceAllocation ::=  SEQUENCE {<br>  k0                                INTEGER(0..32)<br>OPTIONAL, -- Need S<br>  mappingType                    ENUMERATED {typeA, typeB},<br>  startSymbolAndLength         INTEGER (0..127)<br>} |

| PUSCH-TimeDomainResourceAllocation information element |
| --- |
| PUSCH-TimeDomainResourceAllocationList ::= SEQUENCE (SIZE(1..maxNrofUL-Allocations)) OF PUSCH-TimeDomainResourceAllocation<br>PUSCH-TimeDomainResourceAllocation ::=  SEQUENCE {<br>  k2                                INTEGER(0..32)      OPTIONAL, -- Need S<br>  mappingType                    ENUMERATED {typeA, typeB},<br>  start SymbolAndLength        INTEGER (0..127)<br>} |

The base station may notify the UE of one of table entries for the time domain resource allocation information through L1 signaling (e.g., DCI) (e.g., may be indicated by a 'time domain resource allocation' field in the DCI). The UE may acquire time domain resource allocation information on the PDSCH or PUSCH based on the DCI received from the base station.

Hereinafter, an example method of allocating frequency domain resources for a data channel in a 5G communication system will be described.

5G supports a resource allocation type 0 and a resource allocation type 1, which are two types as a method of indicating frequency domain resource allocation information on a downlink data channel (PDSCH) and an uplink data channel (PUSCH).

Resource Allocation Type 0

RB allocation information may be notified from the base station to the UE in the form of a bitmap for a resource block group (RBG). In this case, the RBG may include a set of consecutive virtual RBs (VRBs), and a size P of the RBG may be determined based on a value configured by an upper layer parameter (rbg-Size) and a size value of a bandwidth part defined in [Table 5].

TABLE 5

| Nominal RBG size P | | |
| --- | --- | --- |
| Bandwidth Part Size | Configuration 1 | Configuration 2 |
| 1-36 | 2 | 4 |
| 37-72 | 4 | 8 |
| 73-144 | 8 | 16 |
| 145-275 | 16 | 16 |

The number $N_{RBG}$ of total RBGs of a bandwidth part i with a size $$N_{BWP,i}^{size}$$

may be defined as follows.

$$N_{RBG} = \left\lceil \left( N_{BWP,i}^{size} + \left( N_{BWP,i}^{Start} \bmod P \right) \right) / P \right\rceil, \text{ where}$$

-continued the size of the first RBG is $RBG_0^{size} = P - N_{BWP,i}^{start} \bmod P$, the size of last RBG is $RBG_{last}^{size} = \left( N_{BWP,i}^{start} + N_{BWP,i}^{size} \right) \bmod P$ if $\left( N_{BWP,i}^{start} + N_{BWP,i}^{size} \right) \bmod P > 0$ and $P$ otherwise, the size of all other RBGs is $P$.

Each bit of the $N_{RBG}$ bit-sized bitmap may correspond to each RBG. RBGs may be indexed in order of frequency increasing starting from a lowest frequency position of the bandwidth part. For the $N_{RBG}$ number of RBGs in the bandwidth part, an RBG #0 to RBG #$N_{RBG}$-1 may be mapped from an MSB to an LSB of the RBG bitmap. In a case that a specific bit value in the bitmap is 1, the UE may determine that the RBG corresponding to the corresponding bit value has been assigned, and in a case that a specific bit value in the bitmap is 0, the UE may determine that the RBG corresponding to the corresponding bit value has not been assigned.

Resource Allocation Type 1

RB allocation information may be notified from the base station to the UE as information on a start position and length of continuously assigned VRBs. In this case, interleaving or non-interleaving may be additionally applied to the continuously assigned VRBs. A resource allocation field of the resource allocation type 1 may include a resource indication value (RIV), and the RIV may include a starting point $RB_{start}$ of the VRB and lengths $L_{RBs}$ of continuously assigned RBs. More specifically, the RIV within the bandwidth part of $$N_{BWP}^{size}$$

size may be defined as follows.

if $(L_{RBs} - 1) \leq \left\lfloor N_{BWP}^{size} / 2 \right\rfloor$ then $RIV = N_{BWP}^{size}(L_{RBs} - 1) + RB_{start}$ 23
24

-continued else $$RIV = N_{BWP}^{size}\left(N_{BWP}^{size} - L_{RBs} + 1\right) + \left(N_{BWP}^{size} - 1 - RB_{start}\right)$$

where $L_{RBs} \geq 1$ and shall not exceed $N_{BWP}^{size} - RB_{start}$.

In the following description, an example method of measuring and reporting a channel state in a 5G communication system will be described in detail.

Channel state information (CSI) may include a channel quality indicator (CQI), precoding matrix index (PMI), CSI-RS resource indicator (CRI), SS/PBCH block resource indicator (SSBRI), layer indicator (LI), rank indicator (RI), and/or L1-reference signal received power (RSRP). The base station may control time and frequency resources for the aforementioned CSI measurement and reporting of the IE. For the aforementioned CSI measurement and reporting, the UE may receive a configuration of setting information (CSI-ReportConfig) for the N (≥1) number of CSI reports and setting information (CSI-ResourceConfig) for the M (≤1) number of RS transmission resources, and one or two trigger state (CSI-AperiodicTriggerStateList, CSI-SemiPersistentOnPUSCH-TriggerStateList) list information through higher layer signaling.

For the aforementioned CSI report setting (CSI-ReportConfig), each report setting CSI-ReportConfig may be associated with CSI resource setting associated with the corresponding report setting and a downlink (DL) bandwidth part identified by a higher layer parameter bandwidth part identifier (bwp-id) given as CSI-ResourceConfig. As a time domain reporting operation for each report setting CSI-ReportConfig, aperiodic, semi-persistent, and periodic methods are supported, which may be configured from the base station to the IE by a, reportConfigType parameter configured from the upper layer. The semi-persistent CSI reporting method supports 'PUCCH-based semi-persistent (semi-PersistentOnPICCH)' and 'PUSCH-based semi-persistent (semi-PersistentOnPUSCH)' reporting methods. In a case of a periodic or semi-permanent CSI reporting method, the IE may receive a configuration of a PUCCH or PUSCH resource to transmit CSI from the base station through higher layer signaling. A period and slot offset of a PUCCH or PUSCH resource to transmit CSI may be given as numerology of an uplink (UL) bandwidth part configured to transmit a CSI report. In a case of the aperiodic CSI reporting method, the UE may receive scheduling of a PUSCH resource to transmit CSI from the base station through L1 signaling (the aforementioned DCI format 0_1).

For the aforementioned CSI resource setting (CSI-ResourceConfig), each CSI resource setting CSI-ReportConfig may include the S (≥1) number of CSI resource sets (given by a higher layer parameter csi-RS-ResourceSetList). The CSI resource set list may include a non-zero power (NZP) CSI-RS resource set and an SS/PBCH block set or may include a CSI-interference measurement (CSI-IM) resource set. Each CSI resource setting may be positioned at a downlink (DL) bandwidth part identified by an upper layer parameter bwp-id, and the CSI resource setting may be connected to CSI reporting setting of the same downlink bandwidth part. A time domain operation of the CSI-RS resource in the CSI resource setting may be configured to one of aperiodic, periodic, or semi-permanent method from an upper layer parameter resourceType. For periodic or semi-permanent CSI resource setting, the number of CSI-RS resource sets may be limited to S=1, and the configured period and slot offset may be given as numerology of a downlink bandwidth part identified by a bwp-id. The UE may receive one or more CSI resource settings for channel or interference measurement from the base station through higher layer signaling, and include, for example, the following CSI resources.

CSI-IM resources for interference measurement

NZP CSI-RS resources for interference measurement

NZP CSI-RS resource for channel measurement

For CSI-RS resource sets associated with resource settings in which the upper layer parameter resourceType is configured to 'non-periodic', 'periodic', or 'semi-permanent', a trigger state for CSI reporting settings in which reportType is configured to 'non-periodic' and resource settings for channel or interference measurement for one or a plurality of component cells (CCs) may be configured as an upper layer parameter CSI-AperiodicTriggerStateList.

Aperiodic CSI reporting of the UE may use a PUSCH, periodic CSI reporting may use a PUCCH, and, in a case that semi-permanent CSI reporting is triggered or activated by DCI, after semi-permanent CSI reporting is activated by the PUSCH and a MAC control element (MAC CE), semi-permanent CSI reporting may be performed using the PUCCH. As described above, CSI resource setting may be also configured aperiodically, periodically, or semi-permanently. The combination of CSI reporting setting and CSI resource configuration may be supported based on [Table 6].

TABLE 6

Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/ activation | For reporting on PUCCH. the UE receives an activation command [10. TS 38.321]: for reporting on PUSCH, the UE receives triggering on DCI | Triggered by DCI: additionally. activation command [10. TS 38.321] possible as defined in Subclause 5.2.1.5.1. |
| Semi-Persistent CSI-RS | Not Supported | For reporting on PUCCH, the UE receives an activation command [10. TS 38.321]: for reporting on PUSCH, the UE receives triggering on DCI | Triggered by DCI: additionally. activation command [10. TS 38.321] possible as defined in Subclause 5.2.1.5.1. |

TABLE 6-continued

| Triggering/Activation of CSI Reporting for the possible CSI-RS Configurations. | | | |
|---|---|---|---|
| CSI-RS Configuration | Periodic CSI Reporting | Semi-Persistent CSI Reporting | Aperiodic CSI Reporting |
| Aperiodic CSI-RS | Not Supported | Not Supported | Triggered by DCI; additionally. activation command [10. TS 38.321] possible as defined in Subclause 5.2.1.5.1. |

Aperiodic CSI reporting may be triggered by a "CSI request" field of the aforementioned DCI format 0_1 corresponding to scheduling DCI for the PUSCH. The UE may monitor the PDCCH, acquire a DCI format 01, and acquire scheduling information and a CSI request indicator for the PUSCH. The CSI request indicator may be configured to $N_{TS}$ (=0, 1, 2, 3, 4, 5, or 6) bits and be determined by higher layer signaling (reportTriggerSize). One trigger state among one or a plurality of aperiodic CSI reporting trigger states that may be configured by higher layer signaling (CSI-AperiodicTriggerStateList) may be triggered by a CSI request indicator.

In the case that all bits of the CSI request field are 0, this may mean that CSI reporting is not requested.

If the number M of CSI trigger states in the configured CSI-AperiodicTriggerStateLite is greater than $2^{NTs}-1$, the M number of CSI trigger states may be mapped to $2^{NTs}-1$ according to a predefined mapping relationship, and one of the trigger states of $2^{NTs}-1$ may be indicated by the CSI request field.

If the number M of CSI trigger states in the configured CSI-AperiodicTriggerStateLite is smaller than or equal to $2^{NTs}-1$, one of the M number of CSI trigger states may be indicated by the CSI request field.

Table 7 illustrates an example of a relationship between a CSI request indicator and a CSI trigger state that may be indicated by the corresponding indicator.

TABLE 7

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1 CSI report#2 | CSI resource#1 CSI resource#2 |
| 10 | CSI trigger state#2 | CSI report#3 | CSI resource#3 |
| 11 | CSI trigger state#3 | CSI report#4 | CSI resource#4 |

The UE may perform measurement for a CSI resource in a CSI trigger state triggered by the CSI request field, and generate CSI (including at least one of the aforementioned CQI, PMI, CRI, SSBRI, LI, RI, or L1-RSRP) based on the measurement. The UE may transmit the acquired CSI using the PUSCH scheduled by the corresponding DCI format 0_1. In a case that I bit corresponding to the UL-SCH indicator in the DCI format 0_1 indicates "1", UL data (UL-SCH) and acquired CSI may be multiplexed and transmitted to PUSCH resources scheduled by the DCI format 0_1. In a case that I bit corresponding to the uplink data indicator (UL-SCH indicator) in the DCI format 0_1 indicates "0", only CSI may be mapped and transmitted without uplink data (UL-SCH) to PUSCH resources scheduled by the DCI format 0_1

Figure 6E:
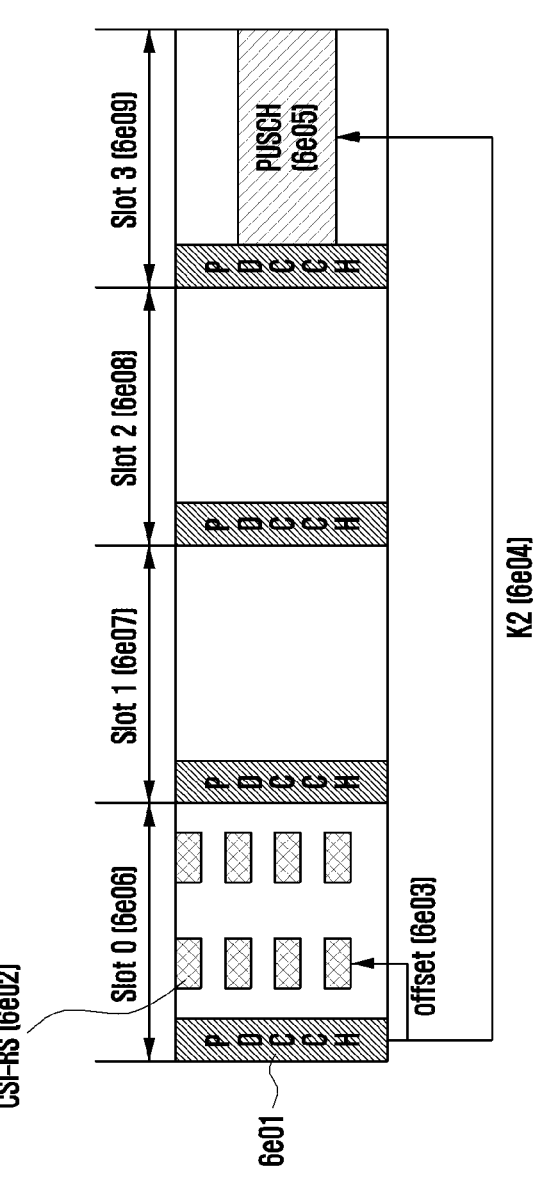
FIG. 6E is a diagram illustrating an example of an aperiodic CSI reporting method according to various embodiments.
Figure 6F:
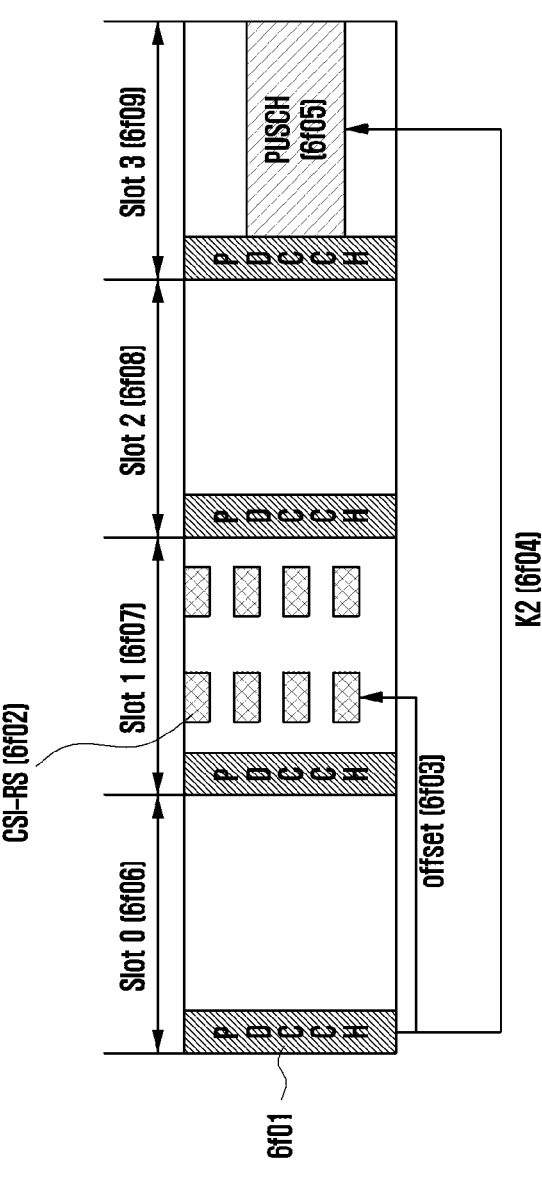
FIG. 6F is a diagram illustrating an example of an aperiodic CSI reporting method according to various embodiments.

FIGS. 6E and 6F each illustrate an example of an aperiodic CSI reporting method according to various embodiments.

In the example of FIG. 6E, the UE may monitor a PDCCH 6e01 to acquire a DCI format 0_1, and acquire scheduling information and CSI request information on a PUSCH 6e05 based on the DCI. The UE may acquire resource information on a CSI-RS 6e02 to be measured from a received CSI request indicator. The UE may determine a CSI-RS 6e02 resource for measurement based on a time point at which a DCI format 0_1 and a parameter for offset (the above-described aperiodicTriggeringOffset) within a CSI resource set configuration (e.g., NZP CSI-RS resource set configuration (NZP-CSI-RS-ResourceSet)) are received. More specifically, the IE may receive a configuration of an offset value X of a parameter aperiodicTriggeringOffset in an NZP-CSI-RS resource set configuration from the base station through higher layer signaling, and the configured offset value X may refer, for example, to offset between a slot receiving DCI triggering aperiodic CSI reporting and a slot to which a CSI-RS resource is transmitted. For example, an aperiodicTriggeringOffset parameter value and an offset value X may have a mapping relationship described in [Table 8].

TABLE 8

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

An example of FIG. 6E illustrates an example in which the aforementioned offset value 6e03 is configured to X=0. In this case, the UE may receive a CSI-RS 6e02 in a slot (corresponding to a slot 0, 6e06 of FIG. 6E) receiving a DCI format 0_1 triggering the aperiodic CSI report, and report CSI information measured with the received CSI-RS 6e02 to the base station through the PUSCH 6e05. The UE may acquire scheduling information (information corresponding to each field of the aforementioned DCI format 0_1) on the PUSCH 6e05 for CSI reporting from the DCI format 0_1. For example, the UE may acquire the above-described time domain resource allocation information for the PUSCH 6e05 and information on a slot to transmit the PUSCH 6e05 from the DCI format 0_1. In an example of FIG. 6E, the UE acquired a K2 value 6e04 corresponding to a slot offset value for PDCCH-to-PUSCH as 3; thus, the PUSCH 6e05 may be transmitted in a slot 3, 6e09 separated by 3 slots from the slot 0, 6e06, which is a time point that receives a PDCCH 6e01. In an example of FIG. 6F, the UE may monitor a PDCCH 6f01 to acquire a DCI format 0_1 and acquire scheduling information and CSI request information on a PUSCH 6f05 based on the DCI. The UE may acquire resource information on a CSI-RS 6f02 to measure from the received CSI request indicator. An example of FIG. 6F illustrates an example in which the aforementioned offset value 6f03 for the CSI-RS is configured to X=1. In this case, the UE may receive a CSI-RS 6f02 in a slot (corresponding to a slot 1, 6f07 of FIG. 6F), and report CSI information measured with the received CSI-RS to the base station through the PUSCH 6f05 in a slot 3, 6f09 separated by 3 slots from the slot 0, 6f06, according to a K2 value 6f04 corresponding to a slot offset value for a PDCCH-to-PUS(CI.

Control information is transmitted within the number of first N OFDM symbols in a subframe. A control channel transmission period N is generally N={1, 2, 3}. Therefore, the N value changes in each subframe according to an amount of control information to be transmitted in the current subframe. For example, control information may include an indicator indicating how many OFDM symbols the control information is transmitted over, scheduling information on uplink or downlink data, and hybrid automatic repeat request (HARQ) acknowledgment (ACK)/negative ACK (NACK) signals.

The wireless communication system employs an HARQ scheme of retransmitting corresponding data in a physical layer in a case that a decoding failure occurs in initial transmission. In the HARQ scheme, in a case that the receiver fails to accurately decode data, the receiver transmits information (e.g., NACK) notifying the transmitter of the decoding failure so that the transmitter may retransmit the corresponding data in a physical layer. The receiver combines data retransmitted by the transmitter with previously failed data to improve data reception performance. Further, in a case that the receiver correctly decodes data, the receiver may transmit information (e.g., ACK) indicating successful decoding so that the transmitter may transmit new data.

One of important things for providing a high-speed data service in a communication system is the support of scalable bandwidth. In various embodiments, a system transmission band of an LTE system may have various bandwidths, such as 20/15/10/5/3/1.4 MHz. Accordingly, service providers may provide services by selecting a specific bandwidth among various bandwidths. Furter, various types of UEs (e.g., the UE 120) may exist, such as UEs capable of supporting a maximum bandwidth of 20 MHz to UEs capable of supporting only a minimum bandwidth of 1.4 MHz.

In a wireless communication system, the base station (e.g., the base station 110) notifies the UE of scheduling information on downlink data or uplink data through downlink control information (DCI). An uplink refers, for example, to a radio link in which the UE transmits data or a control signal to the base station, and a downlink refers, for example, to a radio link in which the base station transmits data or a control signal to the UE. DCI may be defined in various formats, and a DCI format determined according to whether DCI is scheduling information on uplink data (e.g., uplink (UL) grant) or scheduling information on downlink data (e.g., downlink (DL) grant), whether DCI is compact DCI having a small size of control information, whether spatial multiplexing using multiple antennas is applied, whether DCI is DCI for power control, and the like is applied and operated. For example, a DCI format 1, which is scheduling control information (e.g., DL grant) on downlink data, may include the following control information.

Resource allocation type 0/1 flag: The resource allocation type 0/1 flag notifies whether a resource allocation method is a type 0 or a type 1. The Type 0 flag may apply a bitmap method to allocate resources in an RBG unit. In the LTE system, a basic unit of scheduling is an RB represented by time and frequency domain resources, and an RBG includes a plurality of RBs and may be a basic unit of scheduling in the type 0 scheme. The Type 1 flag enables a specific RB to be assigned inside an RBG.

Resource block assignment: The resource block assignment notifies RBs assigned for data transmission. A resource to be expressed is determined according to the system bandwidth and resource assignment method.

MCS: The MCS notifies a modulation method used for data transmission, a target code rate, or a size of a transport block to be transmitted.

HARQ process number: HARQ process number notifies the process number of HARQ,

New data indicator: The new data indicator notifies whether HARQ initial transmission or retransmission.

Redundancy version: The redundancy version notifies a redundancy version (RV) of HARQ.

TPC command for PUCCH: The TPC command for a physical uplink control channel (PUCCH) notifies a power control command for a PUCCH, which is an uplink control channel.

DCI may be transmitted through a PDCCH, which is a downlink physical control channel through channel coding and modulation processes.

In general, after DCI is independently channel-coded for each UE, each DCI includes an independent PDCCH and transmitted. In the time domain, the PDCCH is mapped and transmitted during the control channel transmission period. A frequency domain mapping position of the PDCCH is determined by an identifier (ID) of each U E, and is spread over the entire system transmission band.

Downlink data is transmitted through a PDSCH, which is a physical channel for downlink data transmission. The PDSCH is transmitted after the control channel transmission period, and the base station may notify the U E of scheduling information such as a specific mapping position in the frequency domain and a modulation method through DCI transmitted through the PDCCH.

Through the MCS including 5 bits among control information included in the DCI, the base station may notify the UE of a modulation method applied to a PDSCH to be transmitted and a size (e.g., TBS) of data to be transmitted. The TBS corresponds to the size before channel coding for error correction is applied to data to be transmitted by the base station.

In a cellular system such as 5G NR or LTE/LTE-A system, in order to measure a downlink channel state, the base station (e.g., the base station 110) may transmit a reference signal. For example, in a case of an LTE-advanced (LTE-A) system of 3GPP, the UE (e.g., the UE 120) may measure a channel state between the base station and itself using a channel status information reference signal (CSI-RS) transmitted by the base station. For the channel status, several factors should be basically considered, which may include an amount of interference in a downlink. The amount of interference in the downlink includes an interference signal and thermal noise generated by an antenna belonging to a neighboring base station, which may be used by the IE to determine a downlink channel condition. For example, in a case that a base station with one transmitting antenna transmits a reference signal to a UE with one receiving antenna, the UE may determine energy per symbol that may be received through a downlink and an amount of interference to be simultaneously received in a section receiving the corresponding symbol to determine energy per symbol to interference density ratio (Es/Io) using a reference signal received from the base station. The determined Es/Io may be notified to the base station and be used by the base station in determining a transmission rate of data to be transmitted to the UE through the downlink.

Figure 7:
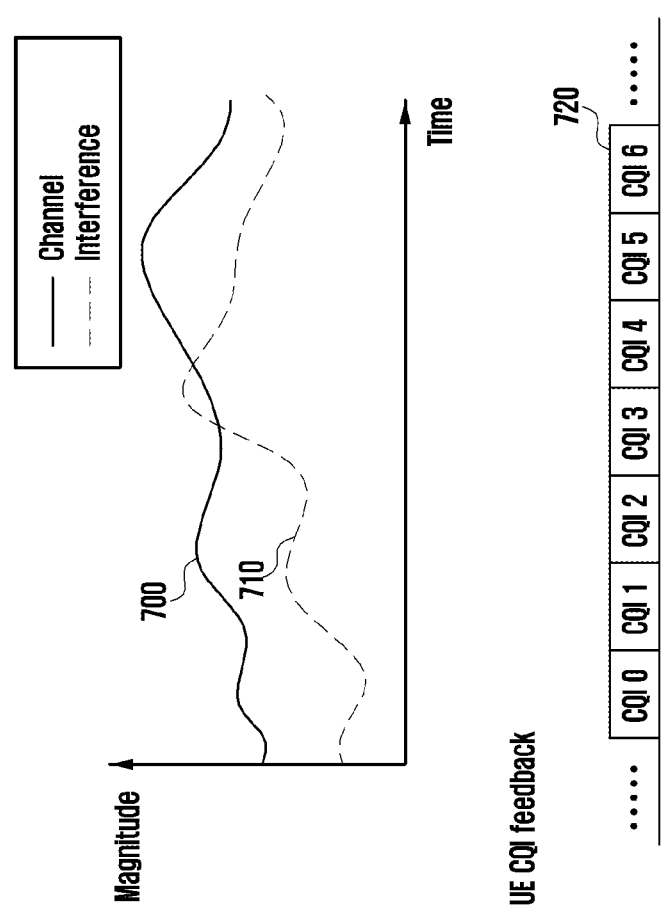
FIG. 7 is a diagram illustrating an example of transmission of a channel quality indicator (CQI), which is one of channel state information of a terminal according to interference intensity and signal energy measured by the terminal, according to various embodiments.

FIG. 7 illustrates an example of transmission of a channel quality indicator (CQI), which is one of channel state information of a UE according to interference intensity and signal energy measured by the UE, according to various embodiments.

With reference to FIG. 7, a UE (e.g., the UE 120) may measure a downlink reference signal such as a CSI-RS to perform channel estimation, and determine (or calculate) Es (received signal energy) 700 according to a radio channel using channel estimation. Further, the IE may determine (or calculate) intensity 710 of interference and/or noise using a downlink reference signal or a separate resource for measuring interference and noise. In LTE, the base station uses a CRS, which is a downlink reference signal in order to measure interference and noise, or configures an interference measurement resource to the UE to assume a signal measured in a corresponding radio resource to interference and noise. Using received signal energy and the intensity of interference and noise obtained in this way, the UE determines the maximum data transmission rate that may be received with a constant success rate in the corresponding signal to interference plus noise ratio calculated by itself and notifies the base station of the maximum data transmission rate.

The base station notified of the maximum data transmission rate that may be supported in the corresponding signal to interference plus noise ratio of the UE determines an actual data rate of a downlink data signal to be transmitted to the UE using the maximum data transmission rate. In this way, the maximum data transmission rate in which the UE may receive from the base station at a constant success rate is referred to as a CQI in the LTE/NR standard. In general, because a radio channel changes over time, the UE may periodically notify the base station of a CQI or may notify a CQI whenever the base station requests the CQI to the LUE. A request by the base station to the UE may be performed through one or more of periodic and aperiodic methods.

As such CQI information is accurately measured and accurately transmitted and received in the UE or the base station, an MCS appropriate for the channel environment is configured, and efficient transmission and reception is possible while complying with the target error probability configured in the system; thus, it is desirable that the more advanced wireless communication system defines a method of generating and applying CQI and MCS tables appropriate to services supporting various reliability.

Hereinafter, in the disclosure, in order to accurately report a channel quality or to determine a combination of modulation and coding techniques according to the target transmission and reception error probability required for efficient communication in a 4G or 5G communication system, a method of designing a new channel quality indicator (CQI) table and a modulation and coding (MCS) table is described.

Further, in order to accurately report a channel quality or to determine a combination of modulation and coding techniques according to the target transmission and reception error probability required for efficient communication in a 4G or 5G communication system, a method of adjusting a code rate or spectral efficiency based on the existing CQI table and MCS table will be described. For reference, spectral efficiency may be expressed as in a modulation order product rate (MPR).

Further, a method and device for reporting an accurate channel quality based on a plurality of COI tables or determining an efficient modulation and coding scheme combination based on a plurality of MCS tables according to the target transmission and reception error probability required for efficient communication in a 4G or 5G communication system are described.

In a case of a current 5G NR system, different CQI tables and MCS tables are applied according to the target block error rate (BLER) or the maximum modulation order configured in the system. Here, a BLER value may refer, for example, to an error occurrence probability after decoding of the received transport block is completed. In various embodiments, the UE may perform decoding on a large number of transport blocks and then determine a BLER value through appropriate calculation, but the UE may determine an approximately expected BLER value through a signal to noise ratio (SNR). In this case, even if the UE does not actually perform decoding, the UE may measure a received SNR, predict a decoding success probability based on the SNR, and report a CQI index to the base station.

<Description of CSI Reference Resource>

In order to report a CQI index to the base station, the UE reports the CQI index based on a CSI reference resource, and the following items may be an example of elements included in a CSI reference resource, and items not described below may be a component of CSI reference resources.

First 2 OFDM symbols are used as control signals

The number of PDSCH and DMRS symbols is 12

CP length, subcarrier spacing equal to bandwidth part (BWP) configured for PDSCH reception Bandwidth size configured for CQI reporting

RV 0

No RE assigned for an NZP CSI-RS and a ZP CSI-RS

A PDSCH symbol does not include a DMRS

PRB bundling size in 2 PRB units

PDSCH transmission may be performed with up to 8 transport layers

[Table 9] or [Table 11] may be used for a case of reporting a CQI for a case that up to 64QAM is available, and [Table 10] may be used when reporting the CQI for a case that up to 256QAM is available. Further, [Table 12] or [Table 14] may be used for a case of determining or configuring the MCS for a case that up to 64QAM is available for a PDSCH or a PUSCH, and [Table 13] may be used for a case of determining or configuring an MCS for a case that up to 256QAM is available for a PDSCH or a PUSCH. [Table 15] and [Table 16] may be used for a case of determining or configuring an MCS for a PUSCH to which transform precoding and 64QAM are applied to the PUSCH. (A value q in [Table 15] and [Table 16] is a value determined according to whether pi/2-BPSK is indicated, and when tp-pi2BPSK is configured in higher layer signaling, q=1, otherwise q=2. Further, values of CQI tables of [Table 9] to [Table 14] may be configured through a 4-bit indicator, and values of CQI tables of [Table 15] and [Table 16] may be configured through a 5-bit indicator.

TABLE 9

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

TABLE 10

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16 QAM | 378 | 1.4766 |
| 5 | 16 QAM | 490 | 1.9141 |
| 6 | 16 QAM | 616 | 2.4063 |
| 7 | 64 QAM | 466 | 2.7305 |
| 8 | 64 QAM | 567 | 3.3223 |
| 9 | 64 QAM | 666 | 3.9023 |
| 10 | 64 QAM | 772 | 4.5234 |
| 11 | 64 QAM | 873 | 5.1152 |
| 12 | 256 QAM | 711 | 5.5547 |
| 13 | 256 QAM | 797 | 6.2266 |
| 14 | 256 QAM | 885 | 6.9141 |
| 15 | 256 QAM | 948 | 7.4063 |

TABLE 11

| CQI index | modulation | code rate × 1024 | efficiency |
|---|---|---|---|
| 0 | out of range | | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16 QAM | 378 | 1.4766 |
| 10 | 16 QAM | 490 | 1.9141 |
| 11 | 16 QAM | 616 | 2.4063 |
| 12 | 64 QAM | 466 | 2.7305 |
| 13 | 64 QAM | 567 | 3.3223 |
| 14 | 64 QAM | 666 | 3.9023 |
| 15 | 64 QAM | 772 | 4.5234 |

TABLE 12

| MCS Index $I_{MCS}$ | Modulation Order Qm | Target code Rate [R × 1024] | Spectral Efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |

TABLE 12-continued

| MCS Index $I_{MCS}$ | Modulation Order Qm | Target code Rate [R × 1024] | Spectral Efficiency |
|---|---|---|---|
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | Reserved | |
| 30 | 4 | Reserved | |
| 31 | 6 | Reserved | |

TABLE 13

| MCS Index $I_{MCS}$ | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 14

| MCS Index $I_{MCS}$ | Modulation Order Qm | Target code Rate [R × 1024] | Spectral efficiency |
|---|---|---|---|
| 0 | 2 | 30 | 0.0586 |
| 1 | 2 | 40 | 0.0781 |
| 2 | 2 | 50 | 0.0977 |

TABLE 14-continued

| MCS Index $I_{MCS}$ | Modulation Order Qm | Target code Rate [R × 1024] | Spectral efficiency |
|---|---|---|---|
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

TABLE 15

| MCS Index $I_{MCS}$ | Modulation Order Qm | Target code Rate [R × 1024] | Spectral efficiency |
|---|---|---|---|
| 0 | q | 240/q | 0.2344 |
| 1 | q | 314/q | 0.3770 |
| 2 | 2 | 193 | 0.6016 |
| 3 | 2 | 251 | 0.8770 |
| 4 | 2 | 308 | 1.1758 |
| 5 | 2 | 379 | 1.4766 |
| 6 | 2 | 449 | 1.6953 |
| 7 | 2 | 526 | 1.9141 |
| 8 | 2 | 602 | 2.1602 |
| 9 | 2 | 679 | 2.4063 |
| 10 | 4 | 340 | 2.5703 |
| 11 | 4 | 378 | 2.7305 |
| 12 | 4 | 434 | 3.0293 |
| 13 | 4 | 490 | 3.3223 |
| 14 | 4 | 553 | 3.6094 |
| 15 | 4 | 616 | 3.9023 |
| 16 | 4 | 658 | 4.2129 |
| 17 | 6 | 466 | 4.5234 |
| 18 | 6 | 517 | 4.8164 |
| 19 | 6 | 567 | 5.1152 |
| 20 | 6 | 616 | 5.3320 |
| 21 | 6 | 666 | 5.5547 |
| 22 | 6 | 719 | 5.8906 |
| 23 | 6 | 772 | 6.2266 |
| 24 | 6 | 822 | 6.5703 |
| 25 | 6 | 873 | 6.9141 |
| 26 | 6 | 910 | 7.1602 |
| 27 | 6 | 948 | 7.4063 |
| 28 | q | reserved | |
| 29 | 2 | reserved | |
| 30 | 4 | reserved | |
| 31 | 6 | reserved | |

TABLE 16

| MCS Index $I_{MCS}$ | Modulation Order Qm | Target code Rate [R × 1024] | Spectral efficiency |
|---|---|---|---|
| 0 | q | 60/q | 0.2344 |
| 1 | q | 80/q | 0.3770 |
| 2 | q | 100/q | 0.6016 |
| 3 | q | 128/q | 0.8770 |
| 4 | q | 156/q | 1.1758 |
| 5 | q | 198/q | 1.4766 |
| 6 | 2 | 120 | 1.6953 |
| 7 | 2 | 157 | 1.9141 |
| 8 | 2 | 193 | 2.1602 |
| 9 | 2 | 251 | 2.4063 |
| 10 | 2 | 308 | 2.5703 |
| 11 | 2 | 379 | 2.7305 |
| 12 | 2 | 449 | 3.0293 |
| 13 | 2 | 526 | 3.3223 |
| 14 | 2 | 602 | 3.6094 |
| 15 | 2 | 679 | 3.9023 |
| 16 | 4 | 378 | 4.2129 |
| 17 | 4 | 434 | 4.5234 |
| 18 | 4 | 490 | 4.8164 |
| 19 | 4 | 553 | 5.1152 |
| 20 | 4 | 616 | 5.3320 |
| 21 | 4 | 658 | 5.5547 |
| 22 | 4 | 699 | 5.8906 |
| 23 | 4 | 772 | 6.2266 |
| 24 | 6 | 567 | 6.5703 |
| 25 | 6 | 616 | 6.9141 |
| 26 | 6 | 666 | 7.1602 |
| 27 | 6 | 772 | 7.4063 |
| 28 | q | reserved | |
| 29 | 2 | reserved | |
| 30 | 4 | reserved | |
| 31 | 6 | reserved | |

In more detail describing a process of determining the CQI index, the UE may derive or determine the highest CQI index satisfying the following conditions for a CQJ value reported in an uplink slot n:

[CQI Determination-1]

A single PDSCH transport block having a modulation order (or scheme), a target code rate, and TBS combination corresponding to the CQI index should be received not exceeding the following transport block error probability:

In a case that a CSI-upper layer parameter cqi-Table included in a CSI-ReportConfig configures (or indicates) [Table 9] or [Table 10], the target transport block error probability is 0.1

In a case that a CSI-higher layer parameter cqi-Table included in a CSI-ReportConfig configures (or indicates) Table 11, the target transport block error probability is 0.00001 Because the condition for the transport block error probability may be an approximate or substantial value, a BLER value satisfying in an actual communication system may have somewhat smaller or larger range of values than values of 0.1 and 0.00001 at least temporarily defined in the standard. However, the system is operated so that the average transport block error probability becomes a value close to the above-defined 0.1 and 0.00001 value. Here, the close value may refer, for example, to a value within 10% to 50% of the configured target BLER value, or may refer to another range value configured in the system.

According to an embodiment, in order to derive an appropriate target BLER value determined for reporting a CQI index, at least one of parameters such as a resource utilization rate such as the number of RE resources, an implementation capability of the UE for accurate CQI index estimation, an SNR difference for each target BLER in a case that a plurality of target BLERs exist, whether different CQI index reports for each target BLER are possible in various wireless communication environments due to the SNR difference for each target BLER, or UE implementation complexity of a case that the number of types of a plurality of target BLERs increases may be considered. However, this is only an example of a parameter for determining the target BLER, and parameters other than the above-described parameters may be used.

In a case that a plurality of target BLERs exist, the UE reports a CQI index estimated based on at least one target BLER, and the target BLER value may be configured by an upper signal or an L1 signal.

The current 5G NR system considers 0.1 and 0.00001 as target BLER values, and, in the latter case, it may be configured in consideration of service scenarios such as services requiring high reliability or low latency, for example, UR LLC. However, as the LTE or 5G NR system spreads, more various services for different purposes are required. Such various services may require various system conditions considering not only reliability and low-latency characteristics, but also a place where the service is supported, average data traffic, and a type of a UE according to each service. However, it may be difficult to efficiently support various services with only two BLER conditions that differ by more than 10000 times, such as 0.1 and 0.00001, as at present. Accordingly, the disclosure proposes a CQI table and an MCS table for efficiently supporting target BLER s other than target BLERs of values of 0.1 and 0.00001.

In the current 5G NR, in a case that the maximum modulation order to be applied in the system is configured to 64-QAM, the CQI table in [Table 9] is used for CQI reporting in a case that the target BLER of the system is 0.1, and in a case that the target BLER is 0.00001, a CQI table in [Table 11] is used. The disclosure proposes a method of determining a new CQI table in a case that a separate CQI table is used for a target BLER between 0.1 and 0.00001. Hereinafter, for convenience of description, in the disclosure, it is assumed that the target BLER is configured to a value such as $10^{-P}$, P=1, 2, 3, 4, 5, . . . , but the disclosure is not limited thereto, and the target BLER may be configured to a value close to $10^{-P}$, such as 0.2, 0.002, 0.00002, 0.09, 0.009, or 0.000009 according to a system.

Further, in an embodiment, a method of designing a CQI table or a method of using the designed CQI table in order to transmit channel state information (CSI) by a device including a transceiver and at least one processor coupled with the transceiver in a communication system is described. In particular, a method of designing a CQI table or a method of using the designed CQI table in a case that support services or target BLERs are different is described. Further, the disclosure describes a method of determining or configuring an appropriate MCS using an appropriate MCS table corresponding to the CQI table or a designed MCS table. For example, in order to maintain a signaling overhead at an LTE level, CQI and MCS indicators are maintained at 4 bits and 5 bits, respectively, as before, and a CQI index 0 may also be defined as "out of range",

Example Embodiment 1

In general, indexes included in the CQI table or the MCS table are determined as evenly as possible in an operating signal-to-noise ratio (SNR) interval supporting a target BLER of the system. A channel capacity based on an SNR is influenced by the error probability or BLER of received bits allowed in the system. For example, in a case that channel coding with a code rate R is applied, if a channel capacity assuming error free is a $C_{SNR}(R)$, a channel capacity $C_{SNR,b}(R)$ of a case that the target bit error rate is $P_b$ has the relationship of $C_{SNR,b}(R) < C_{SNR}(R)$, because the system allows some bit error rate or BLER compared to an error-free robust condition; thus, the required SNR level is low. Therefore, because an operating SNR is also variable according to the allowed system target bit error rate or BLER, an optimized or improved modulation order and code rate combination or target spectral efficiency value may change according to the target bit error rate. Further, because the bit error rate compared to the increase in SNR usually decreases exponentially, in a case of designing or configuring an optimal CQI table or MCS table, an optimal or improved CQI table or MCS table may be designed in consideration of a log-scale for the target BLER or bit error rate. For example, because the target BLER 0.001 corresponds to an intermediate value in the log-scale of the target BLER 0.1 and 0.00001, a CQI table for the target BLER 0.001 may be generated using the CQI table of [Table 9] and the CQI table of [Table 11]. For reference, spectral efficiency may, for example, be simply expressed as in a modulation order product rate (MPR), that is, a product R*Qm of a modulation order Qm and a code rate R in some case.

[Table 9] and [Table 11] each consider a case that the maximum modulation order is 6, that is, the maximum 64QAM, and are CQI tables used in a case that the target BLER is 0.1 and 0.00001, respectively. The CQI table or the MCS table may be designed in consideration of a nearly uniform operating SNR and target BLER. Therefore, in a case that a CQI table is newly generated based on two CQI tables having target BLERs of 0.1 and 0.00001, the modulation and code rate combinations of the existing table or spectral efficiency corresponding thereto may be reused. First, it is assumed that there are a first CQI table and a second CQI table having the same maximum modulation scheme or order and that target BLERs are different from each other, as in $10^{-P1}$ and $10^{-P2}$. A new third CQI table having a target BLER of $10^{-P}$ and the same maximum modulation order may be generated to satisfy at least some or all of the following conditions. (Assuming P1<P<P2)

Condition 1) Spectral efficiency corresponding to the modulation and code rate combination of an index I of a third CQI table is smaller than or equal to that corresponding to the modulation and code rate combination corresponding to an index I of a first CQI table, and is greater than or equal to that corresponding to the modulation and code rate combination corresponding to an index I of a second CQI table.

Condition 2) The same modulation and code rate combinations commonly included in the first CQI table and the second CQI table are all included in the third CQI table. Hereinafter, a set including all of the same modulation and code rate combinations is referred to as a set S for convenience.

Condition 3) When P=a*(P1+P2) and the number of the same combinations in Condition 2) is X, an index for a combination with the lowest spectral efficiency among the commonly included same combinations is determined to be $g_{CQI}(a)$−floor (X/2) or $g_{CQI}(a)$−ceil (X/2), and indexes are sequentially determined for the remaining same combination included in common. Here, floor(x) refers, for example, to the largest integer smaller than or equal to the real number x, ceil(x) refers, for example, to the smallest integer greater than or equal to the real number x, and $g_{CQI}(a)$ refers, for example, to the integer determined according to a. a is a number that may be selected appropriately according to the target BLER, and, in a case that P1=1 and P2=5, in order to configure to P=2, it may be expressed as a=⅓, in order to configure to P=3, it may be expressed as a=½, in order to configure to P=4, it may be expressed as a=⅔. In the disclosure, for convenience, it is configured and described that $g_{CQI}(⅓)$=5 (or 4), $g_{CQI}(½)$=8, and $g_{CQI}(⅔)$=10 (or 11 or 12), but each may be configured to a different value. In a case that $g_{CQI}(a)$−floor(X/2)<1, $g_{CQI}(a)$−ceil(X/2)<1, $g_{CQI}(a)$−floor(X/2)+X>15, or $g_{CQI}(a)$−ceil(X/2)+X>15, modulation and code rate combinations corresponding to less than an index 1 or exceeding an index 15 are excluded.

Condition 4) Assuming that an index assigned to a combination having the lowest spectral efficiency among combinations included in the set S is J, the (J−1) number of combinations having lower spectral efficiencies than modulation and code rate combinations included in the set S among modulation and code rate combinations of the second CQI table and having higher spectral efficiencies among modulation and code rate combinations not included in the set S are sequentially assigned to indices from I to (J−1).

Condition 5) When an index assigned to a combination having the highest spectral efficiency among the same combinations included in the set S is K, the (15−K) number of combinations having higher spectral efficiencies than modulation and code rate combinations included in the set S among modulation and code rate combinations of the first CQI table and having lower spectral efficiencies among modulation and code rates combinations not included in the set S are sequentially assigned to indices from (K+1) to 15.

As a specific embodiment considering the above conditions, a method of generating a new CQI table having a target BLER of $10^{-3}$ using [Table 9] and [Table 11] will be described as follows. First, according to condition 2), modulation and code rate combinations commonly included in [Table 9] and [Table 11] are determined. It can be seen that the common combinations are total 13 (X=13) as in (QPSK, 78/1024), (QPSK, 120/1024), (QPSK, 193/1024), (QPSK, 308/1024), (QPSK, 449/1024), (QPSK, 602/1024). (16QAM, 378/1024), (16QAM, 490/1024), (16QAM, 616/ 1024), (64QAM, 466/1024), (64QAM, 567/1024), (64QAM, 666/1024), and (64QAM, 772/1024).

Because a=½ by condition 3), if $g_{CQI}(½)$=8, then $g_{CQI}(a)$−floor(X/2)=8−6=2. Accordingly, the 13 combinations are sequentially assigned from indices 2 to 14. Thereafter, according to condition 4), the (QPSK, 50/1024) combination in [Table 11] is assigned to the index 1, and the (64QAM, 873/1024) combination in [Table 9] is assigned to an index 15. The CQI table generated in this way is illustrated in [Table 17].

TABLE 17

| CQI index | modulation | code rate × 1024 | efficiency |
|---|---|---|---|
| 0 | | out of range | |
| 1 | QPSK | 50 | 0.0977 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16 QAM | 378 | 1.4766 |
| 9 | 16 QAM | 490 | 1.9141 |
| 10 | 16 QAM | 616 | 2.4063 |
| 11 | 64 QAM | 466 | 2.7305 |
| 12 | 64 QAM | 567 | 3.3223 |
| 13 | 64 QAM | 666 | 3.9023 |

TABLE 17-continued

| CQI index | modulation | code rate × 1024 | efficiency |
|---|---|---|---|
| 14 | 64 QAM | 772 | 4.5234 |
| 15 | 64 QAM | 873 | 5.1152 |

Example Embodiment 2

In the case of Embodiment 1, in a case of (P1=1, P2=5, P=2) or (P1=1, P2=5, P=4), a case of $g_{CQI}(a)$−floor(X/2)<2 or $g_{CQI}(a)$−ceil(X/2)<2 may occur; thus, in such a case, a new third CQI table may be generated through another method.

First, it is assumed that spectral efficiencies are $A_J$ and $B_J$ for indexes J (J=1, 2, . . . ) of a first CQI table and a second CQI table, which are given two CQI tables, respectively. When spectral efficiency for the index J of a new third CQI table is $C_J$, $C_J$ may be expressed as in [Table 18] using a function F(A, B) defining a new value based on the $A_J$ and $B_J$, respectively as follows: $C_J$=F($A_J$, $B_J$). Here, the function F(A, B) may be defined in various forms, for example, in a function considering the target BLER, as in F(A, B)=(1−a) *A+a*B. (Here, a refers, for example, to a value defined in a condition 3 of Embodiment 1.) Further, in general, in a case of having the same modulation scheme or order for the same index, $C_J$ may be defined according to a code rate rather than spectral efficiency. Further, a $C_J$=F($A_J$, $B_J$) value may be expressed as another value close thereto. For example, if $C_J$=0.1934, 1024*R=1024*0.1934/2 to 99, which may be changed to a close value such as $C_J$=0.1953 to simply express as in 1024*R=100. In general, values close to a given value may refer, for example, to values within a range of 10 to 20%.

TABLE 18

| CQI index | Modulation | code rate × 1024 | efficiency |
|---|---|---|---|
| 0 | | out of range | |
| 1 | QPSK | 1024 × F(A1, B1)/2 | F(A1, B1) |
| 2 | QPSK | 1024 × F(A2, B2)/2 | F(A2, B2) |
| 3 | QPSK | 1024 × F(A3, B3)/2 | F(A3, B3) |
| 4 | QPSK | 1024 × F(A4, B4)/2 | F(A4, B4) |
| 5 | QPSK | 1024 × F(A5, B5)/2 | F(A5, B5) |
| 6 | QPSK | 1024 × F(A6, B6)/2 | F(A6, B6) |
| 7 | QPSK | 1024 × F(A7, B7)/2 | F(A7, B7) |
| 8 | 16 QAM | 1024 × F(A8, B8)/4 | F(A8, B8) |
| 9 | 16 QAM | 1024 × F(A9, B9)/4 | F(A9, B9) |
| 10 | 16 QAM | 1024 × F(A10, B10)/4 | F(A10, B10) |
| | (or 64 QAM) | (or 1024 × F(A10, B10)/6) | |
| 11 | 64 QAM | 1024 × F(A11, B11)/6 | F(A11, B11) |
| 12 | 64 QAM | 1024 × F(A12, B12)/6 | F(A12, B12) |
| 13 | 64 QAM | 1024 × F(A13, B13)/6 | F(A13, B13) |
| 14 | 64 QAM | 1024 × F(A14, B14)/6 | F(A14, B14) |
| 15 | 64 QAM | 1024 × F(A15, B15)/6 | F(A15, B15) |

When a new CQI table, which is a target BLER=$10^{-2}$, $10^{-3}$, and $10^{-4}$ is generated using a method of generating [Table 18] based on [Table 9] and [Table 11], it may be represented as in [Table 19], [Table 20], and [Table 21].

TABLE 19

| CQI index | modulation | code rate × 1024 | efficiency |
|---|---|---|---|
| 0 | | out of range | |
| 1 | QPSK | 62 | 0.1211 |
| 2 | QPSK | 97 | 0.1895 |
| 3 | QPSK | 155 | 0.3027 |

TABLE 19-continued

| CQI index | modulation | code rate × 1024 | efficiency |
|---|---|---|---|
| 4 | QPSK | 245 | 0.4785 |
| 5 | QPSK | 364 | 0.7109 |
| 6 | QPSK | 504 | 0.9844 |
| 7 | QPSK | 654 | 1.2773 |
| 8 | 16 QAM | 427 | 1.6680 |
| 9 | 16 QAM | 537 | 2.0977 |
| 10 | 16 QAM | 629 | 2.4570 |
| 11 | 64 QAM | 515 | 3.0176 |
| 12 | 64 QAM | 599 | 3.5098 |
| 13 | 64 QAM | 704 | 4.1250 |
| 14 | 64 QAM | 804 | 4.7109 |
| 15 | 64 QAM | 889 | 5.2090 |

TABLE 20

| CQI index | modulation | code rate × 1024 | efficiency |
|---|---|---|---|
| 0 | | out of range | |
| 1 | QPSK | 54 | 0.1055 |
| 2 | QPSK | 85 | 0.1660 |
| 3 | QPSK | 136 | 0.2656 |
| 4 | QPSK | 214 | 0.4180 |
| 5 | QPSK | 321 | 0.6270 |
| 6 | QPSK | 455 | 0.8887 |
| 7 | QPSK | 602 | 1.1758 |
| 8 | 16 QAM | 396 | 1.5469 |
| 9 | 16 QAM | 497 | 1.9414 |
| 10 | 16 QAM | 595 | 2.3242 |
| 11 | 64 QAM | 489 | 2.8652 |
| 12 | 64 QAM | 566 | 3.3164 |
| 13 | 64 QAM | 670 | 3.9258 |
| 14 | 64 QAM | 770 | 4.5117 |
| 15 | 64 QAM | 856 | 5.0156 |

TABLE 21

| CQI index | modulation | code rate × 1024 | efficiency |
|---|---|---|---|
| 0 | | out of range | |
| 1 | QPSK | 46 | 0.08984375 |
| 2 | QPSK | 73 | 0.142578125 |
| 3 | QPSK | 116 | 0.2265625 |
| 4 | QPSK | 182 | 0.35546875 |
| 5 | QPSK | 278 | 0.54296875 |
| 6 | QPSK | 406 | 0.79296875 |
| 7 | QPSK | 551 | 1.076171875 |
| 8 | 16 QAM | 364 | 1.421875 |
| 9 | 16 QAM | 457 | 1.78515625 |
| 10 | 16 QAM | 560 | 2.1875 |
| 11 | 64 QAM | 463 | 2.712890625 |
| 12 | 64 QAM | 533 | 3.123046875 |
| 13 | 64 QAM | 635 | 3.720703125 |
| 14 | 64 QAM | 735 | 4.306640625 |
| 15 | 64 QAM | 831 | 4.869140625 |

An example of generating a new CQI table having a target BLER=$10^{-2}$ using a method of [Table 18] based on [Table 9] and [Table 17] is represented in [Table 22], and an example of generating a new CQI table having a target BLER=$10^{-4}$ using a method of [Table 18] based on [Table 11] and [Table 17] is represented in [Table 23]. In a case of using [Table 9] and [Table 17], it means that in P=a*(P1+P2), P1=1, P2=3, and a=½, and, in a case of using [Table 11] and [Table 17], it means that P1=3, P2=5, and a=½.

TABLE 22

| CQI index | modulation | code rate × 1024 | efficiency |
|---|---|---|---|
| 0 | | out of range | |
| 1 | QPSK | 64 | 0.1250 |
| 2 | QPSK | 99 | 0.1934 |
| 3 | QPSK | 157 | 0.3066 |
| 4 | QPSK | 251 | 0.4902 |
| 5 | QPSK | 379 | 0.7402 |
| 6 | QPSK | 526 | 1.0273 |
| 7 | 16 QAM (or QPSK) | 340 (or 679) | 1.3281 (or 1.3262) |
| 8 | 16 QAM | 434 | 1.6953 |
| 9 | 16 QAM | 553 | 2.1602 |
| 10 | 64 QAM (or 16 QAM) | 438 (or 658) | 2.5664 (or 2.5703) |
| 11 | 64 QAM | 517 | 3.0293 |
| 12 | 64 QAM | 616 | 3.6094 |
| 13 | 64 QAM | 719 | 4.2129 |
| 14 | 64 QAM | 822 | 4.8164 |
| 15 | 64 QAM | 910 | 5.3320 |

TABLE 23

| CQI index | modulation | code rate × 1024 | efficiency |
|---|---|---|---|
| 0 | | out of range | |
| 1 | QPSK | 40 | 0.0781 |
| 2 | QPSK | 64 | 0.1250 |
| 3 | QPSK | 99 | 0.1934 |
| 4 | QPSK | 157 | 0.3066 |
| 5 | QPSK | 251 | 0.4902 |
| 6 | QPSK | 379 | 0.7402 |
| 7 | QPSK | 526 | 1.0273 |
| 8 | 16 QAM(or QPSK) | 340 (or 679) | 1.3281 (or 1.3262) |
| 9 | 16 QAM | 434 | 1.6953 |
| 10 | 16 QAM | 553 | 2.1602 |
| 11 | 64 QAM(or 16 QAM) | 438 (or 658) | 2.5664 (or 2.5703) |
| 12 | 64 QAM | 517 | 3.0293 |
| 13 | 64 QAM | 616 | 3.6094 |
| 14 | 64 QAM | 719 | 4.2129 |
| 15 | 64 QAM | 822 | 4.8164 |

In the above description, a method of determining a third CQI table by newly determining spectral efficiency in consideration of spectral efficiency and the target BLER for each index in two different first and second CQI tables has been described, and CQI tables of the [Table 18] to [Table 23] may be determined according to the described method. Further, the code rate or spectral efficiency of each CQI table may be determined by a value a determined according to the target BLER value. In other words, a code rate or spectral efficiency for each CQI index J of the third CQI table may have (1−a)*R1(J)+a*R2(J) value, (1−a)*SE1(J)+a*SE2(J) value, or a value close to the value for the respective code rates R1(J) and R2(J) or spectral efficiency SE1(J) and SE2(J) values corresponding to the first CQI table and the second CQI table.

Example Embodiment 3

In 5G NR, in a case that the maximum modulation order is 8, that is, in a case that a 256QAM modulation scheme is allowed, only one CQI table for a case of target BLER=0.1 in [Table 10] may exist. In this case, the following method may be applied to generate a third CQI table having a target BLER=0.001.

First, from [Table 17] of Embodiment 1 or [Table 20] of Embodiment 2, in a case that the target BLER=0.001, as a modulation and code rate combination for an index 1, it may be identified that (QPSK, 50/1024) or (QPSK, 54/1024) is appropriate. In this way, combinations appropriate for the initial index may be first configured in the CQI table with the target BLER=0.001. (In this case, a method of another embodiment may be used for configuring the corresponding combinations, or the corresponding combinations may be determined after determining an operating SNR through simulation.) Thereafter, among combinations appropriate for the initial index, in [Table 10], combinations corresponding to spectral efficiency values lower than the lowest spectral efficiency are sequentially assigned from an index I, and modulation and code rate combinations in [Table 10] are sequentially assigned to the remaining indices. For example, when a combination appropriate for an initial index of the CQI table for a BLER=0.001 is (QPSK, 50/1024), spectral efficiency of a (QPSK, 50/1024) combination is lower than a (QPSK, 78/1024) combination corresponding to the lowest spectral efficiency in [Table 10]; thus, this combination is assigned to the index 1, as in [Table 24], and the existing combinations of [Table 10] are sequentially assigned to the subsequent indices. If the X number of combinations appropriate for the initial index are selected, it can be seen that among combinations in [Table 10], the X number of indexes are replaced with combinations appropriate for the initial index.

TABLE 24

| CQI index | modulation | code rate × 1024 | efficiency |
|---|---|---|---|
| 0 | | out of range | |
| 1 | QPSK | 50 | 0.0977 |
| 2 | QPSK | 78 | 0.1523 |
| 3 | QPSK | 193 | 0.3770 |
| 4 | QPSK | 449 | 0.8770 |
| 5 | 16 QAM | 378 | 1.4766 |
| 6 | 16 QAM | 490 | 1.9141 |
| 7 | 16 QAM | 616 | 2.4063 |
| 8 | 64 QAM | 466 | 2.7305 |
| 9 | 64 QAM | 567 | 3.3223 |
| 10 | 64 QAM | 666 | 3.9023 |
| 11 | 64 QAM | 772 | 4.5234 |
| 12 | 64 QAM | 873 | 5.1152 |
| 13 | 256 QAM | 711 | 5.5547 |
| 14 | 256 QAM | 797 | 6.2266 |
| 15 | 256 QAM | 885 | 6.9141 |

The CQI tables of [Table 17] to [Table 24] designed so far are only examples, and, in various example embodiments, each code rate or spectral efficiency may be configured to other modulation and code rate combinations having a close value within 10 to 20%.

Example Embodiment 4

This embodiment describes a method of determining a modulation and code rate combination according to a CQI index based on a pre-promised rule while using the existing CQI table as it is. In general, in a case that a newly designed CQI table as in Embodiments 1 to 3 is applied to the system, parameters indicating the corresponding CQI tables may be defined to higher layer signaling. For example, in 5G NR, a cqi-Table parameter included in CSI-ReportConfig may be used for indicating corresponding CQI tables. Further, it is possible to indirectly indicate the table by directly indicating the target BLER or a parameter corresponding to a value thereof in RRC or the like.

For example, in a case that a specific CQI table is indicated through a cqi-Table included in a CSI-ReportConfig configures, and that a target BLER or a user category is separately indicated, based on the CQI table, the BLER, or the user category indicated according to the indicators, an appropriate CQI index may be determined based on a rule determined in advance in the CQI table. In this case, in order to report the CSI to the base station, the UE may transmit CQI indexes determined based on the target BLER or user category, the CQI table, and the measured received SNR to the base station through appropriate parameters.

First, in the CQI table, a code rate*1024 and spectral efficiency according to each index J are R(J) and SE(J), respectively, the modulation order is Q(J), and the target BLER=$10^{-P}$. A method of determining an appropriate value F(Q(J), P) based on the target BLER and the modulation order, and determining a final code rate with a method of subtracting the determined appropriate value F(Q(J), P) from the code rate R(J) or adding the determined appropriate value F(Q(J), P) to the code rate R(J) will be described. In other words, in a case that the target BLER was indicated in higher layer signaling and that the CQI table to be used was indicated, an effective code rate $R_{eff}$(J)*1024 may be calculated, for example, using a method such as [Equation 1]. (In the disclosure, for convenience, a value acquired by multiplying the code rate by 1024 is used, but the code rate may be used as it is.)

$$R_{eff}(J)=R(J)-F(Q(J),P). \quad \text{[Equation 1]}$$

In [Equation 1], F(Q(J), P) may be a function determined in combination with a value P corresponding to the target BLER and a modulation order Q(J). Further, F(Q(J), P) may be separated to an independent function of $F_1$(Q(J)) that refers to a value determined based on the modulation order as in F(Q(J), P)=$F_1$(Q(J))+$F_2$(P) and $F_2$(P) refers to a value determined according to the target BLER. Further, in some cases, $F_1$(Q(J))=0 may be configured, and $R_{eff}$(J) may be configured to a value independent of the modulation order. For example, in a case that $F_1$(Q(J))=0 and $F_2$(P)=(P−1)*c are configured, according to [Equation 1], it can be seen that, if the target BLER=$10^{-2}$ then $R_{eff}$(J)=R(J)−c, if the target BLER=$10^{-3}$ then $R_{eff}$(J)=R(J)−2*c, if the target BLER=$10^{-4}$ then $R_{eff}$(J)=R(J)−3*c, if the target BLER=$10^{-5}$ then $R_{eff}$(J)= R(J)−4*c. In [Equation 1], an appropriate value for a constant c may be selected according to the system. For example, with reference to [Table 9] and [Table 11], the constant c may be configured to a value equal to 12 by equally dividing a difference 48 between values 78 and 30 of an index 1, and be a value configured in consideration of an average of a difference according to each modulation and code rate combination. Equation 1 as described above is only an example embodiment for calculating an effective code rate. That is, according to the disclosure, an effective code rate may be determined based on a modulation order, a value corresponding to a target BLER, and a spectral efficiency value, and Equation 1 is an example embodiment for determining an effective code rate using the above parameters.

[Equation 1] illustrates that specific values are subtracted from or added to the existing code rate according to a predetermined rule, but, in general, a method of using a specific ratio value such as multiplying or dividing the existing code rate by an appropriate value according to a predetermined rule may be used.

Example Embodiment 5

In Embodiments 1 to 4, a method of designing or determining a CQI table was described. CQI tables designed in this way may be stored in the base station or the UE and used for CQI index determination or CSI reporting.

For example, as in [Table 9], [Table 10], [Table 11] as well as a newly designed [Table 17], CQI tables designed for a target BLER=0.001 may be used for CQI index determination or CSI reporting as follows:

[CQI Determination-2]

A single PDSCH transport block having a modulation order (or scheme), target code rate, and TBS combination corresponding to the CQI index should be received not exceeding the following transport block error probability:

In a case that a CSI-upper layer parameter cqi-Table included in a CSI-ReportConfig configures (or indicates) [Table 9] or [Table 10], the target transport block error probability is 0.1

In a case that a CSI-upper layer parameter cqi-Table included in a CSI-ReportConfig configures (or indicates) [Table 17], the target transport block error probability is 0.001

In a case that a CSI-higher layer parameter cqi-Table included in a CSI-ReportConfig configures (or indicates) [Table 11], the target transport block error probability is 0.00001

The above example illustrates the case of four CQI tables by adding a case of a target BL ER=0.001, but, in general, considering more target BLERs and more diverse service scenarios, some of [Table 19] to [Table 24] may be additionally used.

In Embodiments 1 to 5, a newly generated CQI table or characteristics and use methods of the generated CQI table have been described. Thereafter, a method of designing an MCS table according to the target BLER will be described.

Example Embodiment 6

Because the error probability compared to the increase in SNR decreases exponentially, even in a case of designing or configuring an optimal or improved MCS table, it is preferable to design the optimal MCS table considering a log-scale to a bit error rate or a target BLER. For example, because a target BLER 0.001 corresponds to an intermediate value in a log-scale of a target BLER 0.1 and 0.00001, an MCS table for the target BLER 0.001 may be generated by appropriately using the MCS table of [Table 12] to [Table 16].

It is assumed that there are a first MCS table and a second MCS table having an identical maximum modulation scheme or order and that target BLERs are different from each other as in $10^{-P1}$ and $10^{-P2}$. A new third MCS table having a target BLER of $10^{-P}$ and the same maximum modulation order may be generated to satisfy at least some or all of the following conditions. (Assuming P1<P<P2)

Condition 1) Spectral efficiency corresponding to a modulation and code rate combination of an index I of a third MCS table is smaller than or equal to that corresponding to a modulation and code rate combination corresponding to an index I of a first MCS table, and is greater than or equal to that corresponding to a modulation and code rate combination corresponding to an index I of a second MCS table.

Condition 2-1) The same modulation and code rate combinations commonly included in the first MCS table and the second MCS table are all included in the third MCS table. Hereinafter, a set including all of the same modulation and code rate combinations is referred to as a set S1 for convenience.

Condition 2-2) Assuming that among the same modulation and code rate combinations commonly included in the first MCS table and the second MCS table, a combination with the lowest spectral efficiency is C1 and a combination with the highest spectral efficiency is C2, the third MCS table includes all modulation and code rate combinations equal to or higher than C1 and equal to or lower than C2 in the first MCS table and the second M(CS table. Hereinafter, all of the same modulation and code rate combinations are referred to as a set S2 for convenience.

Condition 3) If P=a*(P1+P2) and the number of the same combinations in condition 2) is X, an index for the combination with the lowest spectral efficiency among the commonly included identical combinations is determined to $g_{MCS}(a)$–floor (X/2) or $g_{MCS}(a)$–ceil (X/2), and indexes are sequentially determined for the remaining identical combination included in common. Here, floor(x) means the largest integer smaller than or equal to the real number x, ceil(x) means the smallest integer greater than or equal to the real number x, and $g_{MCS}(a)$ means the integer determined according to a. a is a number that may be selected appropriately according to the target BLER, and in the case that P1=1, and P2=5, in order to configure to P=2, it may be expressed as $a=\frac{1}{3}$, in order to configure to P=3, it may be expressed as $a=\frac{1}{2}$, and in order to configure to P=4, it may be expressed as $a=\frac{2}{3}$. In the disclosure, for convenience, $g_{MCS}(\frac{1}{2})=14$ or 15 is configured and described, but it may be configured to other values. In a case that $g_{MCS}(a)$–floor (X/2)<0, $g_{MCS}(a)$–ceil(X/2)<0, $g_{MCS}(a)$–floor(X/2)+X>28 (or 27), or $g_{MCS}(a)$–ceil(X/2)+X>28 (or 27), modulation and code rate combinations corresponding to less than an index 0 or exceeding an index 28 (or 27) are excluded.

Condition 4) Assuming that an index assigned to a combination having the lowest spectral efficiency among the same combinations included in the set S1 or S2 is J, the rate combinations, the J number of combinations having high spectral efficiency among modulation and code rate combinations not included in the set S1 or S2 while having lower spectral efficiency than modulation and code rate combinations included in the set S1 or S2 among modulation and code rate combinations of the second MCS table are assigned in order to indices from 0 to (J−1).

Condition 5) When an index assigned to a combination having the highest spectral efficiency among the same combinations included in the set S1 or S2 is K, the (28−K) or (27−K) number of combinations having lower spectral efficiency among modulation and code rate combinations not included in the set S1 or S2 while having spectral efficiency higher than the modulation and code rate combinations included in the set S1 or S2 among modulation and code rate combinations of a first MCS table are assigned in order to indexes from (K+1) to 28 or 27. Here, the value of 28 or 27 may vary according to the number of reserved indexes in a given MCS table (e.g., 31−(number of reserved indexes)).

As a specific embodiment considering the above conditions, a method of generating a new MCS table having a target BLER of $10^{-3}$ using [Table 12] and [Table 14] will be described as follows. First, according to condition 2-1), a set S1 of modulation and code rate combinations commonly included in [Table 12] and [Table 14] is determined. It can be seen that the common combinations are total 23 (X1=23) as in (QPSK, 120/1024), (QPSK, 157/1024), (QPSK, 193/1024), (QPSK, 251/1024), (QPSK, 308/1024), (QPSK, 379/1024), (QPSK, 449/1024), (QPSK, 526/1024), (QPSK, 602/1024), (16QAM, 340/1024), (16QAM, 378/1024), (16QAM, 434/1024), (16QAM, 490/1024), (16QAM, 553/1024), (16QAM, 616/1024), (64QAM, 438/1024), (64QAM, 466/1024), (64QAM, 517/1024), (64QAM, 567/

1024), (64QAM, 616/1024), (64QAM, 666/1024), (64QAM, 719/1024), and (64QAM, 772/1024).

In a case that a set S2 of modulation and code rate combinations is determined according to condition 2-2) for [Table 12] and [Table 14], it can be seen that the combinations included in S2 are total 25 (X2=25) as in (QPSK, 120/1024), (QPSK, 157/1024), (QPSK, 193/1024), (QPSK, 251/1024), (QPSK, 308/1024), (QPSK, 379/1024), (QPSK, 449/1024), (QPSK, 526/1024), (QPSK, 602/1024), (QPSK, 679/1024), (16QAM, 340/1024), (16QAM, 378/1024), (16QAM, 434/1024), (16QAM, 490/1024), (16QAM, 553/1024), (16QAM, 616/1024), (16QAM, 658/1024), (64QAM, 438/1024), (64QAM, 466/1024), (64QAM, 517/1024), (64QAM, 567/1024), (64QAM, 616/1024), (64QAM, 666/1024), (64QAM, 719/1024), and (64QAM, 772/1024).

Thereafter, because a=½ by condition 3), if $g_{MCS}(\frac{1}{2})=14$ then $g_{MCS}(a)-floor(X/2)=14-12=2$. Accordingly, 23 combinations included in the set S1 are assigned in order from indices 2 to 24. Thereafter, according to condition 4), in [Table 14], a (QPSK, 78/1024) combination is assigned to an index 0, a (QPSK, 99/1024) combination is assigned to an index 1 in order, and in [Table 12], (64QAM, 822/1024), (64QAM, 873/1024), (64QAM, 910/1024), and (64QAM, 948/1024) are assigned to indexes 25, 26, 27, and 28 in order, respectively.

The MC S table generated in this w ay is illustrated in [Table 25].

TABLE 25

| MCS Index $I_{MCS}$ | Modulation Order Qm | Target code Rate [R × 1024] | Spectral efficiency |
|---|---|---|---|
| 0 | 2 | 78 | 0.1523 |
| 1 | 2 | 99 | 0.1934 |
| 2 | 2 | 120 | 0.2344 |
| 3 | 2 | 157 | 0.3066 |
| 4 | 2 | 193 | 0.3770 |
| 5 | 2 | 251 | 0.4902 |
| 6 | 2 | 308 | 0.6016 |
| 7 | 2 | 379 | 0.7402 |
| 8 | 2 | 449 | 0.8770 |
| 9 | 2 | 526 | 1.0273 |
| 10 | 2 | 602 | 1.1758 |
| 11 | 4 | 340 | 1.3281 |
| 12 | 4 | 378 | 1.4766 |
| 13 | 4 | 434 | 1.6953 |
| 14 | 4 | 490 | 1.9141 |
| 15 | 4 | 553 | 2.1602 |
| 16 | 4 | 616 | 2.4063 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

In condition 3), if $g_{MCS}(\frac{1}{2})=15$, because $g_{MCS}(a)-floor(X/2)=15-12=3$, 23 combinations included in the set S1 are assigned sequentially from indexes 3 to 25. Further, according to condition 4), in [Table 14], (QPSK, 64/1024), (QPSK, 78/1024), and (QPSK, 99/1024) combinations are sequentially assigned to indexes 0, 1, and 2, and in [Table 12], (64QAM, 822/1024), (64QAM, 873/1024), and (64QAM, 910/1024) combinations are sequentially assigned to indexes 26, 27, and 28, respectively. The MCS table generated in this way is illustrated in [Table 26].

TABLE 26

| MCS Index $I_{MCS}$ | Modulation Order Qm | Target code Rate [R × 1024] | Spectral efficiency |
|---|---|---|---|
| 0 | 2 | 64 | 0.1250 |
| 1 | 2 | 78 | 0.1523 |
| 2 | 2 | 99 | 0.1934 |
| 3 | 2 | 120 | 0.2344 |
| 4 | 2 | 157 | 0.3066 |
| 5 | 2 | 193 | 0.3770 |
| 6 | 2 | 251 | 0.4902 |
| 7 | 2 | 308 | 0.6016 |
| 8 | 2 | 379 | 0.7402 |
| 9 | 2 | 449 | 0.8770 |
| 10 | 2 | 526 | 1.0273 |
| 11 | 2 | 602 | 1.1758 |
| 12 | 4 | 340 | 1.3281 |
| 13 | 4 | 378 | 1.4766 |
| 14 | 4 | 434 | 1.6953 |
| 15 | 4 | 490 | 1.9141 |
| 16 | 4 | 553 | 2.1602 |
| 17 | 4 | 616 | 2.4063 |
| 18 | 6 | 438 | 2.5664 |
| 19 | 6 | 466 | 2.7305 |
| 20 | 6 | 517 | 3.0293 |
| 21 | 6 | 567 | 3.3223 |
| 22 | 6 | 616 | 3.6094 |
| 23 | 6 | 666 | 3.9023 |
| 24 | 6 | 719 | 4.2129 |
| 25 | 6 | 772 | 4.5234 |
| 26 | 6 | 822 | 4.8164 |
| 27 | 6 | 873 | 5.1152 |
| 28 | 6 | 910 | 5.3320 |
| 29 | 2 | reserved | |
| 30 | 4 | reserved | |
| 31 | 6 | reserved | |

In a case that $g_{MCS}(\frac{1}{2})=14$ in condition 3) and an MCS table is generated based on the set S2, because $g_{MCS}(a)-floor(X/2)=14-12=2$, 25 combinations included in the set S2 are sequentially assigned from indices 2 to 26. Further, according to condition 4), (QPSK, 78/1024) and (QPSK, 99/1024) combinations in [Table 14] are sequentially assigned to indexes 0 and 1, and (64QAM, 822/1024) and (64QAM, 873/1024) combinations in [Table 12] are sequentially assigned to indexes 27 and 28, respectively. The MCS table generated in this way is illustrated in [Table 27].

TABLE 27

| MCS Index $I_{MCS}$ | Modulation Order Qm | Target code Rate [R × 1024] | Spectral efficiency |
|---|---|---|---|
| 0 | 2 | 78 | 0.1523 |
| 1 | 2 | 99 | 0.1934 |
| 2 | 2 | 120 | 0.2344 |
| 3 | 2 | 157 | 0.3066 |
| 4 | 2 | 193 | 0.3770 |
| 5 | 2 | 251 | 0.4902 |
| 6 | 2 | 308 | 0.6016 |
| 7 | 2 | 379 | 0.7402 |
| 8 | 2 | 449 | 0.8770 |
| 9 | 2 | 526 | 1.0273 |
| 10 | 2 | 602 | 1.1758 |
| 11 | 2 | 679 | 1.3262 |
| 12 | 4 | 340 | 1.3281 |
| 13 | 4 | 378 | 1.4766 |
| 14 | 4 | 434 | 1.6953 |
| 15 | 4 | 490 | 1.9141 |
| 16 | 4 | 553 | 2.1602 |
| 17 | 4 | 616 | 2.4063 |

TABLE 27-continued

| MCS Index $I_{MCS}$ | Modulation Order Qm | Target code Rate [R × 1024] | Spectral efficiency |
|---|---|---|---|
| 18 | 4 | 658 | 2.5703 |
| 19 | 6 | 438 | 2.5664 |
| 20 | 6 | 466 | 2.7305 |
| 21 | 6 | 517 | 3.0293 |
| 22 | 6 | 567 | 3.3223 |
| 23 | 6 | 616 | 3.6094 |
| 24 | 6 | 666 | 3.9023 |
| 25 | 6 | 719 | 4.2129 |
| 26 | 6 | 772 | 4.5234 |
| 27 | 6 | 822 | 4.8164 |
| 28 | 6 | 873 | 5.1152 |
| 29 | 2 | reserved | |
| 30 | 4 | reserved | |
| 31 | 6 | reserved | |

In this way, another MCS table may be generated using the set S1 or the set S2 while changing a value of $g_{MCS}(a)$ and a calculated value of floor(X/2) or ceil(X/2).

Example Embodiment 7

In 5G NR, in a case that the maximum modulation order is 8, that is, in a case that a 256QAM modulation scheme is allowed, there is only one MCS table for the case of a target BLER=0.1 in [Table 10], In this case, the following method may be applied to generate a third MCS table having a target BLER=0.001.

First, from [Table 25] to [Table 27] of Embodiment 6, in a case that the target BLER=0.001, it can be seen that (QPSK, 64/1024) or (QPSK, 78/1024) is appropriate as modulation and code rate combination for an index 0, in a CQI table with the target BLER=0,001, combinations appropriate for an initial index may be configured to (QPSK, 64/1024), (QPSK, 78/1024), and (QPSK, 99/1024). (In this case, a method of another embodiment may be used for configuring the corresponding combinations, or the corresponding combinations may be determined after determining an operating SNR through simulation.) Thereafter, among combinations appropriate for the initial index, combinations corresponding to spectral efficiency values lower than the lowest spectral efficiency in [Table 13] are sequentially assigned from an index 0, and modulation and code rate combinations in the existing [Table 10] are sequentially assigned to the remaining indices. For example, because spectral efficiency of (QPSK, 64/1024), (QPSK, 7811024), and (QPSK, 99/1024) combination is lower than that of the (QPSK, 120/1024) combination corresponding to the lowest spectral efficiency in [Table 13], these combinations are assigned to indexes 0, 1, and 2, respectively, as in [Table 28], and the existing combinations of [Table 13] are sequentially assigned to subsequent indexes. In the same method, in a case that combinations appropriate for the initial index are configured to (QPSK, 78/1024) and (QPSK, 99/1024), an MCS table such as [Table 29] may be obtained, and when the X number of indices are selected as combinations appropriate for the initial index, it can be seen that the X number of indices among combinations of [Table 13] are replaced with combinations appropriate for the initial index.

TABLE 28

| MCS Index $I_{MCS}$ | Modulation Order Qm | Target code Rate [R × 1024] | Spectral efficiency |
|---|---|---|---|
| 0 | 2 | 64 | 0.1250 |
| 1 | 2 | 78 | 0.1523 |
| 2 | 2 | 99 | 0.1934 |
| 3 | 2 | 120 | 0.2344 |
| 4 | 2 | 193 | 0.3770 |
| 5 | 2 | 308 | 0.6016 |
| 6 | 2 | 449 | 0.8770 |
| 7 | 2 | 602 | 1.1758 |
| 8 | 4 | 378 | 1.4766 |
| 9 | 4 | 434 | 1.6953 |
| 10 | 4 | 490 | 1.9141 |
| 11 | 4 | 553 | 2.1602 |
| 12 | 4 | 616 | 2.4063 |
| 13 | 4 | 658 | 2.5703 |
| 14 | 6 | 466 | 2.7305 |
| 15 | 6 | 517 | 3.0293 |
| 16 | 6 | 567 | 3.3223 |
| 17 | 6 | 616 | 3.6094 |
| 18 | 6 | 666 | 3.9023 |
| 19 | 6 | 719 | 4.2129 |
| 20 | 6 | 772 | 4.5234 |
| 21 | 6 | 822 | 4.8164 |
| 22 | 6 | 873 | 5.1152 |
| 23 | 8 | 682.5 | 5.3320 |
| 24 | 8 | 711 | 5.5547 |
| 25 | 8 | 754 | 5.8906 |
| 26 | 8 | 797 | 6.2266 |
| 27 | 8 | 841 | 6.5703 |
| 28 | 2 | reserved | |
| 29 | 4 | reserved | |
| 30 | 6 | reserved | |
| 31 | 8 | reserved | |

TABLE 29

| MCS Index $I_{MCS}$ | Modulation Order Qm | Target code Rate [R × 1024] | Spectral efficiency |
|---|---|---|---|
| 0 | 2 | 78 | 0.1523 |
| 1 | 2 | 99 | 0.1934 |
| 2 | 2 | 120 | 0.2344 |
| 3 | 2 | 193 | 0.3770 |
| 4 | 2 | 308 | 0.6016 |
| 5 | 2 | 449 | 0.8770 |
| 6 | 2 | 602 | 1.1758 |
| 7 | 4 | 378 | 1.4766 |
| 8 | 4 | 434 | 1.6953 |
| 9 | 4 | 490 | 1.9141 |
| 10 | 4 | 553 | 2.1602 |
| 11 | 4 | 616 | 2.4063 |
| 12 | 4 | 658 | 2.5703 |
| 13 | 6 | 466 | 2.7305 |
| 14 | 6 | 517 | 3.0293 |
| 15 | 6 | 567 | 3.3223 |
| 16 | 6 | 616 | 3.6094 |
| 17 | 6 | 666 | 3.9023 |
| 18 | 6 | 719 | 4.2129 |
| 19 | 6 | 772 | 4.5234 |
| 20 | 6 | 822 | 4.8164 |
| 21 | 6 | 873 | 5.1152 |
| 22 | 8 | 682.5 | 5.3320 |
| 23 | 8 | 711 | 5.5547 |
| 24 | 8 | 754 | 5.8906 |
| 25 | 8 | 797 | 6.2266 |
| 26 | 8 | 841 | 6.5703 |
| 27 | 8 | 885 | 6.9141 |
| 28 | 2 | reserved | |
| 29 | 4 | reserved | |
| 30 | 6 | reserved | |
| 31 | 8 | reserved | |

Example Embodiment 8

This embodiment relates to a method of designing an appropriate MCS table and a method of transmitting and receiving data based on the MCS table in a case that a 1024QAM modulation scheme with a maximum modulation order of 10 is allowed in a wireless communication system such as 5G NR.

First, in a wireless communication system, a CQI table defined as in [Table 30] is assumed. In other words, it is assumed that the CQI table of [Table 30] may be configured in the IE or the base station as a cqi_table parameter in [CQI Determination-1] or [CQI Determination-2]. (For convenience of description, in a case that a CSI-upper layer parameter eqi-Table included in a CSI-ReportConfig configures (or indicates) [Table 30], the disclosure is described based on a CQI table appropriate for the target transport block error probability of 0.1, but the disclosure is not limited thereto and may be equally applied to other CQI tables.)

TABLE 30

| CQI index | modulation | code rate × 1024 | Spectral efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16 QAM | 378 | 1.4766 |
| 5 | 16 QAM | 616 | 2.4063 |
| 6 | 64 QAM | 567 | 3.3223 |
| 7 | 64 QAM | 666 | 3.9023 |
| 8 | 64 QAM | 772 | 4.5234 |
| 9 | 64 QAM | 873 | 5.1152 |
| 10 | 256 QAM | 711 | 5.5547 |
| 11 | 256 QAM | 797 | 6.2266 |
| 12 | 256 QAM | 885 | 6.9141 |
| 13 | 256 QAM | 948 | 7.4063 |
| 14 | 1024 QAM | 853 | 8.3321 |
| 15 | 1024 QAM | 948 | 9.2578 |

A newly defined MCS table may be configured to the UE or the base station based on [Table 13], which is one of MCS tables of the 5G NR system, and, for convenience, it is assumed that MCS indexes 23 to 26 of the newly defined MCS table Correspond to a 1024QAM modulation scheme, that is, a modulation order of 10. In a case that an MCS index 22 corresponds to 256QAM, the MCS index 23 may be configured to an average value or a value close to the average value of spectral efficiency corresponding to each of CQI indexes 13 and 14 of the CQI table [Table 30]. For example, because an average value of spectral efficiency 7.4063 of a CQI index 13 in [Table 30] and spectral efficiency 8.3321 of a CQI index 14 in [Table 30] is 7.8692, spectral efficiency corresponding to an index 23 of the newly defined MCS table may be configured to 7.8692 or an approximate value thereof. Because spectral efficiency 7.4063 of the CQI index 13 in [Table 30] and spectral efficiency 8.3321 of CQI index 14 in [Table 30] are approximate values of actual spectral efficiency, an average value may be obtained more accurately as follows:

$$\frac{1}{2} \times \left( \frac{948}{1024} \times 8 + \frac{853}{1024} \times 10 \right) \cong 7.8682.$$

In some cases, spectral efficiency may be defined (or determined) to an approximate value of the average value instead of an accurate average value, wherein the approximate value may refer, for example, to a value within +3% or −3% of the accurate average value.

In a case that spectral efficiency is determined to 7.8682, a [code rate (R)×1024] value is a value close to 805.7, and in a case that spectral efficiency is determined to 7.8692, because a [code rate (R)×10241] value is a value close to 805.8, a [code rate (R)×1024] value of the MCS index 23 may be defined as a value such as 805, 805.5, 806, or 806.5. Further, spectral efficiency values corresponding to the [code rate (R)×1024] values (805, 805.5, 806, or 806.5) may be equal to 7.8613, 7.8662, 7.8711, and 7.8760, respectively.

As spectral efficiency and [code rate (R)×1024] value corresponding to an MCS index 24 of the newly defined MCS table, values corresponding to a CQI table index 14 in [Table 30] may be used as they are. Similarly, as spectral efficiency and [code rate (R)×1024] value corresponding to an MCS index 26, values corresponding to a CQI table index 15 in [Table 30] may be used as they are.

Spectral efficiency corresponding to an MCS index 25 of the newly defined MCS table may be determined to an average value or an approximate value of the average value of values corresponding to a CQI index 14 and a CQI index 15 in [Table 30]. (Alternatively, spectral efficiency may be determined to an average value or an approximate value of the average value of values corresponding to the MCS index 24 and the MCS index 26.)

Because spectral efficiency values corresponding to a CQI index 14 and a CQI index 15 in [Table 30] are 8.3321 and 9.2578, respectively, an average value thereof is a value close to 8.7950. Alternatively, when an accurate average value is obtained as follows:

$$\frac{1}{2} \times \left( \frac{853}{1024} \times 10 + \frac{948}{1024} \times 10 \right) \cong 8.7939;$$

thus, the average value of spectral efficiency may be 8.7939. Accordingly, a spectral efficiency value corresponding to the MCS index 25 may be determined as an approximate value of an accurate average value such as 8.7939 or 8,7950. Here, the meaning of the approximate value may refer, for example, to a value within −3% to +3% of the accurate average value, In a case that spectral efficiency is determined to 8.7939, a [code rate (R)×1024] value is a value close to 900.5, and, in a case that spectral efficiency is determined to 8.7950, because a [code rate (R)×1024] value is a value close to 900.6, the [code rate (R)×1024] value of the MCS index 25 may be defined as a value such as 900, 900.5, or 901. Further, spectral efficiency values corresponding to the [code rate (R)×1024] values (900, 900.5, or 901) may be equal to 8.7891, 8.7939 (~8.7940), and 8.7988, respectively.

An example of the MCS table designed through the method described so far is illustrated in [Table 31]. For reference, indices 27 to 31 in Table 31 sequentially correspond to modulation orders 2, 4, 6, 8, and 10, and refer, for example, to indices that may be configured for data retransmission.

TABLE 31

| MCS Index $I_{MCS}$ | Modulation Order Qm | Target Code Rate [R × 1024] | Spectral Efficiency |
|---|---|---|---|
| 0 | — | — | — |
| 1 | — | — | — |

TABLE 31-continued

| MCS Index $I_{MCS}$ | Modulation Order Qm | Target Code Rate [R × 1024] | Spectral Efficiency |
|---|---|---|---|
| . . . | . . . | . . . | . . . |
| 22 | — | — | — |
| 23 | 10 | 805.5 | 7.8662 |
| 24 | 10 | 853 | 8.3321 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

TABLE 32-continued

| MCS Index $I_{MCS}$ | Modulation Order Qm | Target code Rate [R × 1024] | Spectral efficiency |
|---|---|---|---|
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

[Table 31] is an example of an MCS table obtained by removing values of four indexes for 1024QAM and one index for reserved indication in [Table 13]. In this case, various MCS tables may be determined according to a method of determining a MCS combination to be removed from [Table 13]. (However, because a combination of an MCS index 0 usually refers to the most robust modulation order and code rate combination that may be tolerated in the system, the MCS index 0 may be equally configured.) For example, three modulation order and code rate combinations are removed from the MCS indices corresponding to a modulation order 4 of [Table 13] and two modulation order and code rate combinations are removed from MCS indices corresponding to a modulation order 6, after the MCS indices are sequentially realigned, a new MCS table may be formed by combining MCS indexes corresponding to 1024QAM in [Table 31]. As a more specific example, after modulation order and code rate combinations (three combinations) of MCS indices 5, 7, and 9 are removed from MCS indices corresponding to a modulation order 4 in [Table 13] and modulation order and code rate combinations (two combinations) of MCS indexes 12 and 14 are removed from MCS indices corresponding to a modulation order 6, an example of the case that the MCS indices are combined with [Table 31] is illustrated in [Table 32].

TABLE 32

| MCS Index $I_{MCS}$ | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 434 | 1.6953 |
| 6 | 4 | 553 | 2.1602 |
| 7 | 4 | 658 | 2.5703 |
| 8 | 6 | 466 | 2.7305 |
| 9 | 6 | 567 | 3.3223 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3321 |
| 25 | 10 | 900.5 | 8.7939 |

As another example, in [Table 13], after modulation order and code rate combinations of an MCS index 5, MCS index 7, and MCS index 9 are removed from MCS indexes corresponding to a modulation order 4, modulation order and code rate combinations of an MCS index 11 are removed from MCS indexes corresponding to a modulation order 6, and modulation order and code rate combinations of an MCS index 20 are removed from MCS indexes corresponding to a modulation order 8, an example of a case that the MCS indexes are combined with [Table 31] is illustrated in [Table 33].

TABLE 33

| MCS Index $I_{MCS}$ | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 434 | 1.6953 |
| 6 | 4 | 553 | 2.1602 |
| 7 | 4 | 658 | 2.5703 |
| 8 | 6 | 517 | 3.0293 |
| 9 | 6 | 567 | 3.3223 |
| 10 | 6 | 616 | 3.6094 |
| 11 | 6 | 666 | 3.9023 |
| 12 | 6 | 719 | 4.2129 |
| 13 | 6 | 772 | 4.5234 |
| 14 | 6 | 822 | 4.8164 |
| 15 | 6 | 873 | 5.1152 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3321 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

As another example, in [Table 13], after modulation order and code rate combinations of an MCS index 4 are removed from MCS indices corresponding to a modulation order 2, modulation order and code rate combinations of an MCS index 7 and MCS index 9 are removed from MCS indices corresponding to a modulation order 4, and modulation order and code rate combinations of an MCS index 12 and MCS index 14 are removed from MCS indices corresponding to a modulation order 6, an example of a case that the MCS indices are combined with [Table 31] is illustrated in [Table 34].

TABLE 34

| MCS Index $I_{MCS}$ | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 4 | 378 | 1.4766 |
| 5 | 4 | 434 | 1.6953 |
| 6 | 4 | 553 | 2.1602 |
| 7 | 4 | 658 | 2.5703 |
| 8 | 6 | 466 | 2.7305 |
| 9 | 6 | 567 | 3.3223 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3321 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

In this way, in a method of constituting a new MCS table based on the MCS table of [Table 13], in a case that a reserved field corresponding to 1024QAM is added while adding the D number of modulation order and code rate combinations corresponding to 1024QAM, the (D+1) number of combinations among MCS combinations of [Table 13] should be removed. [Table 32] to [Table 34] are examples of the case of D=4. For reference, because indices for a reserved indication are generally used for retransmission, it is preferable that an MCS index corresponding to each modulation order is included in the MCS table, but, in some cases, a reserved field corresponding to a specific modulation order may be omitted. Further, [Table 31] to [Table 34] are only examples, and combinations of modulation orders and code rates corresponding to some MCS levels in each MCS table may be removed or changed. Further, a new MCS table may be determined (or generated) by appropriately combining modulation order and code rate combinations of each MCS table.

For example, in constituting an MCS table, in a case that the MCS table is constituted to maximally include the modulation order and code rate combinations included in the CQI table and the corresponding spectral efficiency, an MCS table different from the MCS table of [Table 31] to [Table 34] may be defined. Here, maximally including the modulation order and code rate combinations included in the CQI table and spectral efficiency corresponding thereto may refer, for example, to the remaining modulation order and code rate combinations all being included in the MCS table, except for the predetermined number (e.g., within 1 to 3) of combinations among modulation order and code rate combinations included in the CQI table.

As a specific example, when the MCS table is designed to include as many combinations as possible in a case that the modulation order is 4 among modulation order and code rate combinations included in the CQI table of [Table 32], all or at least one of (modulation order, [code rate (R)×1024], spectral efficiency value)=(4, 378, 1.4766) and (4, 616, 2.4063) should be included in the MCS table. As an example of such an MCS table, the remaining modulation order and code rate combinations, except for modulation order and code rate combinations corresponding to an MCS index 6, MCS index 8, and MCS index 10 among MCS indexes corresponding to a modulation order 4 in [Table 13] may be included in the MCS table. In other words, in [Table 32] and [Table 33], an MCS table defined as (modulation order, [code rate (R)×1024], spectral efficiency value)=(4, 378, 1.4766) for an MCS index 5, and (modulation order, [code rate (R)×1024], spectral efficiency value)=(4, 490, 1.9141) for an index 6, and (modulation order, [code rate (R)×1024], spectral efficiency value)=(4, 616, 2.4063) for an index 7 may be defined. This is only an example, and all or at least one of (modulation order, [code rate (R)×1024], spectral efficiency value)=(4, 378, 1.4766) and (4, 616, 2.4063) should be included, but an MCS table including at least one or up to two of (4, 434, 1.6953), (4, 490, 1.9141), (4, 553, 2.1602), or (4, 658, 2.5703) may be defined. Therefore, as an MCS table supporting 1024QAM according to the disclosure, various MCS tables supporting 1024QAM, such as an MCS table supporting 1024QAM as in [Table 35] and [Table 36], may be used. [Table 35] illustrates an MCS table in which information indicated by an MCS index having a modulation order of 4 is replaced in the above-described manner from [Table 32]. [Table 36] illustrates an MCS table in which information indicated by an MCS index having a modulation order of 4 is replaced in the above-described manner from [Table 33].

TABLE 35

| MCS Index $I_{MCS}$ | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 490 | 1.9141 |
| 7 | 4 | 616 | 2.4063 |
| 8 | 6 | 466 | 2.7305 |
| 9 | 6 | 567 | 3.3223 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3321 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

TABLE 36

| MCS Index $I_{MCS}$ | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 490 | 1.9141 |
| 7 | 4 | 616 | 2.4063 |
| 8 | 6 | 517 | 3.0293 |
| 9 | 6 | 567 | 3.3223 |
| 10 | 6 | 616 | 3.6094 |
| 11 | 6 | 666 | 3.9023 |
| 12 | 6 | 719 | 4.2129 |
| 13 | 6 | 772 | 4.5234 |
| 14 | 6 | 822 | 4.8164 |
| 15 | 6 | 873 | 5.1152 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3321 |
| 25 | 10 | 900.5 | 8.7939 |
| 26 | 10 | 948 | 9.2578 |
| 27 | 2 | Reserved | |
| 28 | 4 | Reserved | |
| 29 | 6 | Reserved | |
| 30 | 8 | Reserved | |
| 31 | 10 | reserved | |

In [Table 35] and [Table 36], examples in which information indicated by the M(CS index of a modulation order 4 in [Table 32] and [Table 33] is replaced are described, but embodiments of the disclosure are not limited thereto. In [Table 32] and [Table 33], rows corresponding to MCS indices corresponding to modulation orders other than a modulation order 4 may be replaced. For example, in one of the CQI or MCS tables of [Table 9] to [Table 16], one or more modulation order and code rate combinations replace some of modulation order and code rate combinations corresponding to the same modulation order in [Table 32] to [Table 36]; thus, new MCS tables may be defined. Similarly, in the case of [Table 34], for indexes 5, 6, and 7, at least one of an index 6 or an index 7 is (modulation order, [code rate (R)×1024], spectral efficiency value)=(4, 616, 24063), and for the remaining two indices, an MCS table having characteristics corresponding to at least two of (modulation order, [code rate (R)×1024], spectral efficiency value)=(4, 434, 1.6953), (4, 490, 1.9141), (4, 553, 2.1602), or (4, 658, 2.5703) may be defined. Therefore, as an MCS table according to the disclosure, an MCS table, in which a set of (modulation order, [code rate (R)×1024], spectral efficiency value) corresponding to one or more indices of [Table 31] is changed to another value, as described above, may be used.

Further, in the CQI table of [Table 30], in a case that the maximum number of modulation order and code rate combinations of a case that the modulation order is 6 are included in the MCS table, all or at least some of combinations corresponding to (modulation order, [code rate (R)×1024], spectral efficiency value)=(6, 567, 3.3223), (6, 666, 3.9023), (6, 772, 4.5234), (6, 873, 5.1152) are included in the MCS table, whereas at least some of combinations corresponding to (modulation order, [code rate (R)×1024], spectral efficiency value)=(6, 466, 2.7305), (6, 517, 3.0293), (6, 616, 3.6094), (6, 719, 4.2129), and (6, 822, 4.8164)

should be excluded from the MCS table. As a specific example, considering an interval of spectral efficiency, modulation order and code rate combination between (modulation order, [code rate (R)×1024], spectral efficiency value)=(4, 616, 2.4063) and (6, 567, 3.3223) selected (6, 466, 2.7305) in [Table 35] and (6, 517, 3.0293) in [Table 36]. In [Table 35], (6, 517, 3.0293) and (6, 616, 3.6094) were excluded, and (6, 719, 4.2129) and (6, 822, 4.8164) were included. Because [Table 35] is an MCS table in which 1024QAM is the maximum modulation order, it may be appropriate to a system supporting relatively high spectral efficiency. A system requiring higher spectral efficiency may select (6, 517, 3.0293) instead of (6, 466, 2.7305) for an MCS index 8. In a system in which robustness is more important than spectral efficiency, all or at least one of (6, 517, 3.0293) or (6, 616, 3.6094) may be used instead of all or at least one of (6, 719, 4.2129) or (6, 822, 4.8164). (However, in this case, the MCS indices are appropriately aligned in order of spectral efficiency.) Such a modulation order and code rate combination may be changed similarly even in the case of [Table 30].

For reference, in [Table 13] and [Table 31] to [Table 36], a pair of (modulation order, [code rate (R)×1024], spectral efficiency value) corresponding to indices 1, 2, and 3 are (2, 193, 0.3770), (2, 308, 0,6016), and (2, 449, 0,8770), respectively. However, the spectral efficiency value 0.6016 has a value outside approximate values 0.6082 to 0.6458 within −3% to +3% with respect to an average value 0.6270 of spectral efficiency values 0.3770 and 0.8770 corresponding to indexes 1 and 3. That is, the modulation order and code rate combination of the index 2 does not exist in the CQI table of [Table 10] or [Table 30], and may be regarded as a combination that is not based on an average value of two specific modulation order and code rate combinations or an approximate value thereof. However, it can be seen that the (2, 308, 0,6016) combination is a combination included in the CQI table with a different maximum modulation order, that is, not 8, as in [Table 9] and [Table 11]. In a case of defining the MCS table, it is generally preferable that spectral efficiency is as equal as possible, but as in the above case, the modulation order and code rate combinations included in the CQI table corresponding to the maximum order value among modulation orders included in the MCS table are included as many as possible, but in some cases, at least one of modulation order and code rate combinations included in the CQI table corresponding to a maximum modulation order different from the maximum order value may be included.

For reference, a spectral efficiency value for an index 2 may be configured to 0.6270, which is the average value, or an approximate value thereof, and in a case that a spectral efficiency value is configured to 0.6270, a pair of (modulation order, [code rate (R)×1024], spectral efficiency value) may be determined as in (2, 321, 0.6270).

Further, spectral efficiency values included in [Table 31] to [Table 36] may be replaced with approximate values of each value. As a specific example, for an index 23 of [Table 31] to [Table 36], ([code rate (R)×1024], spectral efficiency value) may be replaced with values such as (805, 7.8613), (806, 7.8711), or (806.5, 7.8760), respectively. Similarly, for an index 25 of [Table 31] to [Table 36], ([code rate (R)×1024], spectral efficiency value) may be replaced with values such as (900, 8.7891) or (901, 8.7988), respectively. Further, spectral efficiency values 7.8662, 8.3321, 8.7939, and 9.2578 corresponding to MCS indexes 23, 24, 25, and 26 of [Table 31] to [Table 36] may be replaced with approximate values within −3% to +3%, for example. When each of these spectral efficiency values are SE(23), SE(24), SE(25), and SE(26), [code rate (R)×1024] values may be generally configured to have one of ⌊SE(i)/10×1024⌋ or ⌊SE(i)/10×1024⌋±0.5 value for i=23, 24, 25, and 26. (Here, ⌊·⌋ means a flooring operation, and ⌈·⌉ means a ceiling operation.).

MCS tables of [Table 25] to [Table 36] designed so far are only examples, and in some cases, each code rate or spectral efficiency may be configured to another modulation and code rate combination having a value close to 10 to 20%.

Example Embodiment 9

This embodiment describes a method of determining a modulation and code rate combination according to an MCS index based on a pre-promised rule while using the existing MCS table as it is. In general, in a case that a newly designed MCS table is applied to the system as in Embodiments 6 and 7, corresponding MCS tables may be indicated using parameters corresponding to the corresponding MCS tables through higher layer signaling. Further, it is possible to indirectly indicate the tables by directly indicating the target BLER or a parameter corresponding to a value thereof in RRC or the like.

For example, in a case that a specific MCS table is indicated through higher layer signaling and that a target BLER or a user category is separately indicated, based on the MCS table, BLER, or user category indicated according to the above indicators, an appropriate MCS index may be determined based on rules predetermined in the MCS table. In this case, when the base station indicates a target BLER or user category and an MCS table to the UE, the UE may determine an MCS index according to the target BLER, that is, determine a modulation scheme and code rate or spectral efficiency.

First, in the MCS table, a code rate*1024 and spectral efficiency according to each index J are R(J) or SE(J), and the modulation order is Q(J), and the target BLER=10^{-P}. A method of determining a final code rate with a method of determining an appropriate value F(Q(J), P) based on the target BLER and the modulation order, and subtracting the determined appropriate value F(Q(J), P) from the code rate R(J) or adding the determined appropriate value F(Q(J), P) to the code rate R(J) will be described. In other words, in a case that the target BLER is indicated through higher layer signaling and the CQI table to be used is indicated, the effective code rate $R_{eff}$(J)*1024 may be calculated using the same method as in [Equation 1] described above. (In the disclosure, for convenience, a value obtained by multiplying the code rate by 1024 is used, but the code rate may be used as it is.)

In [Equation 1], F(Q(J), P) may be a function determined in combination with a value P corresponding to the target BLER and the modulation order Q(J). Further, F(Q(J), P) may be separated to an independent function of $F_1$(Q(J)) that refers, for example, to a value determined based on the modulation order as in F(Q(J), P)=$F_1$(Q(J))+$F_2$(P) and $F_2$(P) that refers, for example, to a value determined according to the target BLER. Further, in various cases, it may be configured to $F_1$(Q(J))=0, and $R_{eff}$(J) may be configured to a value independent of the modulation order. For example, in a case that it is configured to $F_1$(Q(J))=0 and $F_2$(P)=(P−1)*c, according to [Equation 1], it can be seen that, if a target BLER=10^{-2} then $R_{eff}$(J)=R(J)−c, if a target BLER=10^{-3} then $R_{eff}$(J)=R(J)−2*c, if a target BLER=10^{-4} then $R_{eff}$(J)=R(J)−3*c, if a target BLER=10^{-5} then $R_{eff}$(J)=R(J)−4*c. In [Equation 1], the constant c may select an appropriate value according to the system. For example, with reference to [Table 12] and [Table 14], the constant c may be configured to a value (e.g., a value between 22 and 23 such as 22.5) that approximately equally divides a difference 90 between each value 120 and 30 of an index 1, and the constant c may be a value configured in consideration of an average of differences according to each modulation and code rate combination.

[Equation 1] illustrates that specific values are subtracted from or added to the existing code rate according to a predetermined rule, but in general, a method of using specific ratio values such as multiplying or dividing the existing code rate by an appropriate value according to a predetermined rule may be used.

Example Embodiment 10

In Embodiments 6 to 9, a method of designing or determining an MCS table was described. MCS tables designed in this way may be stored in the base station or the UE and be used for determining an MCS index.

Modulation schemes supported by the current 5G NR system include QPSK, 16QAM, 64QAM, and 256QAM. Further, different CQI tables and different MCS tables may be used by the order of the maximum modulation scheme supported by the UE. In this case, the UE may apply different CQI tables according to the target BLER and maximum modulation order required by the system, determine or indicate an appropriate CQI index, and transmit the value to the base station. Accordingly, the base station may configure or indicate an MCS index, that is, a combination of a modulation scheme and a target code rate based on an appropriate MCS table based on the corresponding CQI index or a CQI value corresponding thereto. In this case, the MCS index may be determined based on the MCS table designed for the target BLER=0.001 as in [Table 12] to [Table 16] as well as the newly designed [Table 25] to [Table 29].

As an example of a specific method, in the 5G NR system, the MCS index for the PDSCH, that is, the modulation order (or scheme) Qm and the target code rate R are determined through the following process.

For a PDSCH scheduled through a PDCCH including a DCI format 1_0 or format 1_1 with CRC scrambled by C-RNTI, MCS-C-RNTI, TC-RNTI, CS-RNTI, SI-RNTI, RA-RNTI, or P-RNTI or for a PDSCH scheduled using a PDSCH configuration SPS-Config provided in a higher layer without corresponding PDCCH transmission, (a) in a case that an upper layer parameter mcs-Table given by a PDSCH-Config is set to 'qam256' and that the PDSCH is scheduled by a PDCCH of a DCI format 1_1 with CRC scrambled by C-RNTI, in order to determine the modulation order Qm and the target code rate R, the UE uses an MCS index $I_{MCS}$ value of [Table 13].

(b) in a case that a condition of (a) is not satisfied, and that the UE is not configured with MCS-C-RNTI, and that an upper layer parameter mcs given by a PDSCH-Config is configured to 'qam64LowSE' and that the PDSCH is scheduled by the PDCCH in an UE-Specific search space with the CRC scrambled by C-RNTI, in order to determine the modulation order Qm and the target code rate R, the UE uses an MCS index $I_{MCS}$ value of [Table 14].

(c) in a case that conditions of (a) and (b) are not satisfied and that the UE is configured by MCS-C-RNTI, and that the PDSCH is scheduled by a PDCCH to which CRC scrambled by MCS-C-RNTI is applied, in order to determine the modulation order Qm and the target code rate R, the UE uses an MCS index $I_{MCS}$ value of [Table 14].

(d) in a case that the conditions of (a), (b), and (c) are not satisfied, and the UE is not configured by a higher layer parameter mcs-Table given by an SPC-Config and that a higher layer parameter mcs-Table given by a PDSCH-Config is set to 'qam256', (d-1) in a case that a PDSCH is scheduled by a PDCCH of a DCI format 1_1 to which CRC scrambled by CS-RNTI is applied, or (d-2) in a case that a PDSCH is scheduled without corresponding SPDCCH transmission using an SPS-Config, in order to determine the modulation order Qm and the target code rate R, the UE uses an MCS index $I_{MCS}$ value of [Table 13].

(e) in a case that conditions of (a), (b), (c), and (d) are not satisfied, and that the UE is configured so that an upper layer parameter mcs-Table given by an SPS-Config is set to gam64LowSE, (e-1) in a case that a PDSCH is scheduled by a PDCCH to which CRC scrambled by CS-RNTI is applied, or (e-2) in a case that a PDSCH is scheduled without corresponding PDCCH transmission using an SPS-Config, in order to determine the modulation order Qm and the target code rate R, the UE uses an MCS index $I_{MCS}$ value of [Table 14].

(f) In a case that conditions of (a), (b), (c), (d), and (e) are not satisfied, in order to determine the modulation order Qm and the target code rate R, the UE uses an MCS index $I_{MCS}$ value of [Table 12].

The contents of determining the MCS index for the PDSCH, that is, the modulation order (or scheme) Qm and the target code rate R correspond to the contents of the following standards.

For the PDSCH scheduled by a PDCCH with DCI format 1_0 or format 1_1 with CRC scrambled by C-RNTI, MCS-C-RNTI, TC-RNTI, CS-RNTI, SI-RNTI, RA-RNTI, or P-RNTI, or for the PDSCH scheduled without corresponding PDCCH transmissions using the higher-layer-provided PDSCH configuration SPS-Config, (a) if the higher layer parameter mcs-Table given by PDSCH-Config is set to 'qam256', and the PDSCH is scheduled by a PDCCH with DCI format 1_1 with CRC scrambled by C-RNTI the UE shall use $I_{MCS}$ and Table 5 to determine the modulation order (Q~) and Target code rate (R) used in the physical downlink shared channel.

(b) elseif the UE is not configured with MCS-C-RNTI, the higher layer parameter mcs-Table given by PDSCH-Config is set to 'qam64LowSE', and the PDSCH is scheduled by a PDCCH in a UE-specific search space with CRC scrambled by C-RNTI the UE shall use $I_{MCS}$ and Table 6 to determine the modulation order ($Q_m$) and Target code rate (R) used in the physical downlink shared channel.

(c) elseif the UE is configured with MCS-C-RNTI, and the PDSCH is scheduled by a PDCCH with CRC scrambled by MCS-C-RNTI the UE shall use $I_{MCS}$ and Table 6 to determine the modulation order ($Q_m$) and Target code rate (R) used in the physical downlink shared channel.

(d) elseif the UE is not configured with the higher layer parameter mcs-Table given by SPS-Config, the higher layer parameter mcs-Table given by PDSCH-Config is set to 'qam256', if the PDSCH is scheduled by a PDCCH with DCI format 1_1 with CRC scrambled by CS-RNTI or if the PDSCH is scheduled without corresponding PDCCH transmission using SPS-Config, the UE shall use $I_{MCS}$ and Table 5 to determine the modulation order (Qm) and Target code rate (R) used in the physical downlink shared channel.

(e) elseif the UE is configured with the higher layer parameter mcs-Table given by SPS-Config set to 'qam64LowSE' if the PDSCH is scheduled by a PDCCH with CRC scrambled by CS-RNTI or if the PDSCH is scheduled without corresponding PDCCH transmission using SPS-Config, the UE shall use $I_{MCS}$ and Table 6 to determine the modulation order ($Q_m$) and Target code rate (R) used in the physical downlink shared channel.

(f) else the UE shall use $I_{MCS}$ and Table 4 to determine the modulation order ($Q_m$) and Target code rate (R) used in the physical downlink shared channel.

end

In a case that [Table 25] to [Table 36] are used for a specific service scenario, specified conditions may be added and used between or before/after the above conditions (a), (b), (c), (d), (e), and (f). For example, by adding or subdividing conditions according to whether a configured value of an mcs-Table of higher layer signaling PDSCH-Config and mcs-Table of SPS-Config or a PDSCH is scheduled based on the PDCCH to which the CRC scrambled by specific RNTI (e.g., C-RNTI, MCS-C-RNTI, TC-RNTI, CS-RNTI, SI-RNTI, RA-RNTI, or P-RNTI) is applied, an MCS table such as at least one of [Table 25] to [Table 36] may be used. In this case, a value of the parameter mcs-Table may be set to a value other than 'qam256' or 'qam64LowSE'. For example, in a case that the value is configured to a parameter of a different name, such as 'qam64MidSE', the target BLER may be configured to use at least one of MCS tables of [Table 25] to [Table 27] lower than 0.1 and higher than 0.00001 (e.g., the target BLER is close to 0.001) and in which 64QAM is defined as the maximum modulation method. In general, in a case that there are more target BLERs and when more diverse service scenarios are considered, more MCS tables may be additionally used. Further, in a case that 256QAM is defined as the maximum modulation method, it may be configured to a parameter of a different name such as 'qam256MidSE' and be configured to use the MCS table of [Table 28] or [Table 29]. Similarly, in the case that 1024QAM is defined as the maximum modulation method, it may be configured to a parameter of a different name such as 'qam1024' or 'qam1024MidSE' according to the target BLER, and be configured to use at least one of MCS tables of [Table 31] or [Table 36].

As an example of another specific method, in a 5G NR system, for a PUSCH scheduled by RAR UL grant, a PUSCH scheduled by a DCI format 0_0 CRC scrambled by C-RNTI, MCS-C-RNTI, TC-RNTI, and CS-RNTI, a PUSCH-F scheduled by a DCI format 0_1 CRC scrambled by C-RNTI, MCS-C-RNTI, CS-RNTI, SP-CSI-RNTI, or a PUSCH with configured grant using CS-RNTI, an MCS index for the PUSCH, that is, a modulation order (or scheme) Qm and a target code rate R are determined according to a type in which a PUSCH is scheduled;

whether to disable or not 'transform precoding', parameter mcs-Table or mcs-TableTransformPrecoder set value (e.g., 'qam256' or 'qam64LowSE') of higher layer signaling pushch-Config, a value (e.g., 'qam256' or 'qam64LowSE') in which a parameter mcs-Table or mcs-TableTransformPrecoder of an upper layer signaling configuredGrantConfig is set, whether scheduling is performed based on a PDCCH to which a CRC scrambled by specific RNTI is applied.

In this case, MCS tables such as [Table 25] to [Table 36] may be additionally used by adding or subdividing the conditions according to the service. In this case, the parameter mcs-Table value may be set to a value other than 'qam256' or 'qam64LowSE', for example, in a case that it is configured as a parameter of a different name, such as 'qam64MidSE', a target BLER may be configured to use at least one of MCS tables of [Table 25] to [Table 27] lower than 0.1 and higher than 0.00001 (e.g., the target BLER is close to 0.001) and in which 64QAM is defined as the maximum modulation scheme. In general, in a case that there are more target BLERs and when more diverse service scenarios are considered, more diverse MCS tables may be additionally used. Further, in a case that 256QAM is defined as the maximum modulation method, it may be configured to a parameter of a different name such as 'qam256MidSE' and be configured to use the MCS table of [Table 28] or [Table 29]. Similarly, in a case that 1024QAM is defined as the maximum modulation method, it may be configured to a parameter of a different name such as 'qam1024' or 'qam1024MidSE' according to the target BLER, and be configured to use at least one of MCS tables of [Table 31] or [Table 36].

The CQI table or the MCS table optimized according to the target BLER of the system may be configured differently, but as in the example embodiments of the disclosure, many modulation schemes (or orders) and code rate combinations are usually shared and used. In order to determine the CQI or MCS, when a configuration using at least one of a first CQI table or a first MCS table is referred to as a first table configuration, and a configuration using at least one of a second CQI table or a second MCS table is referred to as a second table configuration, an operation of the base station or the UE and characteristics between each table configuration may be summarized as follows.

A UE being operable to apply a first table configuration in a radio communication with a base station or a radio node of a cellular network may receive an instruction for applying or performing a second table configuration from the base station. In this case, the first table configuration may include at least one of a first MCS table or a first CQI table, and refer, for example, to a table configuration supporting minimum spectral efficiency. Further, the second table configuration may include at least one of a second MCS table or a second CQI table. The UE may apply a second table configuration for wireless communication with the base station (or radio node) based on the instruction. The UE may transmit control information (e.g., CQI information) or data to the base station based on the second table configuration.

The second M(CS table or the second CQI table for the second table configuration supports lower spectrum efficiency than minimum spectrum efficiency of the first MCS table configuration.

In a case that the second table configuration has been applied, and that it is preferable to use at least one of the modulation order or code rate combinations for spectral efficiency included in at least one of the first MCS table or the first CQI table (as fallback), at least one of the combinations may be maintained in at least one of the second MCS table or the second CQI table. "Modulation order and code rate combinations for spectral efficiency included in at least one of the first MCS table or the first CQI table" maintained in at least one of the second MCS table or the second CQI table may include a modulation order and code rate combination for lowest spectral efficiency of the first table configuration.

A target BLER of a system applying the first table configuration may be higher than a target BLER of a system applying the second table configuration. (Approximately $10^t$ times or more, P=1, 2, . . . , 5)

The UE may transmit an appropriate CQI index to the base station based on the CQI table determined according to the table configuration, or determine a modulation method and code rate based on the determined MCS table, determine a TBS for data transmission, and encode the data to transmit the encoded bits to the base station. Alternatively, the UE may determine a modulation method and a code rate based on the determined MCS table, determine a TBS for data corresponding to coded bits transmitted from the base station, and decode the received coded bits to restore the data.

From the viewpoint of the base station, the operation may be summarized as follows.

In order to perform wireless communication with a UE of a cellular network, the base station capable of performing a first table configuration may transmit an instruction for applying or performing a second table configuration to the UE. In this case, the first table configuration may include at least one of the first MCS table or the first CQI table, and refer, for example, to a table configuration supporting minimum spectral efficiency. Further, the second table configuration may include at least one of a second MCS table or a second CQI table.

The base station receives control information (e.g., CQI information) or data transmitted based on the second table configuration from the UE.

The base station may determine an appropriate MCS based on a CQI index transmitted from the UE based on the CQI table determined according to the table configuration, or determine a TBS of data corresponding to the encoded bits received from the UE based on the modulation scheme and code rate determined based on the determined MCS table, and perform appropriate decoding to the received encoded bits to restore the data. Further, the base station may determine a modulation scheme and a code rate based on the determined MCS table, then determine a TBS for data transmission, and then encode the data to transmit encoded bits to the UE.

Because features related to the first table configuration and the second table configuration are the same as those described above, they are omitted below.

The TBS may be determined based on a code rate indicated by an index included in the MCS table. In 5G NR, the TBS may be determined by the number of assigned REs, the number of used layers, a modulation order, and a code rate. Among various factors that determine the TBS, a modulation order and a code rate may be determined through an MCS among signaling information. In various embodiments, the modulation order determined through the MCS may be used as it is, and the code rate determined through the MCS may be used as it is, or may be additionally adjusted according to RRC configuration information. In various embodiments, in a case that only an MCS table for a service having a specific target BLER is defined and that it is configured to support a service having the same maximum modulation order but having a BLER different from the specific target BLER through RRC signaling, the transceiver may determine a modulation order and code rate in the above defined MCS table, and adjust and use only the code rate. As a method of adjusting the code rate, various methods as well as the method of Embodiment 9 may be applied. As an example, a method of subtracting a predetermined constant value from the code rate, adding a predetermined constant value to the code rate, or multiplying the code rate by a specific ratio may be used, and a constant subtracting from the code rate or adding to the code rate or a specific ratio that multiplies the code rate may use the same value for all CQI indexes, or a value that varies according to the modulation order may be used.

Example Embodiment 11

In this embodiment, in a case that 1024QAM is applied in a wireless communication system, a TBS determination method is proposed.

First, for a j-th serving cell, in a case that a parameter processingType2Enabled of higher layer signaling PDSCH-ServingCellConfig (PUSCH-ServingCellConfig in a case of PUSCH) is configured to 'enable', or that an MCS table corresponding to 1024QAM as in [Table 31] to [Table 36] is configured, and that at least one MCS index $I_{MCS}$ is indicated to a value greater than a predetermined value (e.g., 26) ($I_{MCS}>27$ in a case that a 256QAM MCS table is configured, $I_{MCS}>28$ in the case that a 646QAM MCS table is configured) to a certain PDSCH, if a data rate that may be determined based on a number of symbols assigned to the PDSCH (or PUSCH) and a size of scheduled code blocks (or the size of TBs) is greater than a supported max data rate determined based on the predetermined method, the UE may not process the PDSCH transmission/reception (or PUSCH transmission/reception). For example, if the condition of [Equation 2] is not satisfied, the UE may not handle PDSCH transmission/reception (or PUSCH transmission/reception) corresponding thereto:

$$\frac{\sum_{m=0}^{M-1} V_{j,m}}{L \times T_s^{\mu}} \leq DataRateCC$$

Here, L is the number of symbols assigned to the corresponding PDSCH (or PUSCH), M is the number $$T_s^{\mu} = \frac{10^{-3}}{2^{\mu} \cdot N_{symb}^{slot}}$$

(μ: numerology of the corresponding PDSCH) of TB(s) in the corresponding PDSCH (or PUSCH), and $$V_{j,m} = C' \cdot \left\lceil \frac{A}{C} \right\rceil$$

for the mth TB is a value determined by the number A of bits included in the corresponding TB, the number C of code blocks corresponding to the TB, and the number C' of code blocks scheduled for the corresponding TB. Further, DataRateCC [Mbps] is a calculated value of the (approximated) maximum data rate for one carrier of the frequency band of the serving cell for any signaled band combination and feature set consistent with the serving cell, and a value thereof may be determined based on [Equation 3]. However, Equation 3 is only an example embodiment of the disclosure, and the maximum data rate according to the disclosure may be determined based on at least one parameter of the number of layers, modulation order, scaling factor, subcarrier spacing, overhead, number of RBs in bandwidth, or length of OFDM symbol.

[Equation 3]

In the NR system, the (approximated) maximum data rate supported by the UE for the number of given aggregation (or integrated) carriers in a band or band combination may be determined through the following equation.

data rate (in Mbps) =

$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot \left(1 - OH^{(j)}\right) \right)$$

In [Equation 3], J is the number of carriers (CC) bundled by carrier aggregation, Rmax=948/1024, $$v_{Layers}^{(j)}$$

is the number of maximum layers, $$Q_m^{(j)}$$

is the maximum modulation order, $f^{(j)}$ is the scaling factor, and μ is subcarrier spacing. $f^{(j)}$ may be reported by the UE as one value of 1, 0.8, 0.75, and 0.4, and μ may be given in [Table 37]. (j) is an index meaning a j-th component carrier (CC).

TABLE 37

| μ | $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Further, $$T_s^{\mu}$$

is an average OFDM symbol length, $$T_s^{\mu}$$

may be calculated as $$\frac{10^{-3}}{14 \cdot 2^{\mu}},$$

and $$N_{PRB}^{BW(j),\mu}$$

is the number of maximum RBs in BW(j). $OH^{(j)}$ is an overhead value, which may be given as 0.14 in a downlink of a frequency range 1 ((FR1), referred to as a band of 6 GHz or less, below 6 GHz (B6G)), be given as 0.18 in an uplink, be given as 0.08 in a downlink of a frequency range 2 ((FR2), referred to as a band exceeding 6 GHz), above 6 GHz (A6G)) and be given as 0.10 in an uplink. However, frequency bands of FR1 and FR2 are only examples, and may be defined as other frequency bands according to the system.

The overhead $OH^{(j)}$ values may be defined as different values according to services or modulation orders. For example, because a case that an MCS table supporting 1024QAM such as [Tables 31] to [Table 36] is configured in the wireless communication system may, for example, refer to a special situation in which a channel environment is very good, the $OH^{(j)}$ value may also be configured differently. Assuming use in a very good channel environment, an overhead value may be configured to smaller values, but because a 1024QAM modulation method is vulnerable to the peak-to-average power-ratio (PAPR) problem or phase error of the OFDM system, it may be configured to a larger value than the current reference.

Further, when a V2X (vehicle-to-infra or vehicle-to-vehicle) service is supported, in data transmission and reception through a physical sidelink shared channel (PSSCH), because a symbol allocation method for data transmission and reception through a PDSCH may be different, the $OH^{(j)}$ value may be also configured differently.

As a more specific example of the V2X service, in a case of PSSCH data transmission and reception, at least a first symbol is assigned for automatic gain control (AGC) and a last symbol is assigned as a gap symbol for gap measurement; thus, the maximum number of OFDM symbols for actually transmitting and receiving data may be 12 (or less). In this case, the $OH^{(j)}$ value may have a specific value or more regardless of a configuration of a physical sidelink feedback channel (PSFCH), for example, it may have a value equal to or greater than 2/12. As a specific example, the $OH^{(j)}$ value may be configured to values larger than 2/12 and including a specific value such as 0.21 regardless of FR1/B6G and FR2/A6G. Alternatively, in a resource pool configuration of the corresponding carrier, the $OH^{(j)}$ value may be determined according to a ratio of slots in which PSFCH resources are configured or a period of PSFCH resources. In this case, the higher a ratio of the configured PSFCH resources, the higher the $OH^{(j)}$ value may be. For example, when a value of a case that a PSFCH is configured every slot is A, a value of a case that a PSFCH is configured by one slot every 2 slots is B, and a value of a case that a PSFCH is configured by one slot every 4 slots is C, it may be configured to have a relationship of A>B>C (e.g., A=0.42, B=0.32, C=0.26). For reference, a ratio of slots in which PSFCH resources are configured or a period of PSFCH resources may be determined based on a sl-PSFCH-Period parameter in a PSFCH related configuration.

At least one sidelink resource pool may be configured in the UE for transmission and reception of the PSSCH, and among them, the $OH^{(j)}$ value may be determined based on a parameter of a resource pool having the largest bandwidth according to a higher layer configuration.

[Equation 2] may, for example, mean that the UE may omit a demodulation process or perform a demodulation process, but that part or all of a data restoration process may be omitted, such as omitting a data decoding process such as LDPC decoding for a received signal corresponding to data because there is a high possibility that data decoding will fail due to a too high coding rate in a case that a data rate that may be determined based on the number of symbols assigned to the PDSCH (or PUSCH) and the size (or TBS) of the scheduled code block is configured to be higher than the maximum data rate that may be calculated according to a predetermined method. However, in [Equation 3], Rmax=948/1024 is configured, but in 5G NR, because decodable coding rates may be different according to a base graph (or base matrix) BG (1) and BG (2) used for LDPC encoding and decoding, different values may be applied as the value of Rmax=948/1024 according to BG(1) and BG(2) according to the system. (e.g., the Rmax value for BG(1) may be configured higher than the Rmax value for BG(2).)

For reference, in 5N NR, a base graph (or base matrix) is determined according to a TBS length and a code rate as follows, and during initial transmission and retransmission, LDPC encoding and decoding are performed according to the determined base graph.

[Method of Selecting a Base Graph (or Base Matrix)]

When a code rate indicated by the MCS is R,

TBS≤292, or TBS≤3824 and R≤0.67,

Alternatively, in a case that R≤0.25, LDPC encoding is performed based on BG(2) (base graph 2 or base matrix 2).

In other cases, LDPC encoding is performed based on BG(1) (base graph 1 or base matrix 1).

The (approximated) maximum data rate for the serving cell may be determined as the maximum value of a calculated (approximated) maximum data rate using [Equation 3] according to each supported band or band combination. Further, for a single carrier-based 5G NR standalone (SA) operation, the UE may configure each parameter such that a data rate for the carrier is J=1CC and the $$v_{Layers}^{(j)} \cdot Q_m^{(j)} \cdot f^{(j)}$$

value is not smaller than 4, and support so that the data rate is not smaller than the data rate calculated through [Equation 3].

However, in a case that the maximum modulation order supportable in the wireless communication system is 8 (i.e., $$Q_m^{(j)} = 8$$

and in a case that the scaling factor is configured to 0.4, $$v_{Layers}^{(j)} \cdot Q_m^{(j)} \cdot f^{(j)} = v_{Layers}^{(j)} \times 3.2 \geq 4$$

only in the case that $$v_{Layers}^{(j)}$$

is 2 or more, the above condition is satisfied. That is, in the wireless communication system, there is no need to support any PDSCH or PUSCH data transmission/reception corresponding to a combination of $$\left(v_{Layers}^{(j)}, f^{(j)}\right) = (1, 0.4)$$

or any PDSCH or PUSCH data transmission/reception supporting a data rate determined based on $$\left(v_{Layers}^{(j)}, f^{(j)}\right) = (1, 0.4)$$

combination. However, even if $f^{(j)}$ is configured to 0.4, the system supporting 1024QAM may support for $$v_{Layers}^{(j)} = 1$$

from $$v_{Layers}^{(j)} \cdot Q_m^{(j)} \cdot f^{(j)} = v_{Layers}^{(j)=} \times 10 \times 0.4 \geq 4$$

and therefore, in a case that a CQI or MCS table supporting 1024QAM is configured as in the CQI table of [Table 30] or the MCS tables of [Table 31] to [Table 36] of the disclosure, there is a case of supporting PDSCH or PUSCH data transmission/reception supporting a data rate greater than or equal to a (maximum) data rate determined based on a combination or a combination of $$\left(v_{Layers}^{(j)}, f^{(j)}\right) = (1, 0.4).$$

More specifically, for at least a single carrier-based 5G NR standalone (SA) operation in a wireless communication system supporting 1024QAM, the UE/base station may transmit and receive PDSCH or PUSCH data corresponding to $$\left(v_{Layers}^{(j)}, Q_m^{(j)}, f^{(j)}\right) = (1, 10, 0.4)$$

(Combination or may transmit and receive PDSCH or PUSCH data supporting a data rate greater than or equal to a data rate determined based on the $$\left(v_{Layers}^{(j)}, Q_m^{(j)}, f^{(j)}\right) = (1, 10, 0.4)$$

combination.

As described above, because a case that the wireless communication system supports 1024QAM (or the case that the MCS table supporting 1024QAM is configured) may refer, for example, to a special situation in which the channel environment is very good, conditions for the $$v_{Layers}^{(j)} \cdot Q_m^{(j)} \cdot f^{(j)}$$

value may be configured differently. For example, in a system that allows a $$Q_m^{(j)}$$

value of 10, a value greater than 4 may be configured as the reference value to a $$v_{Layers}^{(j)} \cdot Q_m^{(j)} \cdot f^{(j)}$$

value, there may be limitations on the $$v_{Layers}^{(j)}$$

or $f^{(j)}$ value. For example, it may be limited not to configure a combination such as $$\left(v_{Layers}^{(j)}, f^{(j)}\right) = (1, 0.4).$$

In a wireless communication system, by transmitting a TB having an appropriate TBS within a range that does not exceed the maximum data rate supportable for each UE, the decoding success probability may increase, and as a result, unnecessary retransmission may be minimized.

In a case that an upper layer parameter maxNrofCodeWordsScheduledByDCI indicates that two codeword transmission is 'enable', and in a case that one of the two TBs is configured to ($I_{MCS}$=26, $rv_{id}$=1) by a DCI format 1_1, the corresponding TB becomes 'disabled'. The TBS may be determined for data transmission and reception through a PDSCH assigned by a PDCCH of a DCI format 1_0, format 1_1, or format 1_2 corresponding to a CRC scrambled by C-RNTI, MCS-C-RNTI, TC-RNTI, CS-RNTI, or SI-RNTI, except the case that the TB is 'disabled' by the DCI format 1_1. The TBS may be determined based on the number $N_{RE}$ of total REs assigned for a PDSCH or a PUSCH, Qm and R determined from MCS information of first transmission, and the number v of used layers. Therefore, in a case that a CQI or MCS table having the maximum modulation order corresponding to 64QAM is configured, and only in a case of having an $I_{MCS}$ value of 0 or more and 28 or less, only in a case that a CQI or MCS table having the maximum modulation order corresponding to 256QAM is configured, only in a case of having an $I_{MCS}$ value of 0 or more and 27 or less, only in a case that a CQI or MCS table having the maximum modulation order corresponding to 1024QAM as in [Table 31] to [Table 36] is configured, only in a case of having an $I_{MCS}$ value of 0 or more and 26 or less, the TBS is determined based on Qm and R values corresponding to the MCS index.

First, the base station or the UE may determine the number $N'_{RE}$ of REs assigned to a PDSCH (or PUSCH) in one PRB as $$N'_{RE} = N_{SC}^{RB} \cdot N_{symb}^{sh} - N_{DMRS}^{PRB} - N_{oh}^{PRB}.$$

Here, $$N_{SC}^{RB}$$

is the number (e.g., 12) of subcarriers included in one RB, $$N_{symb}^{sh}$$

is the number of OFDM symbols assigned to the PDSCH (or PUSCH), $$N_{DMRS}^{PRB}$$

is the RE number in one PRB occupied by a demodulation reference signal (DMRS) of a code division multiplexing (CDM) group, and $$N_{oh}^{PRB}$$

is the number (e.g., configured to one of 0, 6, 12, and 18) of REs occupied by an overhead in one PRB formed by higher signaling (e.g., xOverhead in PDSCH-ServingCellConfig or xOverhead in PUSCH-ServingCellConfig). Thereafter, the number $N_{RE}$ of total REs assigned to the PDSCH (or PUSCH) may be determined as follows: $N_{RE}$=min(156, $N'_{RE}$)·$n_{PRB}$. Here, $n_{PRB}$ denotes the number of PRBs assigned to the UE. The TBS value is determined based on the number $N_{info}$=$N_{RE}$·$Q_m$·R·v of temporary information bits.

In a case that a CQI or MCS table having the maximum modulation order corresponding to 1024QAM as in [Table 31] to [Table 36] is configured, if the $I_{MCS}$ value is configured to a value of 27 or more and 31 or less, the TBS may be determined based on the DCI transported in the latest PDCCH for the same TB in which the $I_{MCS}$ value is configured to a value from 0 to 26 or less. If there is no PDCCH for the same TB configured to a value from 0 to 26 or less and the first transmission PDSCH for the same TB is semi-persistently scheduled, the TBS is determined based on the most recent semi-persistent scheduling assignment PDCCH.

Similarly, in a case that the CQI or MCS table having the maximum modulation order of 256QAM is configured, and in a case that an $I_{MCS}$ value is configured to a value of 28 or more and 31 or less, or in a case that the CQI or MCS table with the maximum modulation order of 646QAM is configured, if the $I_{MCS}$ value is configured to a value of 29 or more and 31 or less, in each case, the TBS may be determined based on the DCI transported in the latest PDCCH for the same TB in which an $I_{MCS}$ value is configured to a value from 0 to 27 or less or the same TB in which an $I_{MCS}$ value is configured to a value from 0 to 28 or less. In each case, if there is no PDCCH for the same TB configured to a value from 0 to 27 or less or from 0 to 28 or less, and a first transmission PDSCH for the same TB is semi-persistently scheduled, the TBS is determined based on the most recent semi-persistent scheduling assignment PDCCH.

In LTE, the relationship between a modulation scheme (or order) and TBS combination and a CQI index is defined as follows.

A combination of modulation scheme and transport block size corresponds to a CQI index if
the combination could be signaled for transmission on the PDSCH in the CSI reference resource according to the Transport Block Size table, and
the modulation scheme is indicated by the CQI index, and
the combination of transport block size and modulation scheme when applied to the reference resource results in the effective channel code rate which is the closest possible to the code rate indicated by the CQI index. If more than one combination of transport block size and modulation scheme results in an effective channel code rate equally close to the code rate indicated by the CQI index, only the combination with the smallest of such transport block sizes is relevant.

In LTE, the TBS may be determined based on a TBS table storing predetermined TBS values without directly indicating a target code rate, spectral efficiency, or MPR in the MCS. In this case, the TBS may be determined using a TBS index $I_{TBS}$ and the number of $N_{PRBs}$ determined by the MCS index. As a result, because the TBS is determined through a process of selecting one of TBS table values from signaling parameters, the modulation scheme and the TBS may be regarded as a combination corresponding to the CQI. However, in 5G NR, because the MCS table directly indicates a modulation order, target code rate, or spectral efficiency for each index, the modulation order, the target code rate, and the TBS may be regarded as one combination.

In a communication system to which 5G NR or a TBS determination method similar to 5G NR is applied, the meaning of CQI may be defined somewhat differently from that of LTE, and various embodiments thereof will be described as follows.

Example Embodiment 12

Because the combination of a modulation scheme (or order), a target code rate, and a TBS corresponds to CQI, it may be defined as in [CQI-MCS relationship 1].
[CQI-MCS relationship 1]
A combination of modulation scheme, target code rate and transport block size corresponds to a CQI index if
the combination could be signaled for transmission on the PDSCH in the CS reference resource (according to the Transport Block Size determination described in [Subclause 5.1.3.2, TS38.214, 5G NR]), and
the modulation scheme is indicated by the CQI index, and
the combination when applied to the reference resource results in the effective channel code rate which is the closest possible to the code rate indicated by the CQI index. If more than one combination of transport block size and modulation scheme results in an effective channel code rate equally close to the code rate indicated by the CQI index, only the combination with the smallest of such transport block sizes is relevant.

In 5G NR, when the base station determines an MCS from received CQI information, the TBS may be determined according to a predetermined calculation method based on a modulation order Qm corresponding to the MCS, a code rate R, an amount of assigned resources, and an amount of an overhead. Therefore, because a process of selecting one of a plurality of possible TBSs may be unnecessary, it may be defined as in [CQI-MCS relationship 2], [CQI-M(CS relationship 3], or [CQI-MCS relationship 4].

[CQI-MCS Relationship-2]

A combination of modulation scheme, target code rate and transport block size corresponds to a CQI index if the combination could be signaled for transmission on the PDSCH in the CSI reference resource (according to the Transport Block Size determination described in [Subclause 5.1.3.2. TS38.214, 5G NR]), and the modulation scheme is indicated by the CQI index, and the combination when applied to the reference resource results in the effective channel code rate which is the closest possible to the code rate indicated by the CQI index.

[CQI-MCS Relationship-3]

A combination of modulation scheme and target code rate (and/or transport block size) corresponds to a CQI index if:

the combination could be signaled for transmission on the PDSCH in the CSI reference resource (according to the Transport Block Size determination described in [Subclause 5.1.3.2, TS38.214, 5G NR]), and the modulation scheme (and/or the target code rate) is indicated by the CQI index, and the combination when applied to the reference resource results in the effective channel code rate (or spectral efficiency) which is the closest possible to the code rate (or spectral efficiency) indicated by the CQI index.

[CQI-MCS Relationship-4]

A combination of modulation scheme and target code rate (and/or transport block size) corresponds to a CQI index if the combination could be signaled for transmission on the PDSCH in the CSI reference resource (according to the Transport Block Size determination described in [Subclause 5.1.3.2, TS38.214, 5G NR]), and the modulation scheme (and/or the target code rate) is indicated by the CQI index, and the combination when applied to the reference resource results in the effective channel code rate which is the closest possible to the code rate indicated by the CQI index. If more than one combination of modulation scheme and target code rate results in an effective channel code rate equally close to the code rate indicated by the CQI index, only the combination with the smallest of such target code rates is relevant.

According to [CQI Determination-1] or [CQI determination-2], it is preferable that the transport block error probability corresponds to the highest CQI index that should not substantially or approximately exceed the target BLER; thus, the effective code rate or effective spectral efficiency may be specifically limited as in [CQI-MCS relationship-5].

[CQI-MCS Relationship-5]

A combination of modulation scheme and target code rate (and/or transport block size) corresponds to a CQI index if the combination could be signaled for transmission on the PDSCH in the CSI reference resource (according to the Transport Block Size determination described in [Subclause 5.1.3.2, TS38.214, 5G NR]), and the modulation scheme (and/or the target code rate) is indicated by the CQI index, and the combination when applied to the reference resource results in the highest (or maximum) effective channel code rate (or spectral efficiency) which is smaller than or equal to the code rate (or spectral efficiency) indicated by the CQI index.

In the above embodiments, a phrase in (·) may mean that it may be omitted, and in particular, "A combination of modulation scheme and target code rate (and/or transport block size)" may, for example, refer to "A combination of modulation scheme and target code rate", "A combination of modulation scheme, target code rate and transport block size", or "A combination of modulation scheme and transport block size". Further, each phrase of [CQI-MCS relationship 1] to [CQI-MCS relationship 5] may be appropriately combined with each other to define a new CQI-MCS relationship.

Example Embodiment 13

For communication of a bandwidth reduced low complexity (BL) UE or coverage enhancement (CE) UE, a CQI index may be determined according to [CQI Determination-1] or [CQI Determination-2] using a CQI table different from that of Tables 9 to 11 or Tables 17 to 24. In a case of a BL/CE UE, it is usually necessary to apply a low modulation order or a low code rate for more robust transmission. Therefore, for the same target BLER, a CQI table and an MCS table supporting spectral efficiencies all or average lower than spectral efficiencies supported by the CQI or MCS tables of Tables 9 to 24 for the same index may be required.

Further, the 5G NR system may support a non-standalone (NSA) operation or mode that operates in association with LTE or pre-LTE systems and a stand alone (SA) operation or mode that may operate independently of LTE or pre-LTE systems. A current LTE system may apply up to 1024QAM according to the standard, but the 5G NR system (Release 16 standard) cannot support 1024QAM. Therefore, in a case that 1024QAM is introduced to support functions supported by LTE as much as possible when in the future, the 5G NR system supports SA that operates independently of the LTE system, a new CQI table and MCS table may be introduced. Even in such a case, a plurality of CQI/MCS tables that satisfy characteristics of CQI/MCS tables according to the target BLER proposed in another embodiment of the disclosure while having a maximum modulation order of 1024QAM may be defined.

FIG. 8 is a flowchart illustrating an example method for the IE to calculate a transport block size (TBS) using a CQI and an MCS table according to various embodiments. FIG. 8 illustrates an example method of operating a UE 120.

With reference to FIG. 8, the base station (e.g., the base station 110) may transmit configuration information related to a service to the UE through RRC signaling in consideration of the service to be provided to the UE. In step 801, the UE performs an RRC configuration.

In step 803, the UE acquires a code rate and a modulation order to be a reference. In step 805, in a case that a service defined in the RRC configuration is different from a reference service, the UE may adjust the code rate. In this case, service information for adjusting the code rate may be indicated by RRC signaling, but may be indicated through other parameters or a BLER value classified according to the service. A method of acquiring or determining a specific code rate and a modulation order, and a method of adjusting the code rate follow various embodiments of the disclosure. In step 807, the UE calculates a TBS using the adjusted code rate.

FIG. 9 is a flowchart illustrating an example method for the U E to calculate a transport block size (TBS) using a COI and an MCS table according to various embodiments. FIG. 9 illustrates an example method of operating a UE 120.

With reference to FIG. 9, the base station (e.g., the base station 110) may transmit configuration information related to a service to the UE through RRC signaling based on the service to be provided to the UE. In step 901, the U E performs an RRC configuration.

In step 903, the IE may acquire or determine a code rate and modulation order to be a reference. In step 905, in a case that a service defined in the RRC configuration is different from a reference service, the UE may adjust the code rate. In this case, service information for adjusting the code rate may be indicated through RRC signaling, but may be indicated through other parameters or a BLER value classified according to the service. A method of acquiring or determining a specific code rate and a modulation order, and a method of adjusting the code rate follow various embodiments of the disclosure. In step 907, the UE feeds back the channel state based on the adjusted code rate.

In various embodiments, the base station 110 and the IJE 120) may perform communication using at least one of wireless communication or wired communication.

A communication system may support an efficient throughput performance of a UE by configuring an appropriate MCS level (or index). In particular, an MCS level (or index) for the DL may be variably configured appropriately to the system situation based on CSI or CQI information (or feedback) transmitted or reported by the UE in the UL, which is one of fundamental roles of link adaptation technology. Link adaptation technology is important for efficient packet-switched data traffic handling in the design of radio interfaces. The link adaptation technology of LTE or 5G NR may also dynamically adjust a data rate (i.e., modulation scheme and channel coding rate, and the like) so as to match a prevailing radio channel capacity of each UE. For DL data transmission, an LTE base station eNodeB or a 5G NR base station gNB may determine or select a modulation scheme (or order) and code rate based on prediction of a DL channel environment or condition. After all, (CSI or CQI feedback may be referred to as an indication of a supportable data rate (i.e., modulation scheme, channel coding rate, and the like) in consideration of a signal to interference plus noise ratio (SINR) or characteristics of the SNR and a UE receiver. In the following Embodiment 14, a specific example of a process of determining an appropriate MCS level through CQI feedback will be described.

Example Embodiment 14

FIG. 10 illustrates an example process of determining or selecting an MCS level (or index) optimized based on the received CQI information (or CQI index) after the base station receives CSI or CQI information (or feedback) transmitted by the UE in an UL according to various embodiments.

First, when CSI or CQI feedback is received from the UE (1010), a link adaptation block of the base station may perform an operation (or function) of mapping (or converting) CQI feedback information (or CQI index) to an SINR (1020). In this case, the link adaptation block may be included in the controller of the base station and operate or may be connected to the controller of the base station and operate. Further, the link adaptation block may not be formed as a separate block, and an operation of the block may be performed as a function of a controller. Because a plurality of CQI tables may exist in LTE or 5G NR, in order to map the CQI feedback information to the SINR, a process of determining one of the CQI tables may also be performed (1030). Accordingly, CQI-to-SINR mapping (or CQI-to-SNR mapping) may be performed according to the determined CQI table.

An SINR (or SNR) value may be normalized in the case of a single layer and single antenna (1040). SINR normalization may be performed based on at least one value of the CSI-RS port number, the number of antennas used for CSI-RS transmission, the number of antennas per CSI-RS port, or RI (or rank index or rank indicated by RI). For example, by an SINR normalization function, the SINR value may be normalized based on a number of CSI-RS ports and RI (or rank index or rank indicated by RI). Further, by an SINR normalization function, the SINR value may be normalized based on RI (or rank index or rank indicated by RI).

Such a normalization method may be applied differently according to an operation or requirements of the system. As a specific example, in a case that the UE or the base station operates in a specific frequency band or more (e.g., above 6 GHz, A6G), a method of performing SINR normalization based on the number and rank of CSI-RS ports and performing normalization based on a rank in a specific frequency band or less (e.g., below 6 GHz, B6G) may be applied. (For A6G, SINR may be normalized based on the number of CSI-RS port and reported rank index. For B6G, SINR may be normalized based on reported rank index.) The opposite method or various other methods may be applied. After SINR normalization is performed, in order to prevent unstable fluctuations in normalized SINR values, as needed, an SINR filtering function may be additionally performed.

Further, in the case that HARQ feedback is received (1050), in order to perform open loop rate control (OLRC) for achieving a target DL BLER, the SINR value may be appropriately modified or converted (1060, 1070). In a process of modifying or converting an SINR value in order to achieve a target DL BLER, a method of determining an appropriate offset value based on HARQ ACK/NACK information transmitted from the UE (1060) and then adding the offset value to the existing SINR value or subtracting the offset value from the existing SINR value may be applied (1070). In this case, a. DL BLER many be measured or determined based on ACK/NACK information of all or at least a part of an UL control channel corresponding to a PDSCH. Further, the determination or update of the OLRC offset may be performed based on the type of HARQ feedback. Further, values or settings for OLRC update may be determined based on MCS table configurations. For example, a value for OLRC update of the case that an MCS table having a maximum modulation order corresponding to 256QAM is configured, a value for OLRC update of the case that an MCS table having a maximum modulation order corresponding to 64QAM is configured, or a value for OLRC update of the case that an MCS table configuration is lack/missed may be configured/determined differently. (A value or setting for OLRC update may be determined based on a configuration of MCS table. For example, a value for OLRC update in case of a configuration for a MCS table corresponding to maximum modulation 256QAM (e.g., <mcs-Table=qam256>) and a value for OLRC update in case of an absent/missing configuration or a configuration for a MCS table corresponding to maximum modulation 64QAM (e.g., <mcs-Table='absent'> or <mcs-Table=qam64LowSE>) can be differently set (or determined).)

In this way, an effective MCS level may be finally determined based on the example process illustrated in FIG. 10. The process illustrated in FIG. 10 is only an example, and other functions may be added according to the case, and each function of FIG. 10 may be further subdivided and performed.

The UE may receive a signal for transmitted data or input bit string, determine or identify an MCS index (or level) determined through the process of FIG. 10, determine or identify a TBS value or a size of the input bit string based on the MCS index (or modulation order and code rate corresponding to the MCS index or MPR), and determine or identify a parity check matrix and a base graph (or base matrix) of an LDPC code to perform LDPC decoding based on the determined input bit string size or the TBS and the code rate. Thereafter, data or the input bit string may be restored by performing decoding based on the TBS or the size of the determined input bit string or the parity check matrix of and LDPC codes.

According to a [method of selecting a base graph (or base matrix)], an actual BG(1) is used only in a case that TBS>292 and R>0.67, or TBS>3824 and R>0.25. According to TS 38.214, which is one of 5G NR standard specification documents, when a UE performs decoding based on an LDPC code, it is assumed that decoding may be omitted in a case that an effective code rate $R_{eff}$ is greater than 0.95 as follows. Here, the effective code rate $R_{eff}$ means a value obtained by dividing the number of total information bits obtained by adding CRC bits to TB by the number of actually transmitted coded bits (physical channel bits on the PDSCH). For reference, in 5G NR, 24-bit CRC bits are added in the case that the TBS is greater than 3824, and 16-bit CRC bits are added in other cases.

The UE may skip decoding a transport block in an initial transmission if the effective channel code rate is higher than 0.95, where the effective channel code rate is defined as the number of downlink information bits (including CRC bits) divided by the number of physical channel bits on PDSCH.

However, because an LDPC code adopted to 5G NR is an LDPC code capable of decoding data in most cases even if the effective code rate $R_{eff}$ is greater than 0.95 in some cases, the above condition may reduce system efficiency. For example, according to the [method of selecting a base graph (or base matrix)], in a case that BG(1) is used for LDPC encoding and decoding, a condition of TBS>292 should be satisfied, and an LDPC code based on BG(1) is an area in which data may be almost always restored through LDPC decoding in the case that a code rate is 0.95 to 0.96 and TBS>282. Therefore, a decoding skip reference code rate $R_{skip}$ for at least BG(1) should be configured to be higher than 0.95 or other conditions should be applied according to characteristics of the LDPC code to prevent unnecessary decoding skipping, thereby increasing decoding efficiency of the system. In the following Embodiment 15, a method of increasing decoding efficiency is described.

Example Embodiment 15

A parity check matrix may be used for encoding and decoding based on an LDPC code in the UE or the base station. The LDPC code reflected in 5G NR may determine a parity check matrix required for encoding and decoding based on appropriate transform from a lifting size Z determined according to a size of an input bit string or a TBS, BG(1) or BG(2), and a parity check matrix (or the largest size of parity check matrix) to be a reference. Here, a method commonly referred to as lifting may be used for transform, and for example, a modulo-lifting technique may be used in a 5G NR system.

First, in an LDPC code using the parity check matrix determined by BG(1), data restoration through LDPC decoding is possible in almost all cases that TBS>292 (or number of DL information bits>308) and $R_{eff}$≤0.97. Therefore, in 5G NR, in a case that BG(1) is used for LDPC encoding, when a condition for skipping LDPC decoding is $R_{eff}$>$R_{skip(1)}$, it is appropriate that a value of $R_{skip(1)}$ is configured to a value (e.g., 0.96 to 0.98) greater than 0.95. Here, $R_{skip(1)}$ refers, for example, to a reference code rate for decoding skip of BG(1), and may be called names such as a reference code rate and a first reference code rate.

In an LDPC code using a parity check matrix determined by BG(2), as illustrated in FIG. 11, an effective code rate that may restore data through LDPC decoding is differently represented according to the TBS. For example, in a case that TBS≤292 (or number of DL information bits≤308) and $R_{eff}$<0.95 or $R_{eff}$<0.96, data decoding through LDPC decoding is almost actually impossible. In particular, in a case that the TBS is several tens of bits, there are many cases in which decoding is impossible at a code rate between 0.92 and 0.94. In an area in which decoding is impossible, even if LDPC decoding is performed repeatedly infinitely, data restoration is impossible; thus, by configuring the reference code rate $R_{skip(2)}$ to a value different from 0.95 or by configuring the reference code rate $R_{skip(2)}$ to a plurality values as in different reference values $R_{skip(2,1)}$, $R_{skip(2,2)}$, ... according to the TBS, system efficiency can be increased.

In this way, when decoding skip is determined only with one code rate reference, inefficient communication may occur; thus, when decoding skip is appropriately applied according to a base graph (or base matrix) for LDPC decoding, a reference code rate, or a TBS (or number of DL information bits), more efficient communication between the UE and the base station is possible.

For example, the UE may apply decoding skip based on various methods as follows.
(Decoding Skip Method-1)

The UE may skip decoding a transport block in an initial transmission if
   the number of downlink information bits (including CRC bits), $N_{DL\_info}$, is less than (or, less than or equal to) a predetermined number $N_{DL\_info\_ref}$ and
   the effective channel code rate is higher than (or, higher than or equal to) $R_{skip(2)}$, where the effective channel code rate is defined as the number of downlink information bits (including CRC bits), $N_{DL\_info}$, divided by the number of physical channel bits on PDSCH.

That is, in a case that the downlink information bit number $N_{DL\_info}$ including a CRC bit is smaller than the reference information bit number $N_{DL\_info\_ref}$ and that a code rate is greater than a reference code rate $R_{skip(2)}$, the UE may skip decoding. In this case, the reference information bit number and the reference code rate may each include predetermined values or values configured by the base station.

Specifically, in a case of 5G NR, according to the above (decoding skip method-1), in a case that the information bit number $N_{DL\_info}$ is smaller than or equal to $N_{DL\_info\_ref}$, BG(2) is used for LDPC encoding and decoding; thus, decoding skip may be determined based on a second reference code rate $R_{skip(2)}$ (e.g., 0.95), which is a decoding skip reference code rate for BG(2). Further, in a case of LDPC encoding and decoding using BG(1) through the above (decoding skip method-1), it can be seen that there may be no decoding skip. In this case, the reference (DL) information bit number $N_{DL\_info\_ref}$ may be configured to be smaller than or equal to a predetermined value (e.g., 308) (or the reference TBS may be configured to be smaller than or equal to a predetermined value (e.g., 292)).

That is, the decoding skip method-1 may refer, for example, to a method of determining a decoding skip based on the information bit number or the TBS and the second reference code rate for the second base graph. In this case, a case that the TBS is greater than a predetermined value or a case that the information bit is greater than a predetermined value is the same condition as a case that the second base graph is used; thus, it may be used instead.

(Decoding Skip Method-2)

The UE may skip decoding a transport block in an initial transmission if the number of downlink information bits (including CRC bits), $N_{DL\_info}$, is less than (or, less than or equal to) a predetermined number $N_{DL\_info\_ref(1)}$, and the effective channel code rate is higher than $R_{skip(2,1)}$ where the effective channel code rate is defined as the number of downlink information bits (including CRC bits) divided by the number of physical channel bits on PDSCH, elseif the number of downlink information bits (including CRC bits), $N_{DL\_info}$, is less than (or, less than or equal to) a predetermined number $N_{DL\_info\_ref(2)}$, and the effective channel code rate is higher than (or, higher than or equal to) $R_{skip(2,2)}$, where the effective channel code rate is defined as the number of downlink information bits (including CRC bits) divided by the number of physical channel bits on PDSCH.

According to the above (decoding skip method-2), if the information bit number is smaller than or equal to the first reference information bit number $N_{DL\_info\_ref(1)}$, and if the effective code rate $R_{eff}$>the first reference code rate $R_{skip(2,1)}$, decoding may be skipped. Further, if the information bit number is greater than the first reference information bit number $N_{DL\_info\_ref(1)}$ and is smaller than or equal to the second reference information bit number $N_{DL\_info\_ref(2)}$, and if the effective code rate $R_{eff}$>the second reference code rate $R_{skip(2,2)}$, decoding is skipped, and otherwise, decoding skip may not be applied. In this case, the first reference information bit number, the second reference information bit number, the first reference code rate, and the second reference code rate may be each configured to predetermined values or values configured by the base station.

In the case of 5G NR, in the (decoding skip method-2), if the DL information bit number $N_{DL\_info}$ is smaller than or equal to the first reference word bit number $N_{DL\_info\_ref(1)}$ or the second information bit number $N_{DL\_info\_ref(2)}$, BG(2) is used for LDPC encoding and decoding; thus, the decoding skip may be determined using different decoding skip reference code rates $R_{skip(2,1)}$ and $R_{skip(2,2)}$ for BG(2) according to the range of the information bit number $N_{DL\_info}$. Further, in the above (decoding skip method-2), in the case of LDPC encoding and decoding using BG(1), it can be seen that there may be no decoding skip. In this case, the first information bit number $N_{DL\_info\_ref(1)}$ and the second information bit number $N_{DL\_info\_ref(1)}$ may be configured to be smaller than or equal to a predetermined value (e.g., 308) (or the reference TBS may be configured to be smaller than or equal to a predetermined value (e.g., 292)). Further, there is usually a relationship such as $N_{DL\_info\_ref(1)}$<$N_{DL\_info\_ref(2)}$ and $R_{skip(2,1)}$<$R_{skip(2,2)}$, for example, there may be a value such as $(N_{DL\_info\_ref(1)}, N_{DL\_info\_ref(2)})$=(128, 308), and $(R_{skip(2,1)}, R_{skip(2,2)})$=(0.95, 0.96). However, the embodiment of the disclosure is not limited thereto, and, for example, the second reference code rate $R_{skip(2,2)}$ may be determined to various numbers such as 0.97 and 0.98, which are numbers greater than 0.95.

(Decoding Skip Method-3)

The UE may skip decoding a transport block in an initial transmission if the first base group BG(1) (or base matrix, BM(1)) is used for LDPC decoding, and the effective channel code rate is higher than (or, higher than or equal to) $R_{skip(1)}$ where the effective channel code rate is defined as the number of downlink information bits (including CRC bits) divided by the number of physical channel bits on PDSCH, elseif the second base group BG(2) (or base matrix, BM(2)) is used for LDPC decoding, and the effective channel code rate is higher than (or, higher than or equal to) $R_{skip(2)}$, where the effective channel code rate is defined as the number of downlink information bits (including CRC bits) divided by the number of physical channel bits on PDSCH.

The (decoding skip method-3) is an example of applying decoding skip by applying different reference code rates according to a base graph (or base matrix) used for LDPC decoding. The UE may skip decoding in a case that the first base graph is used and that the effective code rate is greater than the first reference code rate $R_{skip(1)}$ or in a case that the second base graph is used and that the code rate is greater than the second reference code rate $R_{skip(2)}$. That is, efficient decoding skip may be applied by appropriately configuring a code rate capable of decoding according to the base graph (BG(1)/BG(2)). Alternatively, in some cases, in a case that BG(1) is used, decoding skip may not be applied.

Further, as in (decoding skip method-1) or (decoding skip method-2), more subdivided decoding skip may be applied based on the reference code rate, the reference DL information bit number (or TBS), and the like. That is, the decoding skip method-3 may be used in combination with the decoding skip method-1 or the decoding skip method-2. For example, other code rate references may be applied according to the comparison result of the information bit number and the reference information bit number to at least one of a case that the first base graph is used or a case that the second base graph is used using at least one reference information bit number.

(Decoding Skip Method-4)

The UE may skip decoding a transport block in an initial transmission if the highest MCS index is configured (for LDPC encoding/decoding), and the number of downlink information bits (including CRC bits) is less than (or, less than or equal to) a predetermined number $N_{DL\_info\_ref}$.

The above (decoding skip method-4) is an example of a method of determining decoding skip based on an MCS index instead of a specific reference code rate. Because a code rate indicated by the MCS index is different from an effective code rate $R_{eff}$ value, it is not preferable to always apply decoding skip. In a case of 5G NR, because a code rate indicated by the highest MCS index is 948/1024, data can be restored through LDPC decoding in most cases, but decoding is difficult in a case of a very small TBS or DL information bit number. Further, in a case that an overhead increases in the assigned time and frequency resources, an amount of actually available resource elements (RE) reduces, and there is thus a risk of increasing the effective code rate; thus, it is preferable to apply decoding skip only in a case that TBS or DL information bit number is smaller than or equal to a specific reference value.

Therefore, according to the decoding skip method-4 of the disclosure, in a case that the MCS level is configured to the highest MCS level and that the information bit number is smaller than the reference information word number bit (e.g., configured to a predetermined value) (or in a case that the TBS is smaller than the reference TBS value (e.g., configured to a predetermined value), decoding skip may be performed.

Further, more accurate and efficient decoding skip may be applied to a case of considering whether an overhead is applied or a reference for an amount of overhead is additionally considered in the above (decoding skip method-4). Alternatively, it is also possible to apply decoding skip by independently considering whether an overhead is applied or a reference for an amount of overhead. In particular, because there is a possibility that effective code rate distortion due to an overhead may affect an LDPC decoding performance when an overhead, except for a PDCCH, DMRS, CSI-RS/IM, and the like occurs, decoding skip conditions may be added in consideration of the effect of such code rate distortion. For example, in 5G NR, in a case that a tracking reference signal (TRS) is assigned to a specific slot, 6 REs per RB may be used for the TRS. Accordingly, because data or parity bits of the LDPC code cannot be mapped as much as the corresponding RE, an effective code rate increases. In a case that the TBS or DL information bit number is not relatively large, a rate of increase in the code rate further increases; thus, the effect of the increase in the code rate cannot be ignored. Therefore, decoding skipping may be performed by configuring a threshold $N_{DL\_info\_ref}$ (TRS) corresponding to the case that a TRS slot is configured greater than a threshold $N_{DL\_info\_ref}$(No TRS) corresponding to a case that the TRS slot is not configured. In this way, if a threshold for the TBS is configured differently according to an overhead or if the TBS is smaller than the threshold according to the overhead, an embodiment of skipping decoding is possible. In this case, as the overhead is large, the threshold may be configured to be great or equal, and the threshold may be configured for each overhead value or for each overhead value range. Alternatively, in a case that a threshold for an overhead is determined in advance and that a total amount of overheads is greater than the threshold, an embodiment of skipping decoding may be possible. For reference, in the 5G NR UE, a TRS, which is a reference signal for tracking, may be configured, and the TRS is a DL reference signal used by the UE for accurate time-frequency tracking and may mean a CSI-RS for tracking.

Instead of using the highest MCS level, the above method may be applied to an MCS level of the threshold or more based on a threshold of the MCS level determined for each MCS table (or a threshold of the MCS level determined for at least one MCS table).

Alternatively, the decoding skip method-4 may be used in combination with the decoding skip methods-1 to 3. For example, at least two thresholds of an MCS level determined for each MCS table (the threshold of the MCS level determined for at least one MCS table) may be configured, and two or more reference information bit number or a reference TBS value may be configured according to the threshold of the MCS level.

The above embodiments provide a method of applying efficient decoding skip based on at least one of a reference code rate, the reference DL information bit number, a base graph (or base matrix), an MCS (or MCS index), and an amount of an overhead (or whether to apply). Efficient decoding skip may be applied based on one condition or a plurality of conditions in consideration of trade-off between ease of implementation and accuracy of decoding skip.

FIG. 12 is a flowchart applying example decoding skip according to various embodiments.

A receiver may receive a signal corresponding to one transport block.

The receiver may demodulate the received signal to identify an MCS level (or index information). Further, the receiver may identify or determine a modulation order Qm and code rate R applied to encoding of the transport block based on the MCS level or index (1200).

The receiver may identify or determine a TBS based on the modulation order and code rate (or spectral efficiency) (1210). A base graph (or base matrix) and parity check matrix of an LDPC code for encoding and decoding may be determined by the determined TBS and code rate R (1220).

The receiver may determine an effective code rate $R_{eff}$ and compare the effective code rate $R_{eff}$ with a reference code rate $R_{skip}$ (1230), and in a case that the effective code rate is smaller than or equal to the reference code rate, in order to restore the transport block, the receiver may perform LDPC decoding based on the received signal (1240). In this case, the reference code rate may be determined based on a predetermined value or a value configured by the base station. For reference, LDPC decoding may determine values corresponding to transmitted LDPC codewords through demodulation of the received signal, and then perform decoding based on the values. In this case, values determined based on the demodulation may usually be a log-likelihood ratio (LLR) value corresponding to each codeword bit, or other values corresponding to the probability to have a value of 0 or 1 for each bit may be used.

After performing LDPC decoding, the receiver may determine whether decoding is successful (1250). In a case that decoding is successful, the receiver may generate (or transmit) HARQ ACK (1260) bits, and, in a case that decoding fails, the receiver may generate (or transmit) a HARQ NACK (1270) bit. In this case, determination on whether success or failure of decoding may be performed based on CRC bits.

In a case that the effective code rate is greater than the reference code rate in step 1230, the receiver may skip LDPC decoding (1280). In a case that decoding skip is applied, the receiver may generate a HARQ-NACK (1270) bit without an LDPC decoding process.

The step 1230 may be implemented in various methods, and be implemented through any one of the above-described decoding skip methods 1 to 4 or a combination of at least one of the above-described decoding skip methods 1 to 4.

Therefore, step 1230 may be replaced with step of determining whether to perform decoding instead of step of comparing the effective code rate and the reference code rate. Therefore, as described above, step 1230 may be performed as step of comparing the effective code rate and the reference code rate, as illustrated in FIG. 12, for example, but the receiver may determine whether to skip decoding based on the reference code rate $R_{skip(i)}$ according to a base graph BG(i) determined as in 1232 of FIG. 12, for another example.

Alternatively, the receiver may determine whether to skip decoding based on the reference information bit number as in step 1234 of FIG. 12. In the case of 5G NR, when the TBS is equal to or smaller than a specific length (e.g., 292 or less), LDPC encoding and decoding is always performed using BG2; thus, whether to use BG(2) in step 1234 of FIG. 12 may be omitted from a determination criterion. Alternatively, step 1234 may be combined with step 1232, and in a case that the information bit number is smaller than the reference information bit number and that the effective code rate is greater than the reference code rate for BG(2), decoding may be omitted.

As another method, whether to skip decoding may be determined based on the MCS (or MCS index) as in 1236 of FIG. 12. That is, according to step 1236, if the identified MCS is the highest MCS and the information bit number is smaller than the reference information bit number (or if the TBS is smaller than a predetermined value), the receiver may perform decoding skip. In this case, even in a case of step 1236 of FIG. 12, whether to use BG(2) may be omitted.

For reference, because the TBS is always configured to a multiple of 8 in the current 5G NR system, the condition "TBS≤292 (or the number of DL information bits≤308)" in the above embodiments may be changed to "TBS≤288 or (or the number of DL information bits≤304)" or "TBS<296 or (or the number of DL information bits<312)".

Because the occurrence of decoding skip in the communication system substantially reduces efficiency, it is important that the base station configures an MCS so that such a situation does not occur if possible. That is, if the probability of occurrence of decoding skip as in [Embodiment 15] is minimized by configuring an appropriate MCS and TBS in the base station, system efficiency is increased. However, in order to reduce the probability of occurrence of decoding skip, in a case that the MCS level is lowered more than necessary, because the effect of reducing a data processing speed of the entire system occurs, it can be seen that appropriate control of the MCS level is an important factor in maximizing efficiency of the system. As described above, according to an embodiment of the disclosure, a method of performing decoding by a UE or a base station of a wireless communication system includes receiving a signal corresponding to a transport block; identifying an MCS level applied to the transport block based on the received signal; determining a transport block size (TBS) based on the MCS level; and determining whether to skip LDPC decoding based on the received signal and the TBS, wherein LDPC decoding is skipped in a case that the MCS level is configured to the highest MCS level and that the TB S is smaller than or equal to a reference value.

Further, according to an embodiment of the disclosure, a UE or base station for performing decoding in a wireless communication system includes a transceiver; and a controller configured to receive a signal corresponding to a transport block through the transceiver, to identify an MCS level applied to the transport block based on the received signal, to determine a transport block size (TBS) based on the MCS level, and to determine whether to skip LDPC decoding based on the received signal and the TBS, wherein the LDPC decoding is skipped in a case that the MCS level is configured to the highest MCS level and that the TBS is smaller than or equal to a reference value.

Further, according to an embodiment of the disclosure, a method of performing decoding by a receiver of a wireless communication system includes receiving a signal corresponding to a transport block; identifying an MCS level applied to the transport block based on the received signal; determining a transport block size (TBS) based on the MCS level; determining an effective code rate based on a number of physical channel bits transmitted through the TBS and the PDSCH; and determining whether to skip LDPC decoding based on the received signal and the TBS, wherein the decoding process is skipped in a case that the TBS is smaller than or equal to a first reference value and that the effective code rate is greater than or equal to a second reference value.

Further, according to an embodiment of the disclosure, a receiver for decoding a wireless communication system includes a transceiver; and a controller configured to receive a signal corresponding to a transport block through the transceiver, to identify an MCS level applied to the transport block based on the received signal, to determine a transport block size (TBS) based on the MCS level, to determine an effective code rate based on a number of physical channel bits transmitted through the TBS and the PDSCH, and to determine whether to skip LDPC decoding based on the received signal and the TBS, wherein the LDPC decoding process is skipped in a case that the TBS is smaller than or equal to a first reference value and that the effective code rate is greater than or equal to a second reference value.

Further, according to an embodiment of the disclosure, a method for a base station to determine a modulation and coding scheme (MCS) level for downlink transmission in a wireless communication system includes receiving a channel quality indicator (CQI) from a UE; identifying at least one of the CSI-RS port number or a rank index; determining a signal to interference plus noise ratio (SINR) value based on the received CQI information; performing SINR normalization based on the determined SINR value and at least one of the CSI-RS port number and a rank index; and determining an MCS based on the normalized SINR value. The receiver includes a UE or a base station.

Further, according to an embodiment of the disclosure, a method of performing encoding by a UE or a base station of a wireless communication system includes identifying an MCS table configuration and an MCS level; determining a transport block size (TBS) based on the MCS table configuration and the MCS level; and performing LDPC encoding based on the TBS, wherein the MCS table configuration corresponds to one of a maximum modulation order 6 (64QAM), 8 (256QAM), or 10 (1024QAM), or corresponds according to a BLER=0.1, 0.001, or 0.00001. At least some of parameters required in the process of determining the TBS may be determined based on a maximum support data rate or a minimum support data rate that may be supported by the UE.

Further, according to an embodiment of the disclosure, a method of performing decoding by a UE or a base station of a wireless communication system includes receiving a signal corresponding to a transport block; identifying an MCS table configuration and an MCS level based on the received signal; determining a transport block size (TBS) based on the MCS table configuration and the MCS level; and performing LDPC decoding based on the TBS, wherein the MCS table configuration corresponds to one of a maximum modulation order 6 (64QAM), 8 (256QAM), or 10 (1024QAM), or corresponds according to a BLER=0.1, 0.001, or 0.00001. At least some of parameters required in the process of determining the TBS may be determined based on a maximum support data rate or a minimum support data rate that may be supported by the UE.

Methods according to the embodiments described in the claims or specifications of the disclosure may be implemented in the form of hardware, software, or a combination of hardware and software.

In a case of being implemented in software, a non-transitory computer readable storage medium storing one or more programs (software modules) may be provided. One or more programs stored in the computer readable storage medium are configured for execution by one or more processors in an electronic device. One or more programs include instructions for causing an electronic device to execute methods according to embodiments described in claims or specifications of the disclosure.

Such programs (software modules, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), other types of optical storage devices, or magnetic cassettes. Alternatively, such programs may be stored in a memory including a combination of some or all thereof. Further, each memory may be included in the plural.

Further, the program may be stored in an attachable storage device that may be accessed through a communication network such as Internet, Intranet, a local area network (LAN), a wide area network (WAN), or a storage area network (SAN), or a communication network composed of a combination thereof. Such a storage device may access to a device implementing an embodiment of the disclosure through an external port. Further, a separate storage device on the communication network may access to the device implementing the embodiment of the disclosure.

In the above-described specific embodiments of the disclosure, components included in the disclosure have been expressed in the singular or the plural according to presented specific embodiments. However, the singular or plural expression is appropriately selected for a presented situation for convenience of description, and the disclosure is not limited to the singular or plural components, and even if a component is represented in the plural, it may be composed of the singular, or even if a component is represented in the singular, it may be composed of the plural.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a base station for determining a modulation and coding scheme (MCS) in a wireless communication system, the method comprising:
   receiving, from a user equipment (UE), a channel quality indicator (CQI);
   identifying at least one of a rank index or a number of channel state information (CSI)-reference signal (RS) ports;
   determining a signal to interference plus noise ratio (SINR) value based on the received CQI;
   performing SINR normalization based on the determined SINR value and the at least one of the rank index or the number of the CSI-RS ports; and
   determining the MCS based on the normalized SINR value and an MCS table, wherein the MCS table includes a plurality of sets, each of the plurality of sets comprising a modulation order and a target code rate,
   wherein the plurality of sets includes a first set including a modulation order of 10 and a target code rate of 805.5/1024, wherein the plurality of sets includes a second set including a modulation order of 10 and a target code rate of 853/1024,
   wherein the plurality of sets includes a third set including a modulation order of 10 and a target code rate of 900.5/1024, and
   wherein the plurality of sets includes a fourth set including a modulation order of 10 and a target code rate of 948/1024.

2. The method of claim 1, wherein performing the SINR normalization comprises:
   performing the SINR normalization based on the rank index and the number of the CSI-RS ports for a first frequency band; and
   performing the SINR normalization based on the rank index for a second frequency band.

3. The method of claim 2, wherein the first frequency band is an above-6-GHz (A6G) domain, and the second frequency band is a below-6-GHz (B6G) domain.

4. The method of claim 1, wherein determining the MCS comprises:
   determining, based on hybrid automatic repeat request (HARQ) feedback received from the UE, an offset value corresponding to open loop rate control (OLRC); and
   determining the MCS based on the offset value.

5. The method of claim 4, wherein the offset value is determined based on the MCS table.

6. A base station in a wireless communication system, the base station comprising:
   a transceiver; and
   a controller coupled with the transceiver and configured to:
      receive, via the transceiver, a channel quality indicator (CQI) from a user equipment (UE),
      identify at least one of a rank index or a number of channel state information (CSI)-reference signal (RS) ports,
      determine a signal to interference plus noise ratio (SINR) value based on the received CQI,
      perform SINR normalization based on the determined SINR value and the at least one of the rank index or the number of the CSI-RS ports, and
      determine a modulation and coding scheme (MCS) based on the normalized SINR value and an MCS table,
   wherein the MCS table includes a plurality of sets, each of the plurality of sets comprising a modulation order and a target code rate,
   wherein the plurality of sets includes a first set including a modulation order of 10 and a target code rate of 805.5/1024,
   wherein the plurality of sets includes a second set including a modulation order of 10 and a target code rate of 853/1024,
   wherein the plurality of sets includes a third set including a modulation order of 10 and a target code rate of 900.5/1024, and
   wherein the plurality of sets includes a fourth set including a modulation order of 10 and a target code rate of 948/1024.

7. The base station of claim 6, wherein the controller is configured to:
   perform the SINR normalization based on the rank index and the number of the CSI-RS ports for a first frequency band, and perform the SINR normalization based on the rank index for a second frequency band.

8. The base station of claim 6, wherein the controller is configured to:

determine an offset value corresponding to open loop rate control (OLRC) based on hybrid automatic repeat request (HARQ) feedback received from the UE, and determine the MCS based on the offset value.

9. The base station of claim 8, wherein the offset value is determined based on the MCS table.

* * * * *